(12) United States Patent
Shimizu et al.

(10) Patent No.: US 10,326,606 B2
(45) Date of Patent: Jun. 18, 2019

(54) MULTICAST SWITCHING SYSTEM

(71) Applicant: MEDIA LINKS CO., LTD., Kawasaki-shi, Kanagawa (JP)

(72) Inventors: Takeshi Shimizu, Kawasaki (JP); Kazunori Nakamura, Kawasaki (JP)

(73) Assignee: MEDIA LINKS CO., LTD., Kawasaki (JP)

( * ) Notice: Subject to any disclaimer, the term of this patent is extended or adjusted under 35 U.S.C. 154(b) by 0 days.

(21) Appl. No.: 15/432,384

(22) Filed: Feb. 14, 2017

(65) Prior Publication Data

US 2017/0244570 A1    Aug. 24, 2017

(30) Foreign Application Priority Data

Feb. 18, 2016  (JP) ................................. 2016-029254
Jun. 24, 2016  (JP) ................................. 2016-125818

(51) Int. Cl.
*H04L 12/18*  (2006.01)
*H04L 12/761*  (2013.01)
(Continued)

(52) U.S. Cl.
CPC .............. *H04L 12/18* (2013.01); *H04L 45/16* (2013.01); *H04L 49/00* (2013.01); *H04Q 3/00* (2013.01);
(Continued)

(58) Field of Classification Search
CPC .......... H04L 12/18; H04L 45/16; H04L 49/00
See application file for complete search history.

(56) References Cited

U.S. PATENT DOCUMENTS

2004/0062228 A1*  4/2004  Wu ........................ H04J 3/1611
                                                            370/351
2004/0095927 A1*  5/2004  Chang .................... H04L 29/06
                                                            370/388
(Continued)

FOREIGN PATENT DOCUMENTS

JP      2007-504772 A      3/2007
JP      2007-532037 A     11/2007
(Continued)

OTHER PUBLICATIONS

Jul. 27, 2017 Extended Search Report issued in European Patent Application No. 17156395.0.

*Primary Examiner* — Edan Orgad
*Assistant Examiner* — Nourali Mansoury
(74) *Attorney, Agent, or Firm* — Oliff PLC

(57) ABSTRACT

As compared to the conventional method, a non-blocking multicast switching system is provided in which the number of switches to be operated can be reduced and the path switching can be quick. A multicast switching system with an input stage, a middle stage, and an output stage, including a plurality of input switch elements of receiving/transmitting streams from input sources/to the middle stage, a plurality of middle switch elements of receiving/transmitting streams from the input switch elements/to the output stage, the plurality of middle switch elements being grouped into a plurality of groups and a plurality of output switch elements of receiving/outputting streams from the middle switch elements/to output destinations, wherein the input switch elements transmit the streams to each of the plurality of groups.

11 Claims, 14 Drawing Sheets

(51) Int. Cl.
*H04Q 3/00* (2006.01)
*H04Q 11/00* (2006.01)
*H04L 12/931* (2013.01)

(52) U.S. Cl.
CPC ..... *H04Q 11/00* (2013.01); *H04Q 2213/1302* (2013.01); *H04Q 2213/1304* (2013.01); *H04Q 2213/13242* (2013.01)

(56) References Cited

U.S. PATENT DOCUMENTS

| | | | |
|---|---|---|---|
| 2006/0159078 A1* | 7/2006 | Konda | H04L 45/00 370/386 |
| 2006/0165085 A1 | 7/2006 | Konda | |
| 2008/0069100 A1* | 3/2008 | Weyman | H04L 45/04 370/390 |
| 2008/0107103 A1 | 5/2008 | Yang et al. | |
| 2008/0267182 A1 | 10/2008 | Smiljanic | |
| 2010/0027535 A1 | 2/2010 | Yang et al. | |
| 2010/0325370 A1* | 12/2010 | Cummings | G11C 7/1048 711/149 |
| 2012/0320742 A1* | 12/2012 | Thomas | H04Q 3/68 370/229 |
| 2015/0244647 A1* | 8/2015 | Gopalan | H04L 49/15 370/386 |

FOREIGN PATENT DOCUMENTS

| | | |
|---|---|---|
| JP | 4341982 B2 | 10/2009 |
| WO | 2005/027390 A2 | 3/2005 |
| WO | 2005/027391 A2 | 3/2005 |

\* cited by examiner

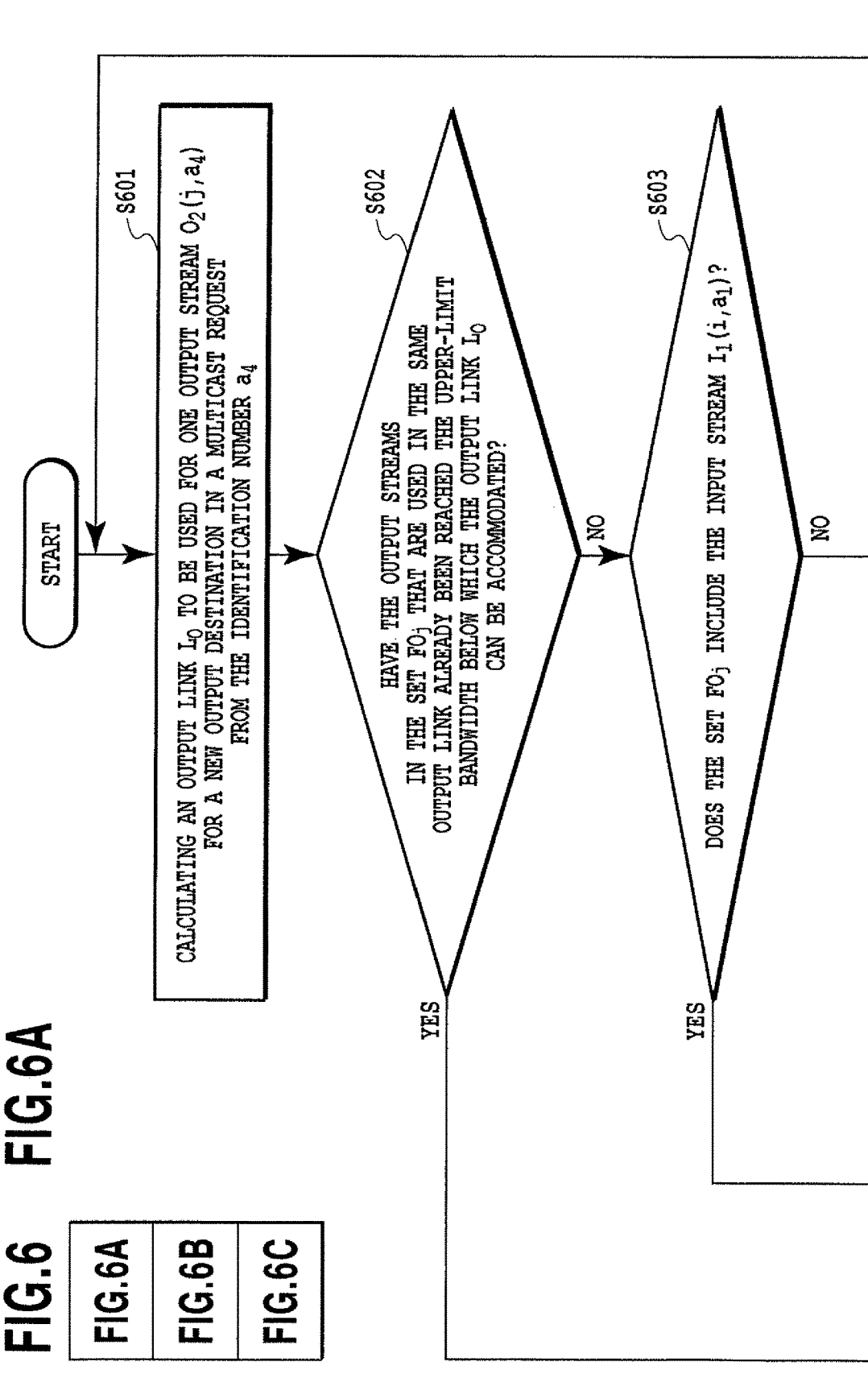

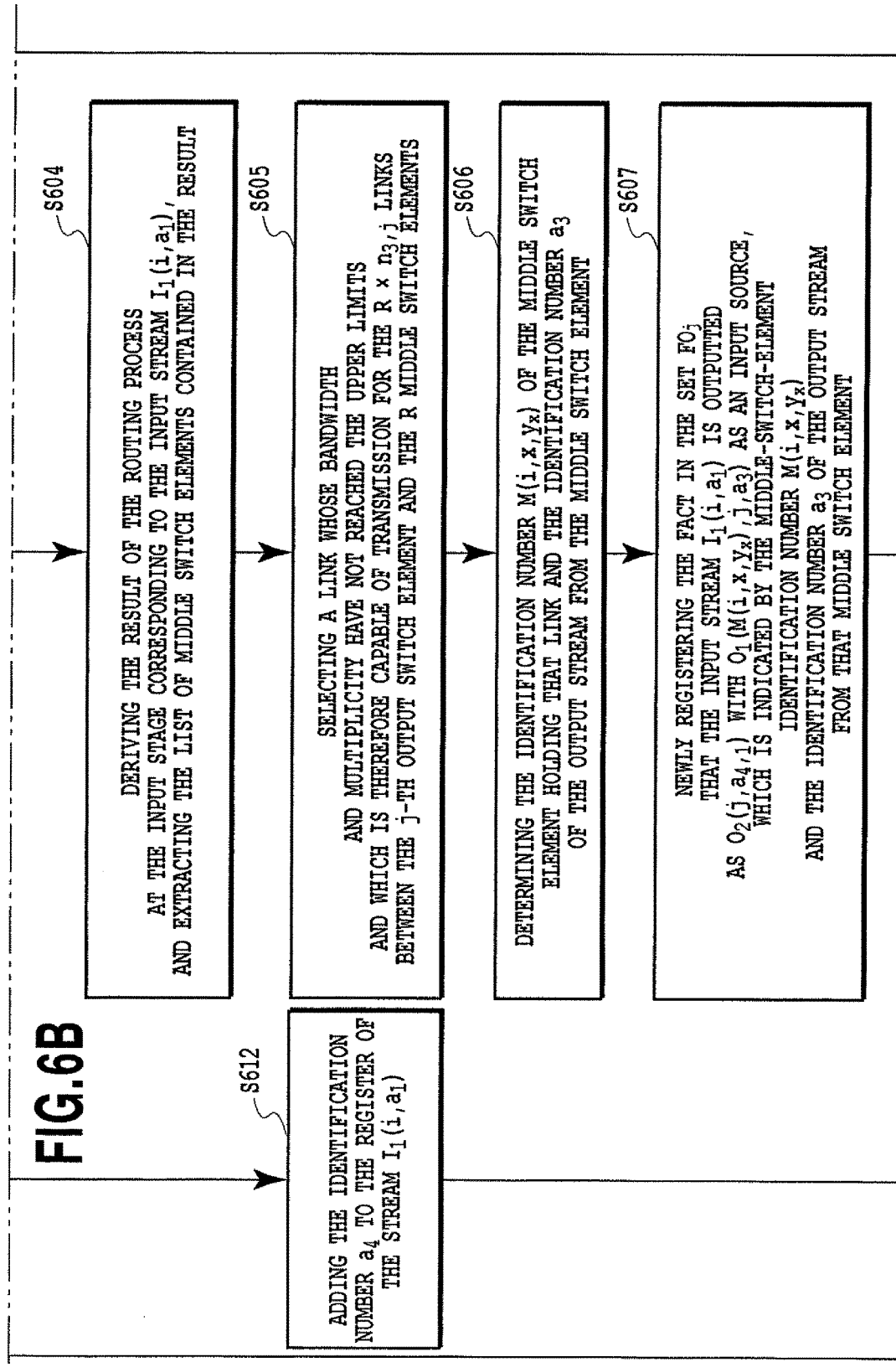

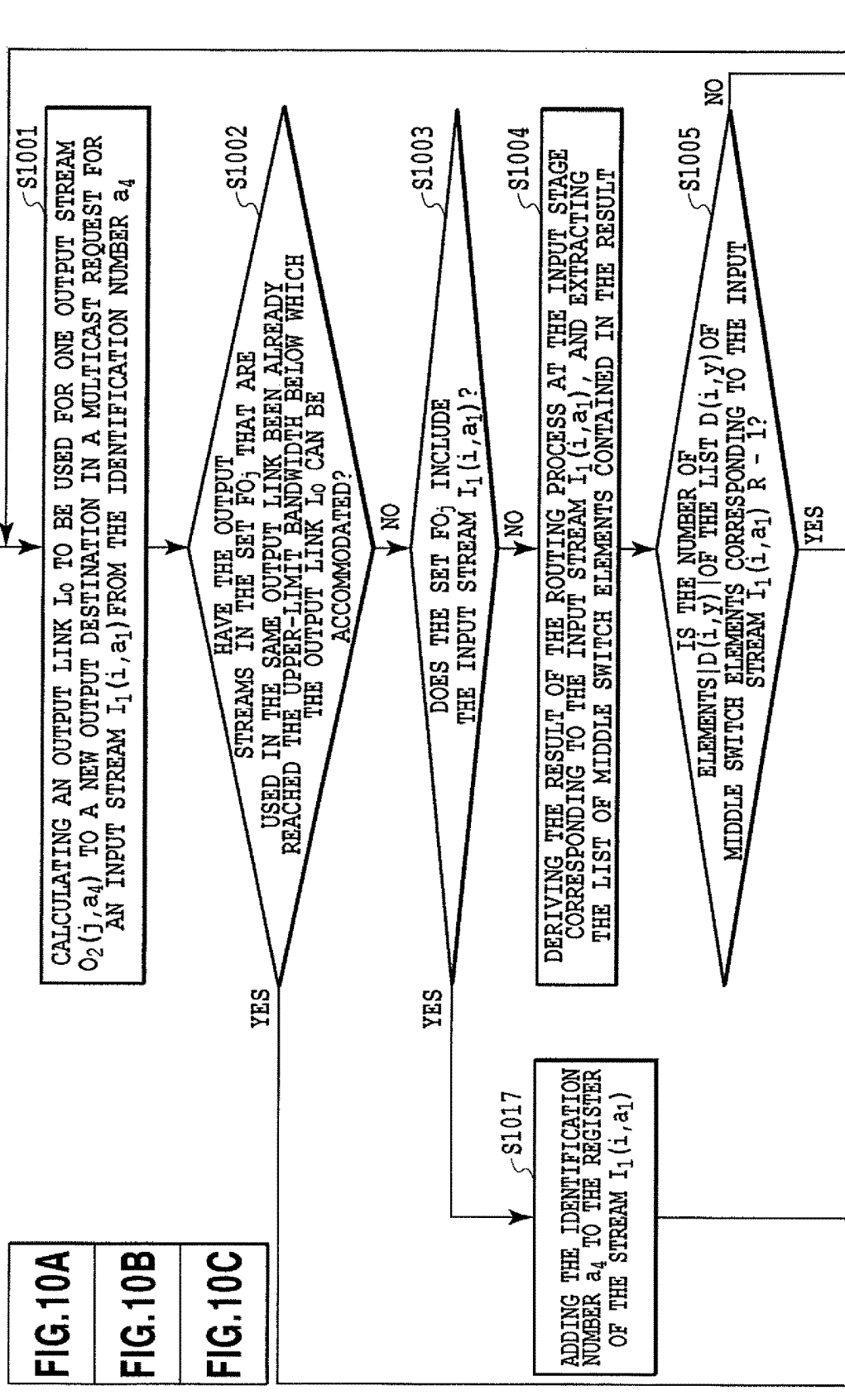

MULTICAST SWITCHING SYSTEM

CROSS-REFERENCES TO RELATED APPLICATIONS

This application claims the benefit of Japanese Patent Applications No. 2016-029254 filed Feb. 18, 2016, and 2016-125818 filed Jun. 24, 2016, which are hereby incorporated by reference wherein in their entirety.

BACKGROUND OF THE INVENTION

Field of the Invention

The present invention relates to a multicast switching system for non-blocking multicast transmission of streams from a plurality of input sources to a plurality of output destinations.

Description of the Related Art

A Clos (Clos is a person's name)-type multicast network with a total number $N_1$ of inputs and a total number $N_2$ of outputs (hereinafter referred to as $N_1*N_2$) includes three stages each including a plurality of switch elements. FIG. 1 shows an example of the configuration of a conventional Clos-type multicast network.

As shown in FIG. 1, a Clos-type multicast network includes an input stage, a middle stage, and an output stage.

The input stage includes $r_1$ switch elements (input switch elements 101, 102, and 103), each of which is an $n_1*m$ switch element. The input switch elements 101, 102, and 103 each have $n_1$ input links from input sources and m output links to the middle stage.

The middle stage includes m middle switch elements (middle switch elements 111, 112, and 113), each of which is an $r_1*r_2$ switch element. The middle switch elements 111, 112, and 113 each have $r_1$ input links from the input stage and $r_2$ output links to the output stage.

The output stage includes $r_2$ output switch elements (output switch elements 121, 122, and 123), each of which is an $m*n_2$ switch element. The output switch elements 121, 122, and 123 each have m input links from the middle stage and $n_2$ output links to output destinations. The total number $N_1$ of input links is $n_1*r_1$, and the total number $N_2$ of output links is $n_2*r_2$.

In such a network, each switch element is assumed to be capable of "non-blocking multicast." Here, being "capable of non-blocking multicast" means a state of being always capable of providing a connection path for transmitting a stream over the network in response to a given multicast connection request from a given input source to given output destinations while also satisfying the request without obstructing or rearranging other existing connections.

The "given connection request" is a given request, assuming that the output stage includes output switch elements and output links, for newly outputting an existing stream or a newly transmitted stream at the input stage from output switch elements at the output stage. In other words, the "given connection request" refers to a request for newly outputting a stream from given output switch elements and output links at the output stage. This includes not only an operation of utilizing a newly transmitted stream but also an operation of adding a new output destination to an existing multicast connection.

In the case where a stream is transmitted over a network, its path on the network may be rearranged. In that case, the difference between the new and previous paths might possibly result in events such as data loss at the reception side, reversal of the order of reception, and so on. Thus, preventing given multicast connection requests from affecting existing multicast connections is an important requirement to fulfill not only for each switch element but also for the whole network.

Multicast is one-to-many stream transmission. In a three-stage Clos-type multicast network, each multicast operation is expressed in a "tree structure" that can have branches at each of the input, middle, and output stages. FIG. 1 shows that an input stream into the input switch element 103 passes through the middle switch element 112 at the middle stage and then the output switch elements 121 and 122 at the output stage and is thereby multicast to three outputs.

Thus, being "capable of non-blocking multicast" means a state of being capable of satisfying "a given connection request" by adding a new branch or tree without reducing the number of branches at the branching points in existing tree structures. A network system having such a feature will be referred to as "non-blocking multicast system" in this specification.

As mentioned above, an important requirement in transmitting a stream over a network is not to affect existing multicast connections when a new receiving connection request is satisfied. However, if the probability and the cost of rearranging existing multicast connections are significantly low, it is also important in some cases to permit such rearrangement but also ensure non-blocking operation for given multicast. Such non-blocking operation is expressed as "rearrangeable non-blocking (RNB)". The above-mentioned non-blocking operation is also expressed as "wide-sense non-blocking (WSNB)". Hereinafter, WSNB and RNB will be collectively referred to as "non-blocking multicast system" in this specification.

The Clos-type network in FIG. 1 is originally a circuit connection-type network using a crossbar switch and is based on the assumption that one communication occupies one link. Japanese Patent Laid-Open Nos. 2007-504772 and 2007-532037 disclose that when the number m of switches at a middle stage in such a circuit switching-type network is a particular value, that three-stage Clos-type network is non-blocking and therefore has a multicast ability.

A Clos-type network, as a type of network in which any switches at adjacent stages include at least one link therebetween, can also be implemented using a packet switch based on recent years' packet switching. Such a packet switch can simultaneously support a plurality of streams from independent input sources at each link of the switch, with the maximum bandwidth of the link set as the upper limit. Generally, an $n*n$ packet switching-type multicast switch includes n input links and n output links. Each link transmits d independent streams with the link's bandwidth set as the upper limit, and any input links can be connected to any output links. Such a switch usually functions as an $nd*nd$ multicast switch.

There is, for example, SMPTE 2022-6 as a standard for transmission of digital video transmission signals over an IP network. Suppose that digital video signals having a bandwidth of 1.5 Gbps are transmitted through an IP switch in accordance with this standard. In this case, by using an $n*n$ packet switching-type multicast switch with links each having a bandwidth of 10 Gbps, up to 9 Gbps can be transmitted through each link with the link's multiplicity set at 6. This is equivalent to a $6n*6n$ multicast switch with links each having a bandwidth of 1.5 Gbps.

Here, input streams may have different bandwidths. For example, links having the same bandwidth of 10 Gbps can be equivalent to a 10n*10n multicast switch when there are four 1.5-Gbps input streams and six 500-Mbps input streams and the multiplicity is 10.

In Japanese Patent No. 4341982, such a switch element is referred to as a multi-source switch with a link multiplicity d. Japanese Patent No. 4341982 describes an algorithm for determining the number of switches at the middle stage in the Clos-type network shown in FIG. 2 in a condition where multi-source switches are used in the Clos-type network, all the links have the same multiplicity, and non-blocking multicast can be performed. Japanese Patent No. 4341982 also discloses a routing algorithm for setting paths by operating the input stage, the middle stage, and the output stage at the time of delivering signals. Here, in FIG. 2, $d_1$ denotes the multiplicity of an input link at the input stage, $d_2$ denotes the multiplicity of an input link at the middle stage, and $d_3$ denotes the multiplicity of an input link at the output stage.

Also, FIG. 3 shows a configuration of the $N_1*N_2$ three-stage network shown in FIG. 1 with an input-output stage in which each input-stage switch element and each output-stage switch element are accommodated in a single switch element. The configuration shown in FIG. 3 includes this input-output stage and a middle stage. The input-output stage includes input-output switch elements 311, 312, and 313, and the middle stage includes middle switch elements 301, 302, and 303. Each of the input-output switch elements 311, 312, and 313 and the middle switch elements 301, 302, and 303 has bidirectional links, so that a stream is returned (folded) at the middle stage. The middle switch elements 301, 302, and 303 correspond to the middle switch elements 111, 112, 113, shown in FIG. 1, respectively. The input-output switch element 311 is a switch element configured by integrating the input switch element 101 and the output switch element 121, shown in FIG. 1. Likewise, the input-output switch element 312 is a switch element configured by integrating the input switch element 102 and the output switch element 122, and the input-output switch element 313 is a switch element configured by integrating the input switch element 103 and the output switch element 123.

In the network in FIG. 3 also, a stream from an input stream is basically switched from the input-output stage through the middle stage to the input-output stage. Hence, the network in FIG. 3 can be theoretically considered a three-stage network.

As for the input-output links to be actually used, not all the physical links provided to the switch elements have to be used. Also, some bidirectional links may be used unidirectionally. Then, in the configuration shown in FIG. 3, the number of switch elements at the input-output stage is $r=\max(r_1,r_2)$, and the number of input-output links of each input-output switch element is $n=\max(n_1,n_2)$. Here, max(a, b) represents the greater of two integers a and b. Here, the upper limit of $N_1$ and $N_2$ in relation to n and r is $N=\max(N_1,N_2)=n*r$.

Packet switches may be used in the configuration shown in FIG. 3 to form a multi-source configuration. In this way, a plurality of streams can be transmitted through a link between switch elements and an input-output link at the input-output stage.

In the Clos-type network shown in FIG. 3, a stream is transmitted through the same switch element at the input-output stage. For example, it is possible to use such a path that a stream inputted into the input-output switch element 312 is transmitted to the middle switch element 301, returned to the input-output switch element 312, and then outputted.

However, if an Ethernet (registered trademark) switch, which has been common in recent years, is used as each switch element shown in FIG. 3, loopback output or a switch operation involving returning a stream to the same link might not be permitted in some cases. In such a case, as shown by the input-output switch element 312 in FIG. 3, a stream to be transmitted to a middle switch element can be caused to take such a bypass that the input-output switch element 312 transmits the inputted stream directly to the output destination.

The type of switch element with links each capable of simultaneously inputting and outputting a plurality of streams from independent input sources, as mentioned above, will be referred to as "multi-source switch" as in the invention described in Japanese Patent No. 4341982. Generally, an n*n packet switching-type multicast switch can, through each link, transmit d independent streams with the link's bandwidth set as the upper limit, and can output given streams to given output destinations. Such a switch will be simply referred to as "n*n d-source multicast switch" as in the invention described in Japanese Patent No. 4341982. Such a switch functions as a usual nd*nd multicast switch. Such a switch is mounted, for example, as a packet switch.

However, the conventional techniques described in Japanese Patent Laid-Open Nos. 2007-504772 and 2007-532037 assume a Clos-type network in which one link is occupied by one stream, and describe no technique for minimizing the number of middle-stage switches in a Clos-type network capable of multi-source multicast under a non-blocking condition. Accordingly, in such a system, the number nd of inputs to a switch, which corresponds to the number n of ports in these documents, is large, and the system is expensive.

Japanese Patent No. 4341982 discloses an algorithm for deriving the number of switches necessary to enable multi-source non-blocking multicast. Japanese Patent No. 4341982, however, does not deny the possibility of solutions that allow implementation of multi-source non-blocking multicast with fewer switches. Also, the routing algorithm, which involves operating a plurality of switches at every stage, has a problem in that, with the worst values, path setting and removal require a path switching time in proportion to the number of stages in the network.

It is known that, in one-to-one unicast communication, a network satisfying an RNB condition can be smaller in size than a network in satisfying a WSNB condition. RNB conditions in multicast communication are described in "Generalized multi-stage connection networks" (G. M. Masson and B. W. Jordan, Networks, vol. 2, pp. 191-209, 1972) and "Some Graph-Colouring Theorems with Applications to Generalized Connection Networks" (D. G. Kirkpatrick, M. Klawe, and N. Pippenger, SIAM Journal on Algebraic and Discrete Methods 6, no. 4, pp. 576-582, 1985). However, considering that using a publicly known WSNB condition achieves a greater reduction in network size than using a known RNB condition and also considering the risk of rearrangement, there is no advantage of using an RNB condition.

In view of the above, there has been a demand for a system capable of implementing multi-source non-blocking multicast with fewer switches and also quickly adding, removing, and switching paths.

SUMMARY OF THE INVENTION

The present invention provides a non-blocking multicast switching system using multi-source switch elements in a three-stage Clos-type network. An $N_1*N_2$ multicast system of the present invention outputs streams from $N_1$ input sources to $N_2$ output destinations, and two or more independent streams are transmitted between switch elements. A difference from conventional Clos-type networks is that, as shown in FIG. 2, stream transmission is performed with a multiplicity d between switch elements at different stages, which is equivalent to d logical links present between the switch elements.

In the present invention, m (m>1) switch elements at the middle stage are grouped into a plurality of R (R>=1) groups of k (k>=1) middle switch elements. A stream is transmitted from an input switch element at the input stage to all groups at the middle stage but to one middle switch element in each group. At the output stage, in response to a request of multicast output requested by an output switch element, at least one group is selected as a transmission source from among all the groups at the middle stage to implement multicast transmission.

Here, the path setting at the input stage is separate from the route setting process at the middle stage and the output stage, and conditional equations are presented for that path setting method to satisfy conditions enabling non-blocking multicast delivery.

Also, as compared to the techniques disclosed in "Generalized multi-stage connection networks" and "Some Graph-Colouring Theorems with Applications to Generalized Connection Networks" as mentioned above, the present invention presents a method of configuring a network satisfying an RNB condition that can make the network size smaller than publicly-known WSNB conditions. As will be described later, a WSNB condition in the present invention is based on the fact that a new delivery through an alternate path can always be established, provided that each input stream is delivered to R alternate paths or middle switch elements and that the output from an output switch element at the output stage satisfies equation (2) mentioned later.

An RNB condition in the present invention presents a delivery method for always allowing a new delivery through an alternate path, by rearranging an existing delivery as needed, provided that R>1, that each input stream is delivered to at least R−1 alternate paths or middle switch elements, and that the output from an output switch element at the output stage satisfies later-mentioned equation (2).

The present invention can reduce the number of switches in a Clos-type network capable of multi-source multicast to a greater extent than the known method described in Japanese Patent No. 4341982, based on a path setting method according to the present invention and a solution to conditional equations for the path setting method to satisfy conditions for implementing non-blocking multicast.

One embodiment assumes a case of utilizing switch elements with 96*96 links to build a network with twice more links or 192*192 links. When calculation is performed using mathematical formulas disclosed in Japanese Patent No. 4341982 with each link's multiplicity set at 2, then, n=4, r=48, and m=20 are derived as a solution for the smallest number of switches. Specifically, the switch elements at the input stage are 48 switches of a 4*20 configuration, the switch elements at the middle stage are 20 switches of a 48*48 configuration, and the switch elements at the output stage are 48 switches with a 20*4 configuration.

Then, with switch elements with a 96*96 configuration, the input stage and the output stage can be configured using one switch with a 96*96 configuration for each of two sets of four switch elements and in total eight switch elements (the number of input streams 4*4+20*4=96, the number of output streams 20*4+4*4=96). Thus, the input stage and the output stage can all be configured using 12 switches of a 96*96 configuration. Also, the middle stage can be configured using one switch of a 96*96 configuration as two switch elements (the number of input streams is 48*2=96, the number of output streams is 48*2=96). Then, the middle stage can be configured using ten switch elements of a 96*96 configuration. The total number of switches is 22.

In contrast, in the present invention, as will be discussed in a later-described example, k=R=2, n=32, r=6, and m=4 are a solution satisfying the WSNB condition with the minimum number of switches. Then, it is possible to use ten switch elements to configure a multicast switching system equivalent to one with 192*192 switch elements. Further, based on this solution, the number of middle switch elements at the middle stage can be reduced to generate a solution satisfying the RNB condition even with m=3 or m=2. In the case of using 96*96 switch elements, with m=3 and r=5, it is possible to configure a multicast switching system equivalent to one with 152*190 switch elements and, with m=2 and r=4, it is possible to configure a multicast switching system equivalent to one 120*192 switch elements.

In a similar comparison, given that the same 96*96 switch element is used, k<6, and R<6, then, there are solutions with fewer switch elements than a solution derived by the technique disclosed in Japanese Patent No. 4341982, and a multicast switching system with at a maximum of 480*480 links can be configured with fewer switch elements than the conventional technique. Based on these solutions, a solution with even fewer switch elements satisfying the RNB condition may be used. In this way, non-blocking multicast can be implemented with even fewer switch elements.

In the conventional method, when no existing path is present, a path setting operation is dynamically performed on all the stages including the input stage after a multicast request is received.

In contrast, in the present invention, the path setting at the input stage is separate from the path setting process at the middle stage and the output stage, and the path setting at the input stage can be performed in advance. Thus, as compared to addition and removal of a path in the path setting in the conventional method, the number of switches to be operated ca be reduced and the path switching can be quick.

Further features of the present invention will become apparent from the following description of exemplary embodiments (with reference to the attached drawings).

BRIEF DESCRIPTION OF THE DRAWINGS

FIG. 6 is a diagram showing the relationship of FIGS. 6A to 6C;

FIGS. 6A to 6C are a flowchart showing a routing process for new and existing multicast requests according to the one embodiment of the present invention;

FIG. 10 is a diagram showing the relationship of FIGS. 10A to 10C; and

FIGS. 10A to 10C are a flowchart showing a routing process for new and existing multicast requests according to another embodiment of the present invention.

DESCRIPTION OF THE EMBODIMENTS

Embodiments of the present invention will be described below. In this specification, the term "stream" includes a sound, image, signal, data, and the like to be transmitted from an input source to an input stage and outputted to a plurality of output destinations. The term "switch element" refers to a physical device that has a matrix structure or a memory structure inside and outputs streams from input ports to output ports. The term "link" refers to a physical transmission path linking switching elements at different stages and connected between an input port and an output port of the switch elements.

A system according to an embodiment of the present invention is a non-blocking multicast switching system using multi-source switch elements in a three-stage Clos-type network. An $N_1*N_2$ multicast switching system according to the present invention outputs streams from $N_1$ input sources to $N_2$ output destinations, and transmits one or more independent streams through a link between switch elements. A difference from conventional Clos-type networks is that a link between switches has a multiplicity d, which is theoretically equivalent to d links present therebetween.

Figure 1:
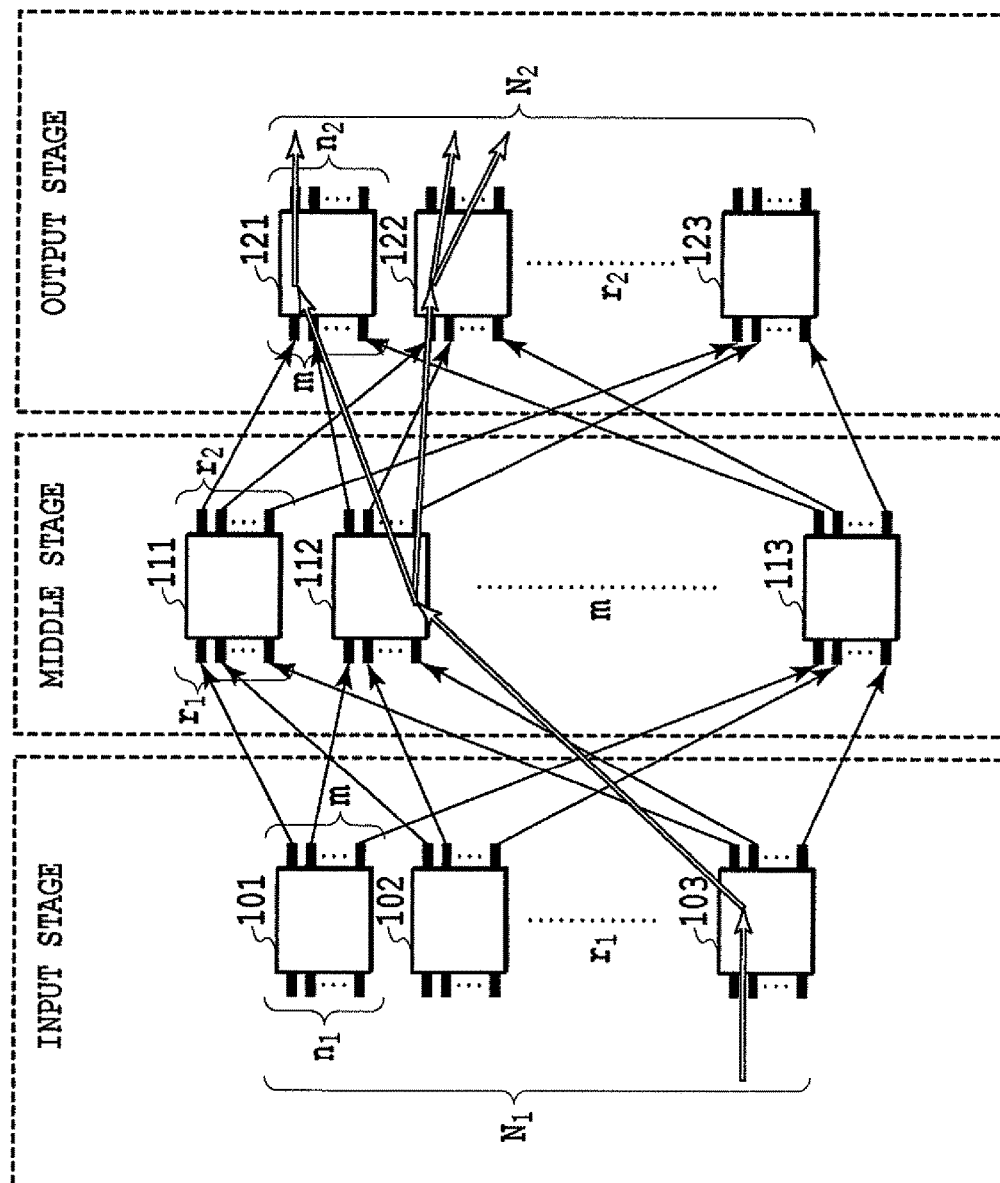
FIG. 1 is a diagram showing an example of the configuration of a three-stage Clos-type network according to a conventional technique.
Figure 2:
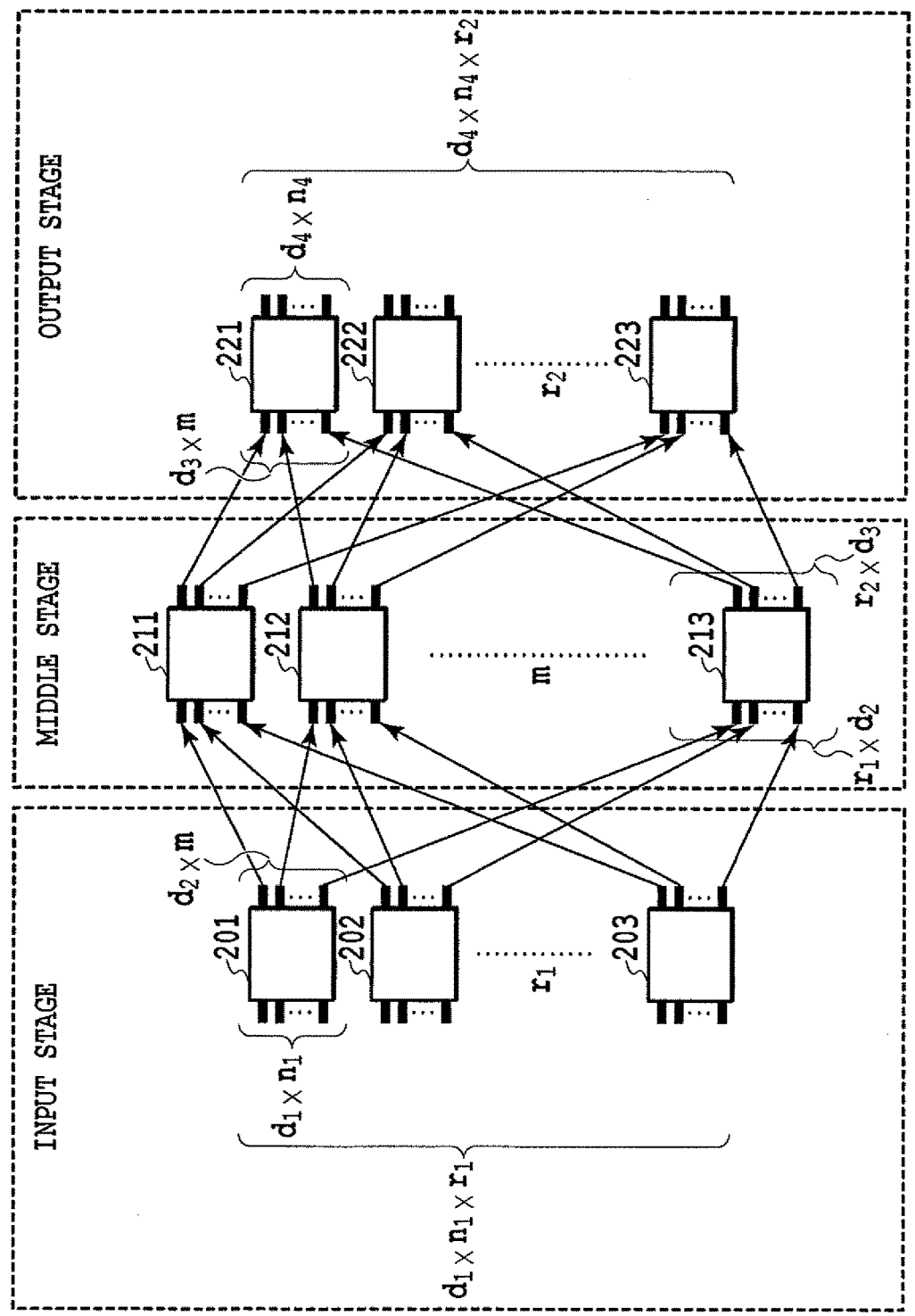
FIG. 2 is a diagram showing an example of the configuration of a Clos-type network configured by using, instead of the switch elements shown in FIG. 1, multi-source switches each of which is capable of transmitting a plurality of independent streams through each link.
Figure 3:
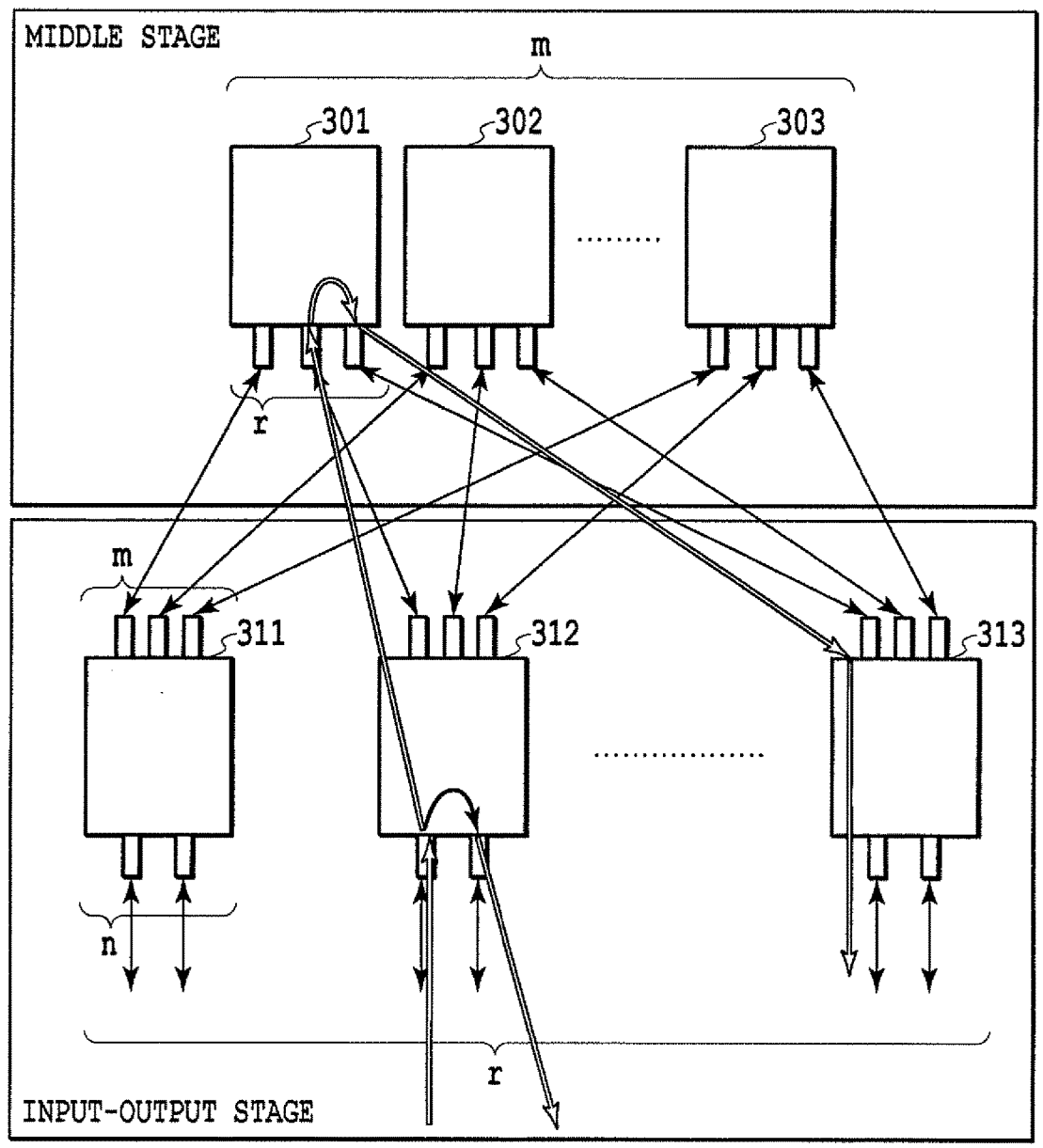
FIG. 3 is a diagram showing an example of a network configuration configured by using bidirectional links instead of the unidirectional links at switch elements in a three-stage Clos-type network shown in FIG. 1.

FIG. 2 shows a Clos-type network configured by using, instead of the switch elements in FIG. 1, multi-source switches each of which is capable of transmitting a plurality of independent streams through each link.

The input stage includes $r_1$ input switch elements 201, 202, and 203. The input switch elements 201, 202, and 203 each includes $n_1$ input links from input sources and m output links to m middle switch elements. Each input link has a multiplicity $d_1$ and each output link has a multiplicity $d_2$. In other words, each input switch element is a $(d_1*n_1)*(d_2*m)$ switch element.

The middle stage includes m middle switch elements 211, 212, and 213. The middle switch elements 211, 212, and 213 each includes $r_1$ input links from $r_1$ input switch elements and $r_2$ output links to $r_2$ output switch elements. Each input link has a multiplicity $d_2$ and each output link has a multiplicity $d_3$. In other words, each of the middle switch elements 211, 212, and 213 is a $(d_2*r_1)*(d_3*r_2)$ switch element.

The output stage includes $r_2$ output switch elements 221, 222, and 223. The output switch elements 221, 222, and 223 each have m input links from m middle switch elements and $n_4$ output links to output destinations. Each input link has a multiplicity $d_3$ and each output link has a multiplicity $d_4$. In other words, each of the output switch elements 221, 222, and 223 is a $(d_3*m)*(d_4*n_4)$ switch element. Thus, the network as a whole has a $(d_1*n_1*r_1)*(d_4*n_4*r_2)$ configuration.

At each of the input switch elements 201, 202, and 203, a plurality of streams constituting the multiplicity $d_1$ of streams are inputted over $n_1$ input links. Here, the bandwidth of each stream may not be equal to the others. Then, given that the upper limit of the physical bandwidth available in each input link is $s_1$ and the upper limit of the input multiplicity is $d_1$, the total bandwidth of streams received by and inputted through the $n_1$ links is $n_1*s_1$.

Likewise, at each of the output switch elements 221, 222, and 223, a plurality of streams constituting the output multiplicity $d_4$ are outputted over $n_4$ output links. Given that the upper limit of the physical bandwidth of each output link is $s_4$ and the upper limit of the output multiplicity is $d_4$, the total bandwidth of streams transmitted and outputted through the $n_4$ links is $n_4*s_4$.

Further, the input switch elements 201, 202, and 203 and the output switch elements 221, 222, and 223 may each have unique multiplicities and total bandwidths for its input links and output links. Also, the input switch elements 201, 202, and 203 and the output switch elements 221, 222, and 223 may each have a unique multiplicity and total bandwidth with each of the middle switch elements 211, 212, and 212.

Figure 4:
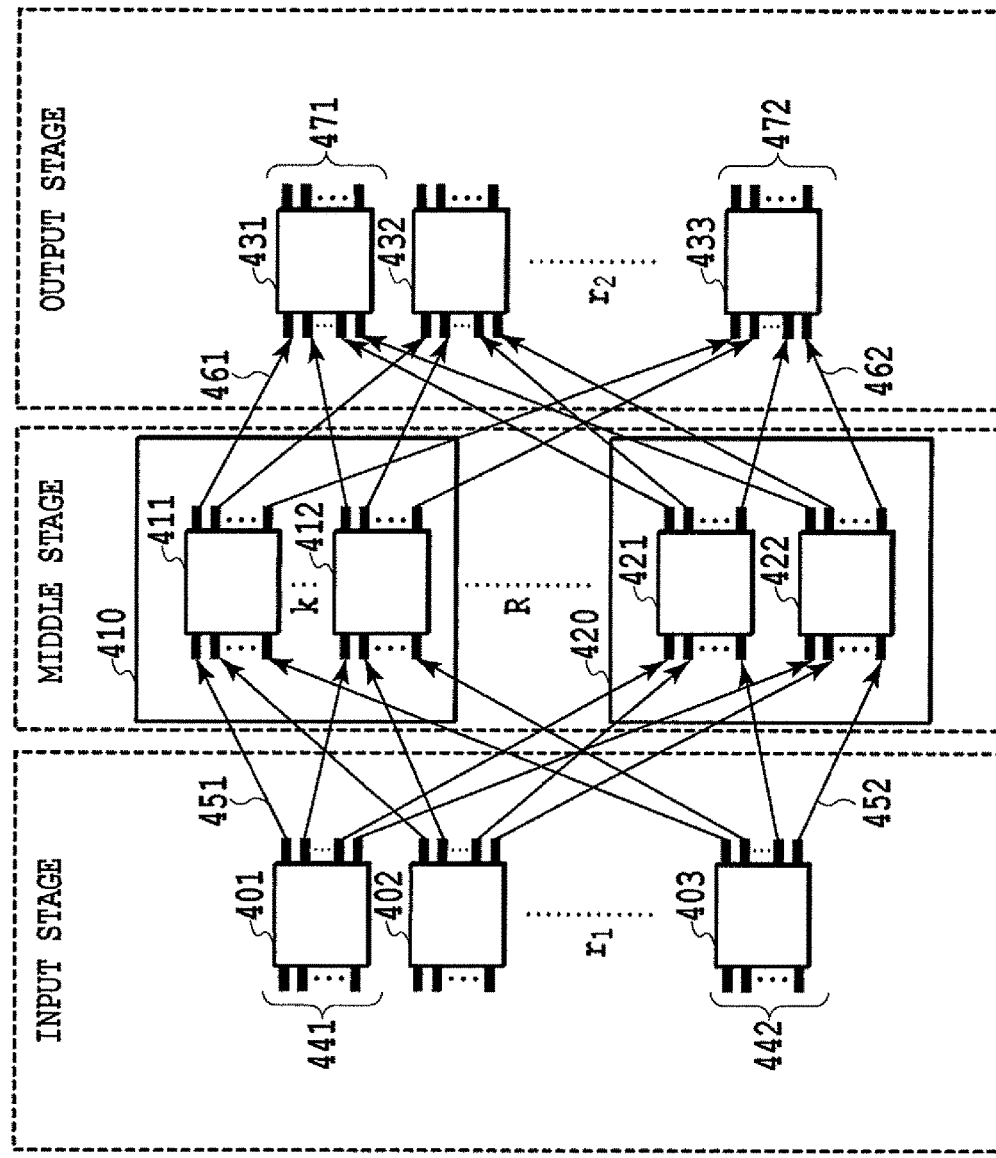
FIG. 4 is a diagram showing an example of the configuration of a three-stage Clos-type network according to one embodiment of the present invention.

FIG. 4 shows an example of the configuration of a three-stage Clos-type network according to one embodiment of the present invention.

Input switch elements 401, 402, and 403 represent $r_1$ switches at the input stage.

In the present invention, as will be described later, m (m>1) middle switch elements at the middle stage are grouped into R (R>=1) groups of k (k>=1) switch elements. A group 410 is the first group with k switches at the middle stage. A group 420 is the R-th group also with k switches at the middle stage. A middle switch element 411 is the first switch element in the group 410, and a middle switch element 412 is the k-th switch element in the group 410. A middle switch element 421 is the first switch element in the group 420, and a middle switch element 422 is the k-th switch element in the group 420.

Output switch elements 431, 432, and 433 represent $r_2$ switch elements at the output stage.

Input links 441 are the input links of the first input switch element 401 at the input stage. An output link 451 is an output link of the input switch element 401 and also an input link of the middle switch element 411. Input links 442 are the input links of the $r_1$-th input switch element 403. An output link 452 is an output link of the input switch element 403 and also an input link of the middle switch element 422.

Output links 471 are the output links of the first output switch element 431 at the output stage. An input link 461 is an input link of the output switch element 431 and also an output link of the middle switch element 411. Output links 472 are the output links of the $r_2$-th output switch element 433 at the output stage. An input link 462 is an input link of the output switch element 433 and also an output link of the middle switch element 422.

In the following, as an embodiment of the present invention, the i-th ($r_1 \geq i \geq 1$) input switch element at the input stage receives streams from input sources through its input links, the number of which is $n_{1,i}$ ($n_{1,i} \geq 1$), with a total bandwidth of $n_{1,i}*s_{1,i}$ and an upper-limit multiplicity of $d_{1,i}$ ($d_{1,i} > 1$). The input links are equivalent to the input links 441 and 442, shown in FIG. 4. Also, the i-th input switch element transmits streams to a middle switch element through an output link, the number of which is $n_{2,i}$ ($n_{2,i} \geq 1$), with a total bandwidth of $n_{2,i}*s_{2,i}$ and an upper-limit multiplicity of $d_{2,i}$ ($d_{2,i} > 1$). The output link is equivalent to the output links 451 and 452, shown in FIG. 4.

Likewise, the j-th ($r_2 \geq j \geq 1$) output switch element at the output stage outputs streams to output destinations through its output links, the number of which is $n_{4,j}$ ($n_{4,j} \geq 1$), with a total bandwidth of $n_{4,j}*s_{4,j}$ and an upper-limit multiplicity of $d_{4,j}$ ($d_{4,j} > 1$). Also, the j-th output switch element receives streams from a middle switch element through an input link, the number of which is $n_{3,j}$ ($n_{3,j} \geq 1$), with a total bandwidth of $n_{3,j}*s_{3,j}$ and an upper-limit multiplicity of $d_{3,j}$ ($d_{3,j} > 1$). The output links here are equivalent to the output links 471 and 472, shown in FIG. 4, and the input link here is equivalent to the input links 461 and 462, shown in FIG. 4.

Thus, the number $N_1$ of input streams in the whole network is the sum of the numbers of input streams into all the $r_1$ input switch elements at the input stage, which is expressed as $N_1 = \Sigma_{1 \leq i \leq r_1} d_{1,i}$.

Also, the number $N_2$ of output streams in the whole network is the sum of the numbers of output streams from all the $r_2$ output switch elements at the output stage, which is expressed as $N_2 = \Sigma_{1 \leq i \leq r_2} d_{4,j}$.

For simple description, the bandwidths of the input links of each input switch element are assumed to be equal. Also, the bandwidths of the output links of each output switch element are assumed to be equal. Further, the bandwidths of links of each switch that serve as both a transmission-source switch and a reception-side switch are assumed to be equal. As will be described in later-discussed examples, it is possible to replace n ($n \geq 1$) links of a bandwidth s with n' ($=n*s/s'$) links of a bandwidth s' ($s \neq s'$) by using a certain link implementation method. This replacement operation will be referred to as normalization with s'.

Here, the normalization might possibly change the multiplicity depending on the bandwidth required by a stream and the link bandwidth. Assume, for example, that s=6 (Gbps), n=1, s'=2 (Gbps), and the bandwidth required by a single stream is 1.5 Gbps. In this case, the multiplicity with s is $4 = \lfloor 6/1.5 \rfloor$.

On the other hand, the multiplicity normalized with s' is $3 = \lceil 1 \times 6/2 \rceil \times \lfloor 2/1.5 \rfloor$.

Thus, the multiplicity is reduced. For this reason, in the following, the normalization is performed with requirements concerning multiplicity taken into consideration.

In the present invention, m (m>1) middle switch elements are grouped into R ($R \geq 1$) groups of k ($k \geq 1$) switch elements. Streams are transmitted from each input switch element to all the groups but to one middle switch element in each group. At the output stage, in response to a request of multicast output requested by an output switch element, at least one group is selected as a transmission source from among all the groups at the middle stage to implement multicast delivery.

Thus, streams are transmitted from the input stage to one middle switch element in every group at the middle stage, and the group or groups from which to receive streams are selected at the middle stage and/or the output stage. In this way, the path setting at the input stage can be separate from the path setting process at the middle stage and the output stage.

Here, the total bandwidth of the input links of the i-th input switch element at the input stage ($n_{1,i}*s_{1,i}$) is set to be equal to less than the sum of the bandwidths of its links to all the middle switch elements in a group at the middle stage ($k*n_{2,i}*s_{2,i}$). This guarantees that all the streams into each input switch element can be fully delivered to all the groups. Here, in terms of multiplicity, output streams never exceed input streams, and therefore $d_{1,i} \leq k*d_{2,i}$.

Also, the total bandwidth of the output links of the j-th output switch element at the output stage ($n_{4,j}*s_{4,j}$) is set to be equal to less than the bandwidth of the link from one middle switch element in each group at the middle stage multiplied by the number of groups ($R*n_{3,j}*s_{3,j}$). This guarantees that all the streams transmitted to the middle switch elements can be outputted. Here, in terms of multiplicity, output streams never exceed input streams, and therefore $d_{4,j} \leq R*d_{3,j}$.

One middle switch element in each group at the middle stage receives subsets of all streams from the input stage. With such a configuration, even if all the streams for an output switch element concentrate at a particular subset, non-blocking multicast is still possible without changing the other multicast paths since the same streams have been transmitted to the other (R−1) groups to such an extent as to leave necessary bandwidths and multiplicities. Even if one group handles 1/R of the all the streams for an output switch element and those streams concentrate at one middle switch element in that group, one middle switch element can be used from all the R groups, which makes it possible to handle all the outputs.

From the above, the network configuration according to the present invention has solutions satisfying the following equations on condition that the middle stage includes m=(R*k) switch elements.

For the i-th input switch element at the input stage, $$n_{1,i} \times s_{1,i} \leq k \times n_{2,i} \times s_{2,i}, \text{ and } d_{1,i} \leq k \times d_{2,i} \qquad \text{equation (1)}.$$

For the j-th output switch element at the output stage, $$n_{4,j} \times s_{4,j} \leq R \times n_{3,j} \times s_{3,j}, \text{ and } d_{4,j} \leq R \times d_{3,j} \qquad \text{equation (2)}.$$

Here, the number of output streams in the whole network is the sum of the numbers of output streams from all the $r_2$ output switch elements, i.e. the sum of the multiplicities is $\Sigma_{1 \leq j \leq r_2} d_{4,j}$. The total bandwidth is $\Sigma_{1 \leq j \leq r_2} (n_{4,j} \times s_{4,j})$.

On the other hand, the total number of output streams at the middle stage is the sum of the number of streams transmitted from the middle switch elements to all the output switch elements at the output stage. Thus, the multiplicity is $\Sigma_{1 \leq j \leq r_2} d_{3,j}$, and the total bandwidth is $\Sigma_{1 \leq j \leq r_2} (n_{3,j} \times s_{3,j})$.

If the number of output streams in the whole network is not greater than the number of output streams from a single switch element, there will be no point to build the network. Thus, the following conditions are added as conditions to be satisfied by solutions.

The output stage as a whole is $$\Sigma_{1 \leq j \leq r_2}(n_{4,j} \times s_{4,j}) > \Sigma_{1 \leq j \leq r_2}(n_{3,j} \times s_{3,j})$$

and $$\Sigma_{1 \leq j \leq r_2} d_{4,j} > \Sigma_{1 \leq j \leq r_2} d_{3,j} \qquad \text{equation (3)}.$$

In implementation, solutions are derived by adding, as constraint conditions, the number of links that can be used by an input switch element, the number of links that can be used by a middle switch element, and the number of links that can be used by an output switch element.

For the i-th input switch element at the input stage, the upper limit number of input links is set to $p_{1,i}$, and the upper limit number of output links is set to $p_{2,i}$. For the middle switch elements, the upper limit number of input links of a bandwidth x (x∈{a set of mutually different values among all $s_{2,i}$}) is set to $p_{3,x}$, and the upper limit number of output links of a bandwidth y (y∈{a set of mutually different values among all $s_{3,i}$}) is set to $p_{3,x}$. For the j-th output switch element at the output stage, the upper limit number of input links is set to $p_{5,j}$, and the upper limit number of output links is set to $p_{6,j}$. Based on the configuration described thus far, the following constraint conditions are added.

For the i-th input switch element at the input stage, $$n_{1,i} <= p_{1,i}$$ equation (4).

For the i-th input switch element at the input stage, $$n_{2,i} * R * k <= p_{2,i}$$ equation (5).

All the links of each middle switch element with the bandwidth x are $$\Sigma_{1 \le i \le r_1, x = s_{2,i}} n_{2,i} \le p_{3,x}$$ equation (6).

All the links of each middle switch element with the bandwidth y are $$\Sigma_{1 \le j \le r_2, y = s_{3,j}} n_{3,j} \le p_{4,y}$$ equation (7).

For the j-th output switch element at the output stage, $$n_{3,j} * R * k <= p_{5,j}$$ equation (8).

For the j-th output switch element at the output stage, $$n_{4,j} <= p_{6,j}$$ equation (9).

As mentioned above, depending on the switch-element implementation method, n (n>=1) links of a bandwidth s can be easily replaced with ⌈n×s/s'⌉ links of a bandwidth s' (s≠s').

Here, for the network to be non-blocking, input links at the input stage are replaced within such an extent as not to increase multiplicity; links between the input stage and the middle stage and links between the middle stage and the output stage are replaced within such an extent as not to reduce multiplicity; and output links at the output stage are replaced within such an extent as not to increase multiplicity.

The input links at the input stage, the input links at the middle stage, the output links at the middle stage, and output links at the output stage are normalized within the above-described extents with the bandwidth $s_1$, the bandwidth $s_2$, the bandwidth $s_3$, and the bandwidth $s_4$, respectively, to derive solutions. They may then be normalized again with different bandwidths.

In the case where the bandwidths of the links at the middle stage are normalized, equations (6) and (7) correspond to equations (10) and (11) below.

For each middle switch element, the equation (10) is derived.

$$\Sigma_{1 \le i \le r_1}[n_{2,i} \times s_{2,i}/s_2] \le \Sigma[p_{3,x} \times x/s_2]$$ equation (10)

For each middle switch element, the equation (11) is derived.

$$\Sigma_{1 \le j \le r_2}[n_{3,j} \times s_{3,j}/s_3] \le \Sigma[p_{4,y} \times y/s_3]$$ equation (11)

Among these variables, $s_{1,i}$, $s_{2,i}$, $s_{3,j}$, $s_{4,j}$, $p_{1,i}$, $p_{2,i}$, $p_{3,x}$, $p_{4,y}$, $p_{5,j}$, and $p_{6,j}$ are each determined by the constraints on the switch element used and a bandwidth dependent on the bandwidth of an input stream, and has a finite number of choices. The upper limits of $n_{1,i}$ and $n_{4,j}$ are determined by $p_{1,i}$ and $p_{6,j}$ from equations (4) and (9), respectively. The upper limits of R, k, $n_{2,i}$ and $n_{3,j}$ are determined by $p_{2,i}$ and $p_{5,j}$ from the constraints of equations (5) and (8). The upper limits of $r_1$ and $r_2$ are determined by $p_{3,x}$ and $p_{4,y}$, from equations (6) and (7). Thus, there are finite sets of possible values. The upper limit of $d_{1,i}$ is determined by the bandwidth of an input stream, $n_{1,i}$, $s_{1,i}$, and equation (1). The upper limits of $d_{2,i}$ and $d_{3,j}$ are determined by the bandwidth of an input stream, $n_{2,i}$, $n_{3,j}$, $s_{2,i}$, and $s_{3,j}$. The upper limit of $d_{4,j}$ is determined by the bandwidth of an input stream, $n_{4,j}$, $s_{4,j}$ and equation (2).

Thus, with equations (1) to (9), sets of {$n_{1,i}$, $n_{2,i}$, $n_{3,j}$, $n_{4,j}$, $d_{1,i}$, $d_{2,i}$, $d_{3,j}$, $d_{4,j}$, $r_1$, $r_2$, m} that satisfy all the conditions can be found by performing a search a finite number of times.

Next, description will be given of an embodiment of a multicast switching system configured by integrating the function of an input stage and the function of an output stage into a single switch element by using a switch element capable of bidirectional transmission.

In this case, various sets of variables used in the embodiment shown in FIG. 4 can be translated into common variables. Specifically, the input switch elements and the output switch elements are configured as common input-output switch elements, so that the number of input-output switch elements is r=max($r_1$,$r_2$). The input links and the output links are configured as common input-output links, so that the number of input-output links is $n_i$=max($n_{1,i}$,$n_{4,j}$), the multiplicity is $d_i$=max($d_{1,i}$,$d_{4,j}$), and further $s_i$=$s_{1,i}$=$s_{4,j}$, $p_{1,i}$=$p_{6,j}$, and $p_{2,i}$=$p_{5,j}$. The input links and the output links at the middle stage are configured as common bidirectional connection links, so that the number of connection links is $n'_i$=$n_{2,i}$=$n_{3,j}$, $s'_i$=$s_{2,i}$=$s_{3,j}$, $d'_i$=$d_{2,i}$=$d_{3,j}$, and $p_{3,x}$=$p_{4,y}$. Further, for each input-output switch element, the sum of the number of input-output links and the number of connection links is equal to the number $p_i$ of all links of the switch and thus $p_i$=$p_{1,i}$+$p_{2,i}$.

Figure 5:
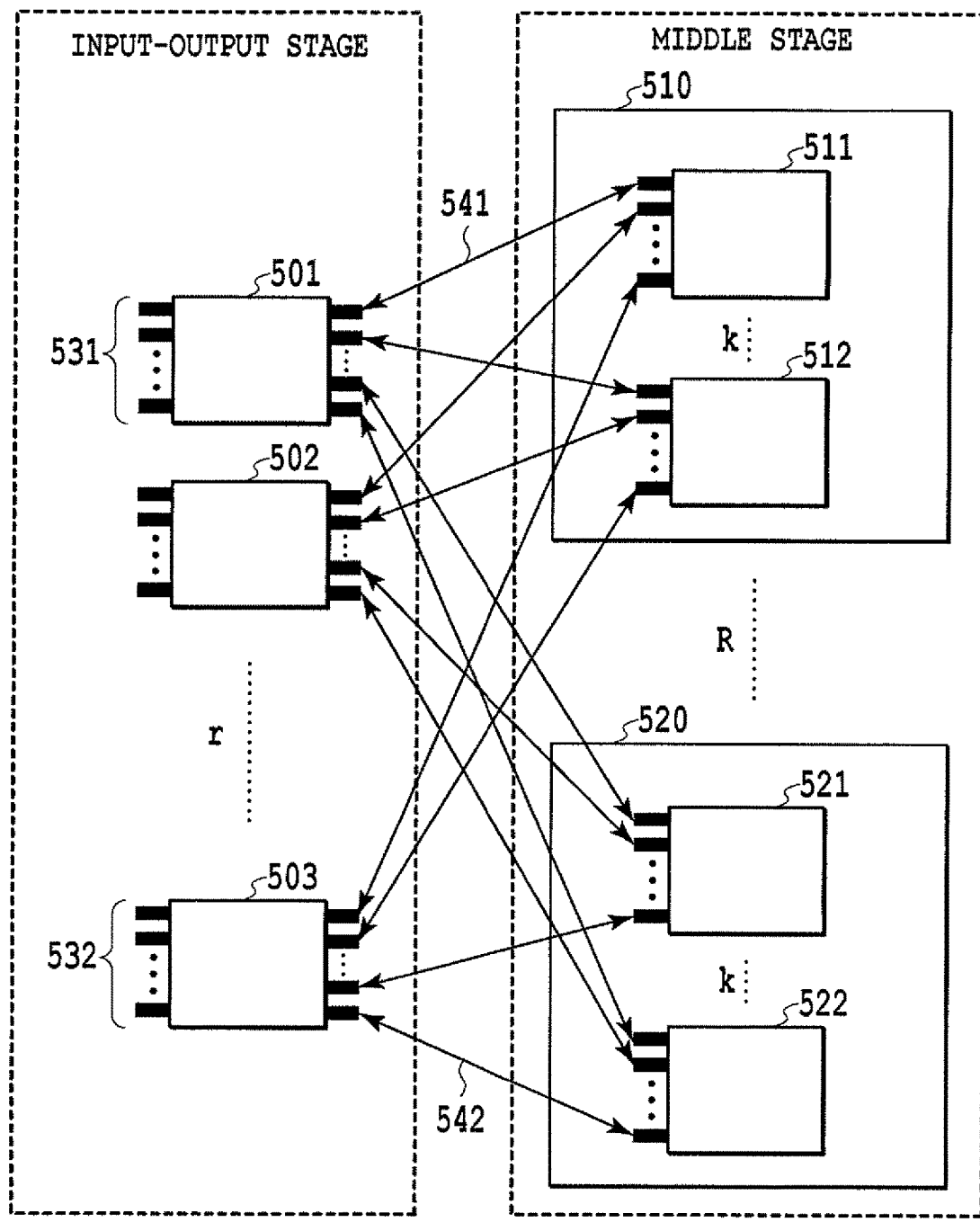
FIG. 5 is a diagram showing an example of a network configuration configured by forming the Clos-type network configuration shown in FIG. 4 by using switch elements including bidirectional links.

FIG. 5 shows the embodiment in which the function of an input stage and the function of an output stage are integrated into a single switch element by using a switch element capable of bidirectional transmission, as described above.

The input-output stage includes r input-output switch elements 501, 502, and 503. The input-output switch elements 501, 502, and 503 are switch elements configured by integrating the input switch elements 401, 402, and 403 and the output switch elements 431, 432, and 433, shown in FIG. 4, respectively. The input links 441, shown in FIG. 4, are integrated with the output links 471 into input-output links 531 capable of bidirectional transmission. Likewise, the input links 442, shown in FIG. 4, are integrated with the output links 472 into input-output links 532.

A group 510 corresponds to the group 410, shown in FIG. 4, and middle switch elements 511 and 512 in the group 510 correspond to the middle switch elements 411 and 412, shown in FIG. 4. A group 520 corresponds to the group 420, shown in FIG. 4, and middle switch elements 521 and 522 in the group 520 correspond to the middle switch elements 421 and 422, shown in FIG. 4. The input link 451 at the middle stage, shown in FIG. 4, is integrated with the output link 461 at this middle stage into a switch-to-switch connection link 541 in FIG. 5. The input link 452 at the middle stage, shown in FIG. 4, is integrated with the output link 462 at this middle stage into a switch-to-switch connection link 542.

Here, in the case of performing the above-mentioned translation of sets of variables into common variables, equations (5) and (8) among the above-mentioned conditional equations are identical. From equations (4) and (9), $n_i$=max ($n_{1,i}$,$n_{4,j}$)<=$p_{1,i}$ (=$p_{6,j}$) is derived. With an equation $n_i + n_{2,i}*R*k <= p_{1,i} + p_{2,i} = p_i$, which is derived by adding both sides of equation (5) to the above derived equation, new equations (12) to (16) below are derived. Here, a new variable $p'_x = p_{3,x}$ is used.

For the i-th input-output switch element at the input-output stage, $$n_{1,i}*s_i <= k*n'_i*s'_i, \text{ and } d_{1,i} <= k*d'_i \qquad \text{equation (12)}$$

For the i-th input-output switch element at the input-output stage, $$n_{4,j}*s_i <= R*n'_i*s'_i, \text{ and } d_{4,j} <= R*d'_i \qquad \text{equation (13)}.$$

The input-output stage as a whole is $$\Sigma_{1 \le i \le r}(n_i \times s_i) \ge \Sigma_{1 \le i \le r}(n'_i \times s'_i)$$

and $$\Sigma_{1 \le i \le r} d_i \ge \Sigma_{1 \le i \le r} d'_i \qquad \text{equation (14)}.$$

For the i-th input-output switch element at the input-output stage, $$n_i + n'_i * R * k <= p_i \qquad \text{equation (15)}$$

All the links of each middle switch element with the bandwidth x are $$\Sigma_{1 \le i \le r, x = s'_i} n'_i \le p'_x \qquad \text{equation (16)}.$$

As in equations (1) to (9), sets of $\{n_{1,i}, n'_{2,i}, n'_i, d_{1,i}, d_{2,i}, d'_i, r, m\}$ that satisfy all the conditions of equations (12) to (16) can be found by performing a search a finite number of times.

Also, as mentioned above, depending on the switch-element implementation method, $n_1$ ($n_1 >= 1$) links of a bandwidth $s_1$ can be easily replaced with $\lceil n_1 \times s/s_2 \rceil$ links of a bandwidth $s_2$ ($s_1 \neq s_2$).

Here, for the network to be non-blocking, input-output links at the input-output stage are replaced within such an extent as not to increase multiplicity. Links between the input-output stage and the middle stage are replaced within such an extent as not to reduce multiplicity.

The input-output links at the input-output stage and the links between the input-output stage and the middle stage are normalized within the above-described extents with the bandwidth s and the bandwidth s', respectively, to derive solutions. They may then be normalized again with different bandwidths. In the case where the normalization with the bandwidth s' is performed, equation (16) corresponds to equation (17) below.

For each middle switch element, the equation (17) is derived.

$$\Sigma_{1 \le i \le r} \lceil n'_i \times s'_i/s \rceil \le \Sigma_x \lceil p'_x \times x/s' \rceil \qquad \text{equation (17)}$$

Generally, it is easy to set a bandwidth limitation to make the upper-limit bandwidth smaller than the bandwidth of a physical link. Then, in a case where the numbers of input links and output links used by an input-output switch element differ from each other ($n_{1,i} \neq n_{4,j}$), it is also possible to independently handle the input and the output of the input-output links and normalize the links of a smaller total bandwidth with a bandwidth smaller than the bandwidth of a physical link. In a case where the physical bandwidth of an input-output link is $s_1$ and the number of links used in outputting streams is smaller, that is, $n_{1,i} > n_{4,j}$, an output-link bandwidth limitation $s_2$ ($s_1 > s_2$) may be applied and the number of input links used may be increased to be $n_{1,i} \ge \lceil n_{4,j} \times s_1/s_2 \rceil$ within such an extent as not increase the multiplicity $d_{4,j}$.

On the other hand, in a case where the number of links used in inputting streams is smaller, that is, $n_{1,i} < n_{4,j}$, an input-link bandwidth limitation $s_2$ ($s_1 > s_2$) may be applied and the number of output links used may be set to be $n_{4,j} \ge \lceil n_{1,i} \times s_1/s_2 \rceil$ within such an extent as not increase the multiplicity $d_{1,i}$.

A path selection method in the present invention will be described below. This path selection method is implemented on the network configuration described with reference to FIG. 4.

First, for the following description, identification numbers are given to the middle switch elements in the present invention. Since the middle stage includes R ($R >= 1$) groups of k ($k >= 1$) middle switch elements, there are a countable number of middle switch elements. Thus, identification numbers z ($m >= z >= 1$) can be given to the middle switch elements according to any rules. Here, the identification number of the y-th ($k >= y >= 1$) middle switch element belonging to a group x ($R >= x >= 1$) will be denoted as M(x,y).

Identification numbers may be given to the middle switch elements such that the middle switch elements are numbered individually for each input switch element. In this case, the identification number of each middle switch element is denoted as M(i,x,y) with an input-switch-element identification number i. Such numbering does not at all affect the guaranteeing of the non-blocking operation as mentioned above. The numbering does not at all affect equations (1) to (11) either. In the following, even if all the input switch elements use the same map for giving identification numbers to the middle switch elements, the identification numbers of the middle switch elements will be denoted below as M(i, x,$y_x$).

Next, the denotations of the groups at the middle stage are defined for each input switch element.

As mentioned above, identification numbers may be given to the middle switch elements such that the middle switch elements are numbered individually for each input switch element. Examples of this are shown in table 1 and table 2. Table 1 is a table showing an example where a middle-switch-element identifier M(x,y) (the y-th middle switch element in the x-th group) is allocated to the z-th middle switch element (MS-z). Table 2 is a table showing an example where a middle-switch-element identifier M(i,x,y) is allocated to the z-th middle switch element.

Table 1 shows a case where R=3 and k=3, and each entry indicates a middle-switch-element identifier M(x,y) (the y-th middle switch element in the x-th group). In table 1, each column indicates nine middle switch elements and their sequential positions (the z-th middle switch element is expressed as MS-z), while each row indicates middle switch elements in relation to ten input switch elements (or input-output switch elements) (IS-1 . . . IS-10). For all the input (input-output) switch elements, the middle switch element MS-1 is allocated as the first middle switch element in the group 1, and the middle switch element MS-2 is allocated as the second middle switch element in the group 1. The subsequent middle switch elements are allocated in the same manner such that the middle switch element MS-9 is allocated as the third middle switch element in the group 3.

TABLE 1

Allocation of Middle-Switch-Element Identifier M(x,y)
to z-th Middle Switch Element (MS-z)

|      | IS-1   | IS-2   | IS-3   | IS-4   | IS-5   | IS-6   | IS-7   | IS-8   | IS-9   | IS-10  |
|------|--------|--------|--------|--------|--------|--------|--------|--------|--------|--------|
| MS-1 | M(1,1) | M(1,1) | M(1,1) | M(1,1) | M(1,1) | M(1,1) | M(1,1) | M(1,1) | M(1,1) | M(1,1) |
| MS-2 | M(1,2) | M(1,2) | M(1,2) | M(1,2) | M(1,2) | M(1,2) | M(1,2) | M(1,2) | M(1,2) | M(1,2) |
| MS-3 | M(1,3) | M(1,3) | M(1,3) | M(1,3) | M(1,3) | M(1,3) | M(1,3) | M(1,3) | M(1,3) | M(1,3) |
| MS-4 | M(2,1) | M(2,1) | M(2,1) | M(2,1) | M(2,1) | M(2,1) | M(2,1) | M(2,1) | M(2,1) | M(2,1) |
| MS-5 | M(2,2) | M(2,2) | M(2,2) | M(2,2) | M(2,2) | M(2,2) | M(2,2) | M(2,2) | M(2,2) | M(2,2) |
| MS-6 | M(2,3) | M(2,3) | M(2,3) | M(2,3) | M(2,3) | M(2,3) | M(2,3) | M(2,3) | M(2,3) | M(2,3) |
| MS-7 | M(3,1) | M(3,1) | M(3,1) | M(3,1) | M(3,1) | M(3,1) | M(3,1) | M(3,1) | M(3,1) | M(3,1) |
| MS-8 | M(3,2) | M(3,2) | M(3,2) | M(3,2) | M(3,2) | M(3,2) | M(3,2) | M(3,2) | M(3,2) | M(3,2) |
| MS-9 | M(3,3) | M(3,3) | M(3,3) | M(3,3) | M(3,3) | M(3,3) | M(3,3) | M(3,3) | M(3,3) | M(3,3) |

On the other hand, in table 2, the above-described identifier allocation differs by the input (input-output) switch element, and the middle switch elements for the i-th input switch element are expressed as M(i,x,y). For the input switch element IS-1, the middle switch elements {MS-1, MS-2, MS-3} are allocated to the group 1, the middle switch elements {MS-4, MS-5, MS-6} are allocated to the group 2, and the middle switch elements {MS-7, MS-8, MS-9} are allocated to the group 3. For the input switch element IS-2, the middle switch elements {MS-2, MS-3, MS-4} are allocated to the group 1, the middle switch elements {MS-5, MS-6, MS-7} are allocated to the group 2, and the middle switch elements {MS-8, MS-9, MS-1} are allocated to the group 3. The middle switch elements allocated to the input switch elements IS-1 to IS-9 are all different, whereas the middle switch elements allocated to the input switch element IS-10 are the same as the middle switch elements allocated to the input switch element IS-1. Even in this case, all the inputs have R=3 redundant paths, so that the non-blocking operation is guaranteed.

TABLE 2

Allocation of Middle-Switch-Element Identifier
M(i,x,y) to z-th Middle Switch Element (MS-z)

|      | IS-1     | IS-2     | IS-3     | IS-4     | IS-5     | IS-6     | IS-7     | IS-8     | IS-9     | IS-10     |
|------|----------|----------|----------|----------|----------|----------|----------|----------|----------|-----------|
| MS-1 | M(1,1,1) | M(2,3,3) | M(3,3,2) | M(4,3,1) | M(5,2,3) | M(6,2,2) | M(7,2,1) | M(8,1,3) | M(9,1,2) | M(10,1,1) |
| MS-2 | M(1,1,2) | M(2,1,1) | M(3,3,3) | M(4,3,2) | M(5,3,1) | M(6,2,3) | M(7,2,2) | M(8,2,1) | M(9,1,3) | M(10,1,2) |
| MS-3 | M(1,1,3) | M(2,1,2) | M(3,1,1) | M(4,3,3) | M(5,3,2) | M(6,3,1) | M(7,2,3) | M(8,2,2) | M(9,2,1) | M(10,1,3) |
| MS-4 | M(1,2,1) | M(2,1,3) | M(3,1,2) | M(4,1,1) | M(5,3,3) | M(6,3,2) | M(7,3,1) | M(8,2,3) | M(9,2,2) | M(10,2,1) |
| MS-5 | M(1,2,2) | M(2,2,1) | M(3,1,3) | M(4,1,2) | M(5,1,1) | M(6,3,3) | M(7,3,2) | M(8,3,1) | M(9,2,3) | M(10,2,2) |
| MS-6 | M(1,2,3) | M(2,2,2) | M(3,2,1) | M(4,1,3) | M(5,1,2) | M(6,1,1) | M(7,3,3) | M(8,3,2) | M(9,3,1) | M(10,2,3) |
| MS-7 | M(1,3,1) | M(2,2,3) | M(3,2,2) | M(4,2,1) | M(5,1,3) | M(6,1,2) | M(7,1,1) | M(8,3,3) | M(9,3,2) | M(10,3,1) |
| MS-8 | M(1,3,2) | M(2,3,1) | M(3,2,3) | M(4,2,2) | M(5,2,1) | M(6,1,3) | M(7,1,2) | M(8,1,1) | M(9,3,3) | M(10,3,2) |
| MS-9 | M(1,3,3) | M(2,3,2) | M(3,3,1) | M(4,2,3) | M(5,2,2) | M(6,2,1) | M(7,1,3) | M(8,1,2) | M(9,1,1) | M(10,3,3) |

TABLE 3

Allocation of y-th Middle Switch Elements in All Groups
to z-th Middle Switch Elements (MS-z)

|      | IS-1 | IS-2 | IS-3 | IS-4 | IS-5 | IS-6 | IS-7 | IS-8 | IS-9 | IS-10 |
|------|------|------|------|------|------|------|------|------|------|-------|
| MS-1 | 1    | 3    | 2    | 1    | 3    | 2    | 1    | 3    | 2    | 1     |
| MS-2 | 2    | 1    | 3    | 2    | 1    | 3    | 2    | 1    | 3    | 2     |
| MS-3 | 3    | 2    | 1    | 3    | 2    | 1    | 3    | 2    | 1    | 3     |
| MS-4 | 1    | 3    | 2    | 1    | 3    | 2    | 1    | 3    | 2    | 1     |
| MS-5 | 2    | 1    | 3    | 2    | 1    | 3    | 2    | 1    | 3    | 2     |
| MS-6 | 3    | 2    | 1    | 3    | 2    | 1    | 3    | 2    | 1    | 3     |
| MS-7 | 1    | 3    | 2    | 1    | 3    | 2    | 1    | 3    | 2    | 1     |
| MS-8 | 2    | 1    | 3    | 2    | 1    | 3    | 2    | 1    | 3    | 2     |
| MS-9 | 3    | 2    | 1    | 3    | 2    | 1    | 3    | 2    | 1    | 3     |

Meanwhile, in the following, a set of the y-th delivery destinations in all the groups for the i-th input switch element will be expressed as D (i,y), and the number of elements in D (i,y) will be expressed as |D(i,y)|. In table 3, In table 2, for the i-th input switch element, the y-th middle switch element in the x-th group is allocated as M (i,x,y) to indicate the input-switch-element number i and the group number x. However, the group numbers may be allocated independently for each input switch element according to any rules. For example, for IS-1, the first middle switch elements in the groups {M(1,1,1), M(1,2,1), M(1,3,1)} are allocated to a set of middle switch elements {MS-1, MS-4, MS-7}, but which switch to allocate to which group may be determined according to any rules.

Then, the input-switch-element number i and the group number x can be omitted from table 2, so that only the number y is shown as the y-th middle switch element in each group. In this case, table 2 is simplified and presented as shown in table 3.

D(i,y) is equivalent to a set of middle switch elements with the same number (y) in the i-th column. For example, D(1,1) is a set of the first middle switch elements in all the groups for the input switch element IS-1, and is therefore a set of the middle switch elements with the number 1 in the IS-1 column, that is, D(1,1)={MS-1, MS-4, MS-7}. In the following, for the sake of indication, "MS-" is omitted, so that the above case is expressed as D(1,1)={1,4,7}. Likewise, D(1,2)=(2,5,8), D(1,3)={3,6,9}, D(2,1)={2,5,7}, D(2,2)={3, 6,9}, . . . , and D(10,3)={3,6,9}. Thus, in table 3, only three types of D(i,y), namely {1,4,7}, {2,5,8}, and {3,6,9} are present, and |D(i,y)|=3 for all combinations of i and y.

Next, the denotations of the input links and the output links of each switch element will be defined.

In accordance with the above-described definitions, the i-th switch element at the input stage receives in total $d_{1,i}$ streams through $n_{1,i}$ input links of the bandwidth $s_{1,i}$. Since these streams are a countable number of streams, each stream can be given an identification number $a_1$ ($d_{1,i}>=a_1>=1$) based on any one-to-one map, and is denoted as $I_1(i,a_1)$. Also, this i-th input switch element at the input stage transmits in total $d_{2,i}$ streams through $n_{2,i}$ output links of the bandwidth $s_{2,i}$ to the z-th middle switch element at the middle stage. Since these streams are a countable number of streams, each stream can be given an identification number $a_2$ ($d_{2,i}>=a_2>=1$) based on any one-to-one map, and is denoted as $I_2(i,z,a_2)$.

Likewise, the j-th switch element at the output stage receives in total $d_{3,j}$ streams through $n_{3,j}$ input links of the bandwidth $s_{3,j}$ from the z-th switch at the middle stage. Since these streams are a countable number of streams, each stream can be given an identification number $a_3$ ($d_{3,j}>=a_3>=1$) based on any one-to-one map, and is denoted as $O_1(z,j,a_3)$. Also, this j-th switch element at the output stage outputs in total $d_{4,j}$ streams through $n_{4,j}$ output links of the bandwidth $s_{4,j}$. Since these streams are a countable number of streams, each stream can be given an identification number $a_4$ ($d_{4,j}>=a_4>=1$) based on any one-to-one map, and is denoted as $O_2(j,a_4)$.

As one embodiment of a control device that performs path setting for the network in the present invention, a control device capable of controlling all the switch elements may be installed outside the switch elements. In this case, in response to a command from the control device, the input switch elements perform routing to determine the middle switch elements in each group at the middle stage to which to transmit streams. Also, in response to a command from the control device, the middle switch elements and/or the output switch elements perform routing to determine the groups from which to transmit streams from the input stage to the output stage.

In another embodiment, a later-described routing process at the input stage may be performed automatically and statically in advance, for example after an apparatus is powered on, and a control device that performs path setting may be connected only to the middle switch elements and the output switch elements and control them. In this case, in response to a command from the control device, only the middle switch elements and/or the output switch elements perform routing to determine the groups from which to transmit streams from the input stage to the output stage.

In a still another embodiment, each output switch element may receive only a request for multicast to that output switch element's output links, select a middle switch element based on the result of the routing process at the input stage, and transmit a connection request to that middle switch element. In this way, the mechanism of a control device can be distributed in switch elements.

The routing process at the input stage in the path selection method in the present invention will be described below.

In the routing process at the input stage, that is, path setting at each input switch element, for an input stream $I_1(i,a_1)$ into the i-th input switch element at the input stage, paths may be allocated which lead to all the groups x at the middle stage and which are uniquely determined by $\{y_x,a_2,x\}$ ($k>=y_x>=1$, $d_{2,i}>=a_2,x>=1$) for each group x. The stream may then be transmitted according to the allocation. This can be expressed as a map as below for every $(i,a_1)$.

$$I_1(i,a_1) \rightarrow \{I_2(i,M(i,1,y),a_{2,1}), I_2(i,M(i,2,y_2),a_{2,2}), \ldots, I_2(i,M(i,R,y_R),a_{2,R})\}$$

A set of all the relations between the input and output streams at the i-th input switch element at the input stage as described above will be referred to as $FI_i$. Here, the total number of input streams is $d_{1,i}$, which is the upper limit of $a_1$. $d_{1,i}$ is guaranteed to be smaller than $d_{2,i}$, or the number of paths $\{y_x, a_{2,x}\}$ for all the groups x, from equations (1) and (12) and the definitions as mentioned above. Then, by selecting appropriate paths $\{y_x, a_2, x\}$ to distribute input streams among switch elements, this routing process always succeeds.

The above-described routing process at the input stage is not dependent on multicast connection requests at the output stage. The above-described routing process at the input stage is not dependent on the states of the other input switch elements either. For this reason, the routing process at the input stage can be separate from the routing process at the middle stage and the output stage. It is also possible to set the map for the input stage in advance, and perform path setting only with operations on the middle stage and the output stage at the time of transmission. Removal of a path is similar and may be done by removing only path settings at the output stage and the middle stage as necessary. This feature reduces the amount of operation for path switching and shortens the time required for path switching.

Further, for the same reason, as one embodiment, a control mechanism that performs the routing process at the input stage may be installed in each input switch element. In another embodiment, the routing process at the input stage may be implemented by a control device installed outside the input switch elements.

In a still another embodiment, the result of the routing process at the input stage may be managed in a routing table equivalent to the above description. In this case, stream routing is performed based on this routing table, and the routing table is updated every time routing is performed. In a yet still another embodiment, the routing process at the input stage may be performed with a one-to-one map using cyclic allocation, remainder calculation, or the like based on the identification numbers of the input switch elements and the identification numbers of the input streams. When the result of the routing is needed, the correspondences may be derived through re-calculation using the same calculation formula.

The routing process at the output stage in the path selection method in the present invention will be described below.

The routing process at the output stage is a process of setting paths at the middle stage and the output stage. In response to a given target multicast request here, an input stream $I_1(i,a_1)$ is associated with w ($N_2>=w>=1$) output streams $\{O_2(j_1,a_{4,1}), O_2(j_1, a_{4,2}), \ldots, O_2(j_w, a_{4,w})\}$.

Here, for the input stream $I_1(i,a_1)$, $I_2(i,z,a_2)$ as an input source is associated with u ($r_2>=u>=1$) output streams $\{O_1(z, j_1, a_{3,1}), O_1(z, j_2, a_{3,2}), \ldots, O_1(z, j_u, a_{3,u})\}$ in the z-th middle switch element at the middle stage as below.

$$I_1(i,a_1) \rightarrow I_2(i,z,a_2) \rightarrow \{O_1(z,j_1,a_{3,1}), O_1(z,j_2,a_{3,2}), \ldots, O_1(z,j_u,a_{3,u})\}$$

A set of all the relations between the input and output streams at the z-th middle switch element at the middle stage as described above will be referred to as $FM_z$.

Likewise, for the input stream $I_1(i,a_1)$, $O_1(z,j,a_3)$ as an input source is associated with $v(d_{4,j}>=v>=1)$ output streams $\{O_2(j,a_{4,1}), O_2(j,a_{4,2}), \ldots, O_2(j,a_{4,v})\}$ in the j-th switch at the output stage as below.

$$I_1(i,a_1) \rightarrow O_1(z,j,a_3) \rightarrow \{O_2(j,a_{4,1}), O_2(j,a_{4,2}), \ldots, O_2(j,a_{4,v})\}$$

A set of all the relations between the input and output streams at the j-th switch at the output stage as described above will be referred to as $FO_j$.

The routing process for a new multicast request and the routing process for an existing multicast request are practically the same. The routing process for new and existing multicast requests will be described with reference to a flowchart in FIGS. 6A to 6C.

The j-th output switch element at the output stage figures out an output link $L_O$ to be used for one output stream $O_2(j,a_4)$ to a new output destination in a multicast request from the identification number $a_4$ (step S601).

If the output streams in the set $FO_j$ that are used in the same output link have already reached the upper-limit bandwidth below which the output link $L_O$ can be accommodated, this multicast request is not accepted, and the process proceeds to step S611 (step S602).

If the set $FO_j$ includes the above-mentioned input stream $I_1(i,a_1)$ in the j-th output switch element at the output stage, the identification number $a_4$ is added to the register of the stream $I_1(i,a_1)$ (step S612), and the process proceeds to step S610.

The result of the routing process at the input stage corresponding to the input stream $I_1(i,a_1)$ is derived, and the list of middle switch elements contained in the result is extracted. For example, if the result of the routing process at the input stage is $\{I_2(i,M(i,1,y_1),a_{2,1}),\ I_2(i,M(i,2,y_2), a_{2,2})\ \ldots,\ I_2(i,M(i,R,y_R),a_{2,R})\}$, the list of middle switch elements are $\{M(i,1,y_1),\ M(i,2,y_2),\ \ldots,\ M(i,R,y_R)\}$ (step S604).

One link whose bandwidth and multiplicity have not reached the upper limits and which is therefore capable of transmission is selected for the $R*n_{3,j}$ links between the j-th output switch element at the output stage and the R middle switch elements contained in the list (step S605). Then, the identification number $M(i,x,y_x)$ of the middle switch element holding that link and the identification number $a_3$ of the output stream from the middle switch element are determined (step S606).

The j-th output switch element at the output stage newly registers, in the set $FO_j$, the fact that the input stream $I_1(i,a_1)$ is outputted as $O_2(j,a_{4,1})$ with $O_1(M(i,x,y_x),j,a_3)$ as an input source, which is indicated by the middle-switch-element identification number $M(i,x,y_x)$ and the identification number $a_3$ of the output stream from that middle switch element (step S607). Then, a setting is configured for the output from the output link $L_O$ (step S608).

In the middle switch element $M(i,x,y_x)$ selected in step S605, the results of step S603 and step S604, i.e., the fact that the input stream $I_1(i,a_1)$ has added $O_1(M(i,x,y_x),j,a_3)$ as a new output with $I_2(i,M(i,x,y_x)a_{2,x})$ as an input source (step S609) is registered in $FM_{M(i,x,y_x)}$.

Then, a setting is configured for the output of the output stream $O_1\ (M(i,x,y_x),j,a_3)$, the transmission from the output link $L_O$ is initiated, and the processing on $O_2(j,a_4)$ is terminated (step S610).

Step S601 to step S610 are executed for all the output streams in the multicast request (step S611).

In one embodiment, the sets $FM_z$ and $FO_j$ may be provided as tables in a control device outside the switch elements. In another embodiment, the sets $FM_z$ and $FO_j$ may be the same as a routing table used by packet switches. Alternatively, the set $FM_z$ may be managed in each middle switch element, and the set $FO_j$ may be managed in each output switch element.

The same is applicable to the reference to the result of the routing process at the input stage in step S604. In one embodiment, the result may be provided as a routing table in a control device outside the switches. In another embodiment, since the routing process at the input stage can be statically performed separate from the routing process at the output stage, the result may be distributed to each of the middle switch elements and the output switch elements in advance. In still another embodiment, the result may be derived through re-calculation from the identification number.

In one embodiment, the set $FO_j$ and the result of the routing process at the input stage in step S604 may be held in each of the output switch elements, thereby the processes in step S601 to step S608 may be performed for these output switch elements independently and in parallel.

In steps S607 and S608, for the current bandwidths and multiplicities of the $R*n_{3,j}$ selection-candidate links, not only the output switch element but also in the middle switch elements may hold those links included in the middle switch elements as the internal states. Then, in one embodiment, as mentioned above, not in the output switch element but in the middle switch elements $\{M(i,1,y_1),\ M(i,2,y_2),\ \ldots,\ \text{and}\ M(i,R,y_R)\}$, the identification numbers of available links and streams are selected individually, and the final selection is performed among the these lists of candidates in the output switch element. In another embodiment, the output switch element selects on candidate middle switch element, and the selected middle switch element determines the output-stream identification number $a_3$.

As for the process in step S609, in one embodiment, a control device outside the switch element may perform a routing process based on the results of steps S601 to S608. In another embodiment, no control device may be provided outside the switch elements, and the output switch element that has performed step S601 to step S608 may send a request to the corresponding middle switch element by using any communication unit, and the middle switch element itself may perform the registration. The communication unit in this case may include a dedicated communication path or use one of the links for the multicast delivery present between the output switch element and the middle switch element.

The switch elements' transmission methods used in embodiments may be used as methods of transmitting a stream from an input source to output destinations based on the results of the routing process at the input stage and the routing process at the output stage described above.

In one embodiment, an Ethernet (registered trademark) switch may be used for each switch element. In this case, for the designation of each output destination, one or both of a destination MAC address and a virtual network (VLAN) are used to designate the address. In another embodiment, an IP switch may be used. In this case, a destination IP address is used to designate the output destination. In a still another embodiment, an OpenFlow switch may be used. In this case, any packet information specified by OpenFlow may be used to designate the output destination. With a commonly-used OpenFlow switch, the output destination can be determined by using a destination MAC address, source MAC address, destination IP address, source IP address, destination TCP/UDP port number, source destination TCP/UDP port number, VLAN number, input port number, and/or the like.

In one embodiment, a commonly-used switch may be used for each switch element. In this case, the switch receives an input stream but does not often have a function of outputting the same stream through the same link a plurality of times. However, step S601 to step S607 are not affected by such a constraint. Also, in the above steps, a given input stream is transmitted from a given middle switch element to a given output switch element by at least one transmission. Thus, the above constraint does not obstruct the implementation of the present invention.

In another embodiment, a commonly-used Ethernet (registered trademark) switch may be used for each switch element. In this case, the switch receives a given input stream but does not often have a function of outputting it through the same link (loopback delivery). However, step S601 to step S607 are not affected by such a constraint. Even when each switch element has such a constraint and an input switch element and an output switch element for a given input stream are the physically identical i-th switch element at an input-output stage, the input stream can always be transmitted through a middle switch element by using different physical links for the input stream into and the output stream from the middle switch element, on condition that $n'_i$ links are present for the transmission from the input stage to the middle stage and the transmission from the middle stage to the output stage and $n'_i > 1$. This is one embodiment of the condition involving selecting a physical link in step S604.

In this case, however, at the input-output switch element, the relay path from the input link to the middle stage and the relay path from the middle stage to the output link need to be isolated by means other than the destination addresses to avoid looping of the stream from the middle stage back to the middle stage again. In the embodiment using Ethernet (registered trademark) switches, in such a case, mutually different VLANs or virtual networks similar thereto can be allocated to the relay paths to isolate them. In the embodiment using OpenFlow switches, a rule requiring indication of the input port at the time of designating the path to the output destination can be created. Flows having the same destination addresses can be handled as different flows.

In one of the embodiment in which an input switch element and an output switch element are integrated to mount a physically identical switch element, the set $FI_i$ of the relations between input and output streams at the input stage in the routing process at the input stage and the set $FO_i$ of the relations between input and output streams at the output stage in the routing process at the output stage may be managed as a single set $FIO_i$ of the relations between input and output streams. In one embodiment of such a case in which an input stream $I_1(i,a_1)$ into an input-output switch element is to be outputted from the same switch element, the stream may not be transmitted through a middle switch element but its output stream $O_2(i,a_4)$ may be directly outputted. In this case, the map in $FIO_i$ for the input stream $I_1(i,a_1)$ is defined in such a way as to include R output streams $I_2$ to the middle stage and zero or more output streams $O_2$ to output links.

Also, in one embodiment in which an input switch element and an output switch element are integrated to mount a physically identical switch element, it is possible to make a choice for given input streams between transmission always through the middle stage or transmission bypassing the middle stage on condition that the output destination is the same input-output switch element. Thus, inputs for which low-delay transmission is desired may use a bypass whereas inputs for which variations in delay are desired to be small may always be passed through the middle stage, which makes it possible to level the numbers of switch elements through which inputs are passed.

Figure 7:
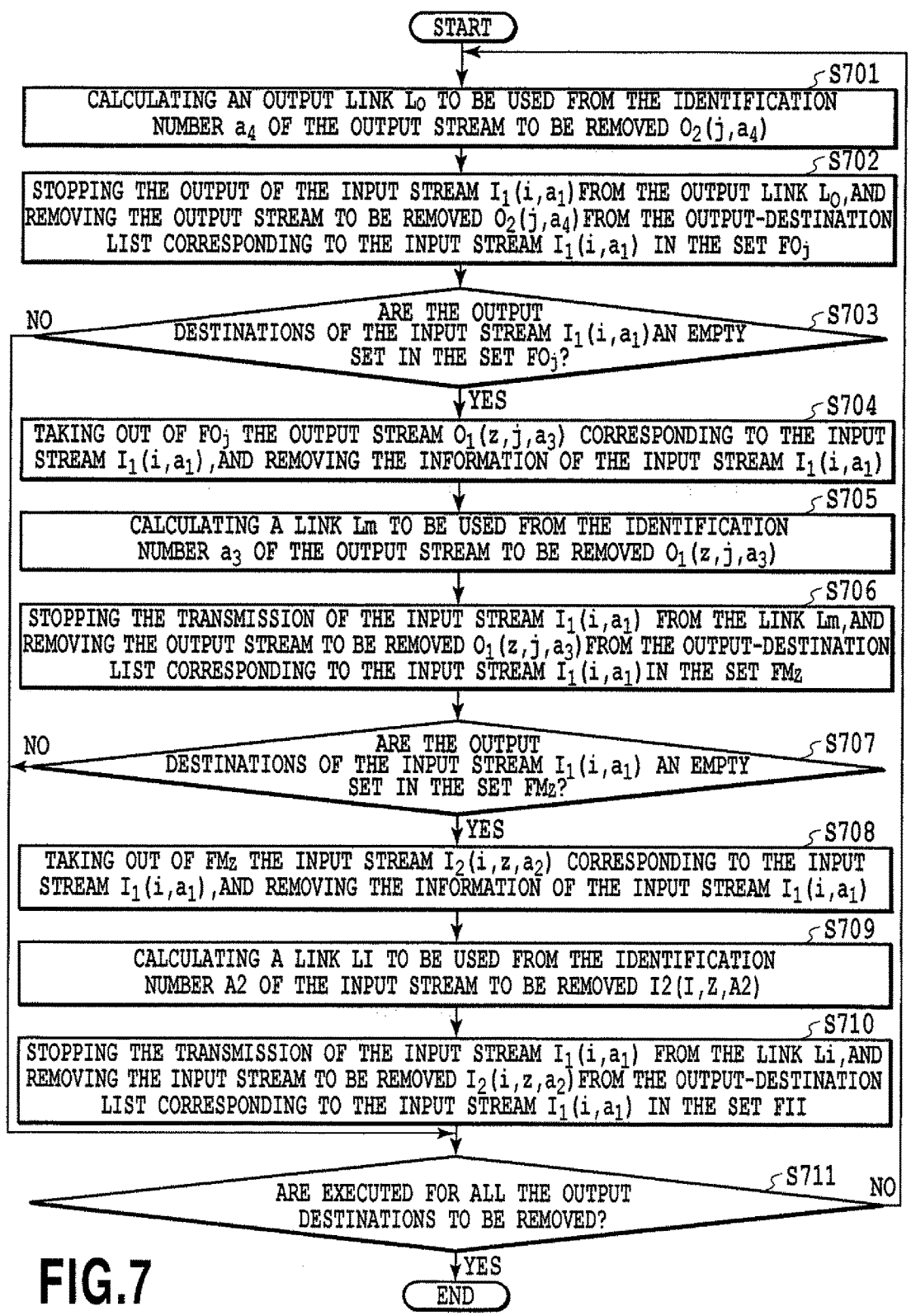
FIG. 7 is a flowchart showing a process of removing a multicast path according to the one embodiment of the present invention.

A removal process for removing a multicast path based on the path selection method in the present invention will be described with reference to a flowchart in FIG. 7.

A removal process at the output stage is a process of removing a given number of output streams from a given target multicast request, that is, from $w(N_2 >= w >= 1)$ output streams $\{O_2(j_1,a_{4,1}), O_2(j_2,a_{4,2}), \ldots, O_2(j_w,a_{4,w})\}$ associated with an input stream $I_1(i,a_1)$, and is set to be performed on the output stage, the middle stage, and the input stage in this order.

Here, the output stream to be removed is $O_2(j,a_4)$, and the sets $FO_j$, $FM_z$, and $FI_j$ have been defined, as in the routing process.

The j-th output switch element at the output stage calculates an output link $L_O$ to be used from the identification number $a_4$ of the output stream to be removed $O_2(j,a_4)$ (step S701). Then, the j-th output switch element stops the output of the input stream $I_1(i,a_1)$ from the output link $L_O$, and removes the output stream to be removed $O_2(j,a_4)$ from the output-destination list corresponding to the input stream $I_1(i,a_1)$ in the set $FO_j$ (step S702).

If the output destinations of the input stream $I_1(i,a_1)$ are not an empty set in the set $FO_j$ (step S703), the process proceeds to step S711.

If the output destinations of the input stream $I_1(i,a_1)$ are an empty set in the set $FO_j$, it means that there is no longer an output destination due to the removal. Then, the output stream $O_1(z,j,a_3)$ corresponding to the input stream $I_1(i,a_1)$ is taken out of $FO_j$, and the information of the input stream $I_1(i,a_1)$ is removed (step S704).

As for $O_1(z,j,a_3)$ in step S704, the z-th middle switch element at the middle stage calculates a link Lm to be used from the identification number $a_3$ of the output stream to be removed $O_1(z,j,a_3)$ (step S705). Then, the z-th middle switch element stops the transmission of the input stream $I_1(i,a_1)$ from the link Lm, and removes the output stream to be removed $O_1(z,j,a_3)$ from the output-destination list corresponding to the input stream $I_1(i,a_1)$ in the set $FM_z$ (step S706).

If the output destinations of the input stream $I_1(i,a_1)$ are not an empty set in the set $FM_z$ (step S707), the process proceeds to step S711.

If the output destinations of the input stream $I_1(i,a_1)$ are an empty set in the set $FM_z$, it means that there is no longer an output destination due to the removal. Then, the input stream $I_2(i,z,a_2)$ corresponding to the input stream $I_1(i,a_1)$ is taken out of $FM_z$, and the information of the input stream $I_1(i,a_1)$ is removed (step S708).

As for the input stream $I_2(i,z,a_2)$ in step S708, the i-th input switch element at the input stage calculates a link Li to be used from the identification number $a_2$ of the input stream to be removed $I_2(i,z,a_2)$ (step S709). Then, the i-th input switch element stops the transmission of the input stream $I_1(i,a_1)$ from the link Li, and removes the input stream to be removed $I_2(i,z,a_2)$ from the output-destination list corresponding to the input stream $I_1(i,a_1)$ in the set $FI_i$ (step S710).

Step S701 to step S710 are executed for all the output destinations to be removed (step S711).

In one embodiment, step S707 to step S710 may be omitted, and the output destinations of the input stream $I_1(i,a_1)$ may be an empty set in the set $FM_z$. This represents a state where the z-th middle switch element at the middle stage is receiving streams from the input stage but is discarding the streams without transmitting them. This guarantees that streams always reach the middle stage, and thus the routing process at the output stage and the routing process at the input stage described above can be separate from each other.

Solutions in the present invention will be described below through specific examples. Each of these represents one embodiment and, as has been mentioned thus far, the configuration of the present invention is not limited to the following specific numbers.

Here, an Ethernet (registered trademark) switch having link speeds of 10 Gbps and 40 Gbps is exemplarily used.

A single switch element includes up to 96 10-Gbps links and is capable of non-blocking multicast. Here, 4 particular 10-Gbps links can be replaced with 1 40-Gbps link, and the switch element can include up to 24 40-Gbps links when all the links are thus replaced. Each source uses a bandwidth of 1.5 Gbps.

The Ethernet (registered trademark) switch includes links capable of bidirectional communication. For this reason, the function of an input stage and the function of an output stage are integrated, and solutions are derived based on equations (12) to (16).

For simplicity, for the i-th input-output switch element at the input-output stage, $s_i=s'_i=10$ (Gbps) and $p_i=96$. Also, for the j-th middle switch element at the middle stage, the number of ports using 10-Gbps links is $p_{10}=96$. In this case, equations (12) to (16) are derived as below.

For the i-th input-output switch element at the input-output stage, $$n_{1,i}<=k*n'_i, \text{ and } d_{1,i}<=k*d'_i \qquad \text{equation (18)}.$$

For the i-th input-output switch element at the input-output stage, $$n_{4,j}<=R*n'_i, \text{ and } d_{4,j}<=R*d'_i \qquad \text{equation (19)}.$$

For the input-output stage as a whole, $$n_i>n'_i, \text{ and } d_i>d'_i \qquad \text{equation (20)}$$

For the i-th input-output switch element at the input-output stage, $$n_i+n'_i*R*k<=96 \qquad \text{equation (21)}.$$

For the 10-Gbps links of a middle switch element, $$r*n'_i<=96 \qquad \text{equation (21)}.$$

TABLE 4

| Number | R | k | n1 | n4 | n' | d1 | d4 | d' | r | m = (R × k) |
|---|---|---|---|---|---|---|---|---|---|---|
| 1 | 2 | 2 | 32 | 0 | 16 | 192 | 0 | 96 | 6 | 4 |
| 2 | 2 | 2 | 24 | 0 | 16 | 144 | 0 | 96 | 6 | 4 |
| 3 | 2 | 2 | 32 | 0 | 16 | 192 | 0 | 96 | 5 | 4 |
| 4 | 3 | 1 | 16 | 48 | 16 | 96 | 288 | 96 | 6 | 3 |
| 5 | 3 | 3 | 24 | 0 | 8 | 144 | 0 | 48 | 12 | 9 |
| 6 | 4 | 4 | 16 | 0 | 4 | 96 | 0 | 24 | 24 | 16 |
| 7 | 5 | 5 | 15 | 0 | 3 | 90 | 0 | 18 | 32 | 25 |
| 8 | 2 | 4 | 32 | 16 | 8 | 192 | 96 | 48 | 12 | 8 |
| 9 | 4 | 2 | 16 | 32 | 8 | 96 | 192 | 48 | 12 | 8 |

Table 4: Solutions

These solutions represent embodiments of a multicast switching system including r+m switch elements as a whole and being capable of non-blocking multicast of $(r*d_1)*(r*d_4)$ streams.

The solution indicated by number 1 represents a 1152*1152 multicast switching system including ten switch elements.

The solution indicated by number 2 represents an 864*864 multicast switching system including ten switch elements. The number of input-output links of the switch elements at the input-output stage is smaller than the solution indicated by number 1.

The solution indicated by number 3 represents a 960*960 multicast switching system including nine switches. The number of switch elements at the input-output stage is smaller than the solution indicated by number 1.

The solution indicated by number 4 represents a 576*1728 multicast switching system including nine switch elements and unequal numbers of inputs and outputs.

The solution indicated by number 5 represents a 1728*1728 multicast switching system including 21 switch elements.

The solution indicated by number 6 represents a 2304*2304 multicast switching system including 40 switch elements.

The solution indicated by number 7 represents a 2880*2880 multicast switching system including 57 switch elements. The total number of input-output links in this case is r*n=480.

The solution indicated by number 8 represents a 2304*1152 multicast switching system including 20 switch elements and unequal numbers of input links and output links.

In the solution indicated by number 9, the relations between the input links and the output links are reversed from those in the solution indicated by number 8. The solution indicated by number 9 represents a 1152*2304 multicast switching system including 20 switch elements and unequal numbers of input links and output links.

Here, in the case of using 10-Gbps links, the multiplicity per link is 6=⌊10/1.5⌋.

In the case of using 40-Gbps links, the multiplicity per link is 26=⌊40/1.5⌋.

The multiplicity of four 10-Gbps links is 24=6*4. Thus, replacing four 10-Gbps links with one 40-Gbps link increases the multiplicity. As mentioned above, this replacement may be performed on the links connected to the middle stage as appropriate. On the other hand, similar replacement may be performed on the input-output links, in which case, however, the multiplicity must be maintained at 24. Link bandwidth replacement may be performed as appropriate in the above solutions in accordance with these rules.

The following point should be noted. For the solutions indicated by numbers 1 to 6, even with $s_i=s'_i=40$ (Gbps) and $p_i=24$, the solutions can be derived similarly. In this case also, the above-mentioned link bandwidth replacement can be performed to derive equivalent solutions. On the other hand, for the solution indicated by number 7, $n'_i=3$ and therefore only a bandwidth of 30 Gbps is available between any one switch element at the middle stage and any one switch element at the input-output stage. For this reason, a solution cannot derived in the case where $s_i=s'_i=40$ (Gbps).

Next, an embodiment of the path setting will be exemplarily described by taking a solution shown in table 4 as an example.

Figure 8:
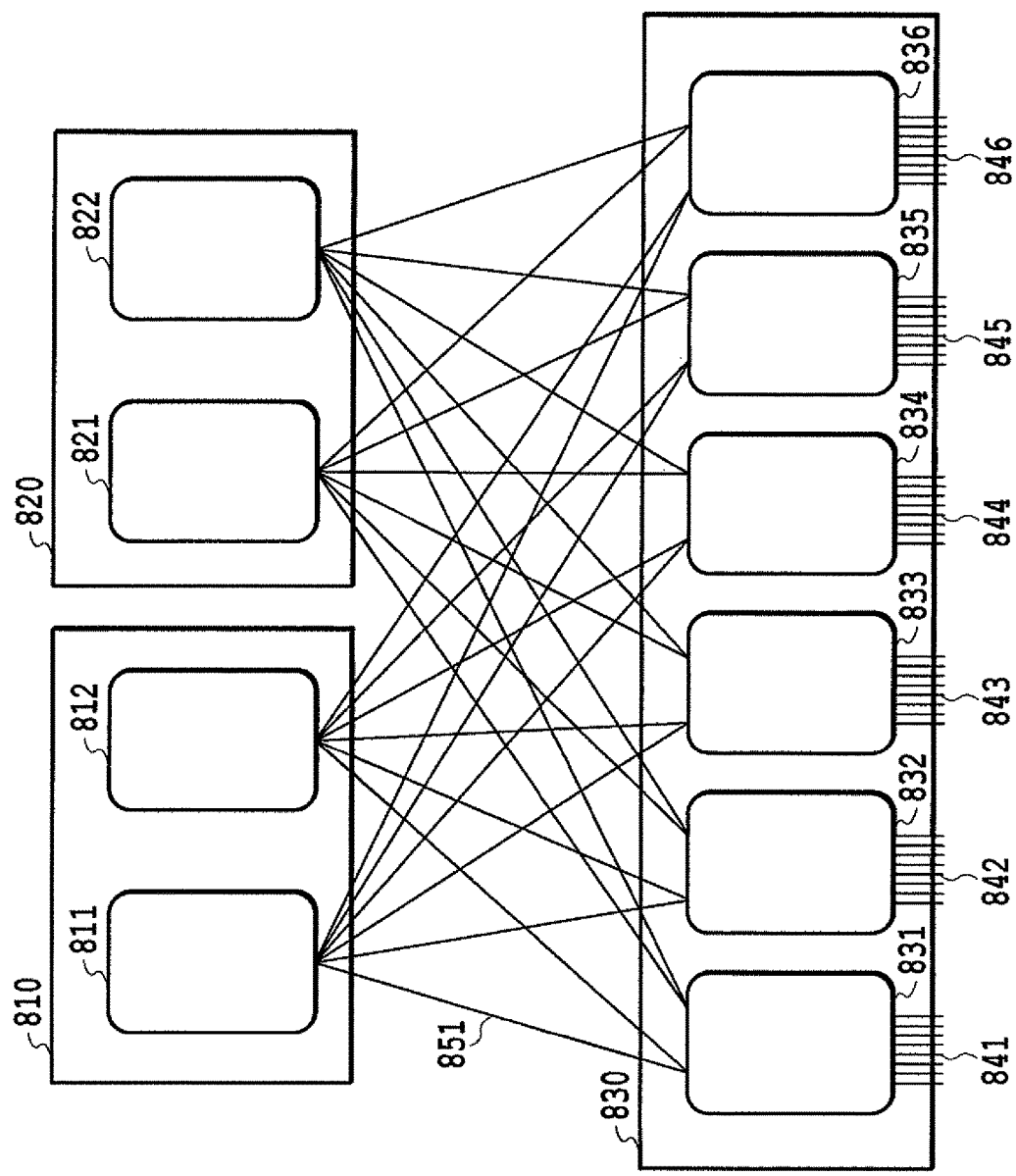
FIG. 8 is a diagram showing an example of a network configuration formed based on a solution derived according to the one embodiment of the present invention, by using 10-gigabit Ethernet (registered trademark) switches with 96 ports.

FIG. 8 shows an embodiment of a solution shown in FIG. 4. An input-output stage 830 includes r=6 input-output switch elements 831, 832, 833, 834, 835, and 836, each of which includes 96 10-gigabit Ethernet (registered trademark) links. The middle stage includes groups 810 and 820, each of which includes two middle switch elements, in total, m=4 middle switch elements 811, 812, 821, and 822. The middle switch elements 811, 812, 821, and 822 each include 96 10-gigabit Ethernet (registered trademark) links. The input-output switch elements 831 to 836 each include $n_i=32$ 10-Gbps input-output links and have a multiplicity of 6, and thus transmit in total $d_i$=192 input streams and output streams. Input sources-output destinations 841 to 846 represent sets of 192 input sources and output destinations connected to the input-output switch elements 831 to 836, respectively. At the connection between switch elements indicated by a link 851, in total $d'_i$=96 streams are transmitted through $n'_i$=16 10-Gbps connection links.

Here, in total $d_i$=192 input streams into the i-th input-output switch element (6>=i>=1) at the input-output stage are given identification numbers $a_1$ ($d_{1,i}$=192>=$a_1$>=1) based on a given one-to-one map f. In one embodiment of the map f, $a_1$=f(x,y)=6(x−1)+y is employed for the y-th input stream into the x-th (n=32>=x>=1) input link, where y is ($\lfloor 10/1.5 \rfloor$=6≥y≥1).

In another embodiment, $a_1$=f'(x,y)=x+32(y−1) is employed by changing an index order. In still another embodiment, identification numbers $a_1$ are defined in the order of the actual input of the streams into the $n_i$=32 links and a correspondence table thereof is created. Such an approach enables numbering even when the bandwidths of the streams are not constant or when the number of streams each link can accommodate is not constant.

Likewise, in total $d'_i$=96 streams defined in the connection link between the i-th input-output switch element at the input-output stage and the j-th middle switch element (m=4>=j>=1) at the middle stage are given identification number $a_2$ ($d'_i$=96>=$a_2$>=1) based on a given one-to-one map g. In one embodiment of the map g, $a_2$=g(x,y)=6(x−1)+y is employed for the y-th stream in the x-th (16>=x>=1) link, where y is ($\lfloor 10/1.5 \rfloor$=6≥y≥1)

In another embodiment, $a_2$=g'(x,y)=x+16(y−1) is employed by changing an index order. In still another embodiment, the number j of each switch element at the middle stage may be used such that different maps are selected for different switch elements at the middle stage.

Further, the above-mentioned identification numbers $a_3$ and identification numbers $a_4$ are given. These may be determined similarly to and independently of $a_1$ and $a_2$.

Next, an embodiment of the routing process at the input stage will be exemplarily described based on the above example.

In the embodiment of the solution indicated by number 1 in table 4, R=2 and k=2, and the number of middle switch in is therefore m=R*k=4. These middle switch elements are denoted as {$M_{11}$, $M_{12}$, $M_{21}$, $M_{22}$}. {$M_{11}$, $M_{12}$} belong to the same group and {$M_{21}$, $M_{22}$} belong to the same group. 192 streams $a_1$ are inputted into the i-th input-output switch element at the input-output stage. 96 streams $a_2$ are transmitted from this switch element to each of given middle switch elements. Since each group at the middle stage includes two switch elements, the 192 streams are distributed equally between these groups as 192 (=96*2) output streams. This distribution is performed for each group. To express this by using the foregoing description, the distribution is equivalent to determining {$a_2$, $a'_2$, b, b'} in the following expression.

$$I_1(i,a_1) \rightarrow \{(I_2(i,M_{1b},a_2), I_2(i,M_{2b},a'_2)\}$$

In one embodiment, a map $f_1(x,y)$=96(x−1)+y is used to define the relation as $a_1$=$f_1$(b,$a_2$), and the same map is used for each group, so that $a'_2$=$a_2$ and b'=b. In this case, if $a_1$=100, for example, the values are uniquely defined as b=b'=2 and $a_2$=$a'_2$=4. In another embodiment, a different map $f_2(x,y)$=x+2(y−1), in which an index order is changed, is used to define $a_1$ as $a_1$=$f_2$(b,$a_2$) and $a_1$=$f_2$(b',$a'_2$). In still another embodiment, a different map may be used for each group such that $a_1$=$f_1$(b,$a_2$) and $a_1$=$f_2$(b',$a'_2$). In yet still another embodiment, no map is used, and instead a correspondence table is generated and allocation is performed with it.

Next, an embodiment of the routing process at the output stage will be exemplarily described based on the above example.

In the embodiment of the solution indicated by number 1, the j-th middle switch element (m=4>=j>=1) at the middle stage transmits in total $d'_i$=96 streams through n' i=16 10-Gbps connection links to the i-th input-output switch element (r=6>=i>=1) at the input-output stage. Identification numbers $a_3$ ($d'_i$=96>=$a_3$>=1) are given to the output destinations of these streams. In one embodiment, $a_3$ uses the same map as the map for $a_2$ to associate it with the y-th stream in the x-th link as $a_3$=g(x,y).

Also, the i-th input-output switch element at the input-output stage outputs in total $d_i$=192 streams through $n_i$=32 10-Gbps input links. Identification numbers $a_4$=($d_{1,i}$=192>=$a_4$>=1) are given to the output destinations of these streams. In one embodiment, each output destination $a_4$ uses the same map as the map for $a_1$ to associate it with the y-th stream in the x-th output link as $a_4$=f(x,y).

Suppose that the input streams $I_1(i,a_1)$ as mentioned above are routed to the output destinations $a_4$ for the i-th input-output switch element at the input-output stage, i.e. $O_2(j,a_4)$, and the result of the routing process at the input stage is $I_1(i,a_1) \rightarrow \{(I_2(i,M_{1b},a_2), I_2(i,M_{2b},a'_2)\}$. In the routing at the output stage, $a_3$ is determined such that $I_1(i,a_1) \rightarrow I_2(i,M_{1b},a_2) \rightarrow O_1(M_{1b}, j,a_3) \rightarrow O_2(j,a_4)$ if the input streams $I_1(i,a_1)$ are to pass through the group 1. $a_3$ is determined such that $I_1(i,a_1) \rightarrow I_2(i,M_{2b},a'_2) \rightarrow O_1(M_{2'b},j,a'_3) \rightarrow O_2(j,a_4)$ if the input streams $I_1(i,a_1)$ are to pass through the group 2.

In one embodiment, a link $O_1$ available for $a_3$=$a'_3$=$a_4$=96 is searched for. Since 192>=$a_4$>=1, there are two streams that share the same $a_3$ and $a'_3$. However, one of them can be selected since there are also two candidate groups, as mentioned above. In another embodiment, $a_3$ and $a'_3$ may be managed in a correspondence table generated in which $a_3$ and $a'_3$ are allocated in order of reception of an allocation request. In still another embodiment, if each switch element is an Ethernet (registered trademark) switch, the link $O_1$ may be searched for using $a_3$ and $a'_3$ determined with their map's range limited such that $a_2$ and $a_3$ will not be the same physical link and $a'_2$ and $a'_3$ will not be the same physical link.

Figure 9:
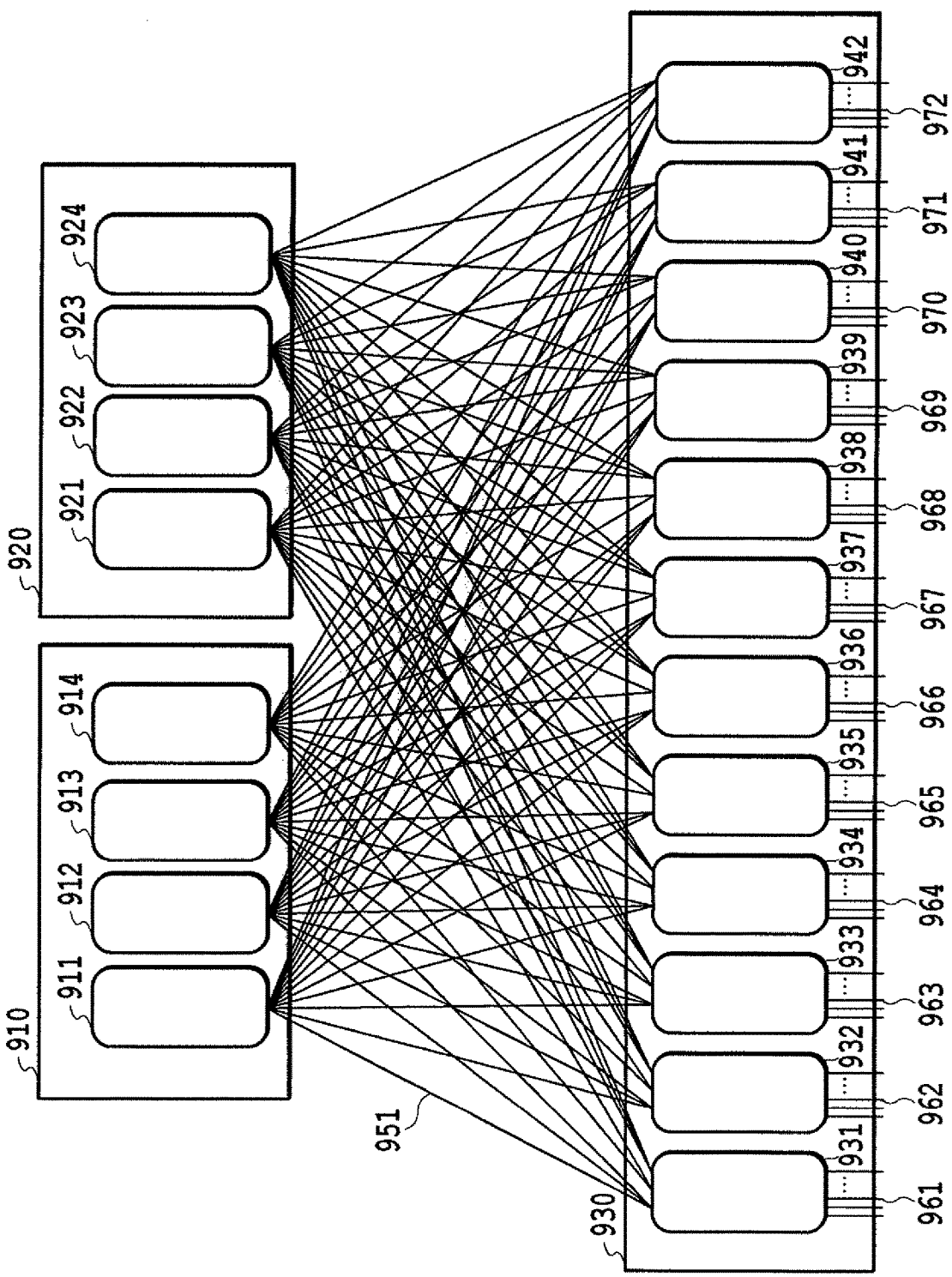
FIG. 9 is a diagram showing another example of the network configuration formed based on a solution derived according to the one embodiment of the present invention, by using 10-gigabit Ethernet (registered trademark) switches with 96 ports.

FIG. 9 shows the embodiment of the solution 8 indicated by number 8 in table 4, in which the number of input streams and the number of output streams are not equal. An input-output stage 930 includes r=12 input-output switch elements 931 to 942. The input-output switch elements 931 to 942 each include 96 10-gigabit Ethernet (registered trademark) links. The middle stage includes groups 910 and 920, each of which includes four middle switch elements, in total, m=8 middle switch elements 911 to 914 and 921 to 924. The middle switch elements 911 to 914 and 921 to 924 each include 96 10-gigabit Ethernet (registered trademark) links. The input-output switch elements 931 to 942 each include $n_i$=$n_{1,i}$=32 10-Gbps input-output links 961 to 972 each with a multiplicity of 6, and thus have in total $d_i$=$d_{1,i}$=192 input sources. On the other hand, the input-output switch elements 931 to 942 each use $n_{2,i}$=16 links as output links and thus have $d_{2,i}$=96 output destinations. At the connection between switch elements indicated by a link 951, in total $d_i$=96 streams are transmitted through $n'_i$=16 10-Gbps connection links.

16 output links of a bandwidth of 10 Gbps may be used in order to guarantee a non-blocking property at the input-output links 961 to 972. Meanwhile, the input-output switch elements 931 to 942 each include 32 input-output links capable of bidirectional transmission. Generally, a bandwidth smaller than the bandwidth of a physical link can be easily set for a link. Then, inputs and outputs may be handled independently of each other, and the ones with a smaller total bandwidth may be normalized with a bandwidth smaller than the bandwidth of a physical link. In one embodiment, the upper-limit bandwidth for the input-output links 961 to 972 may be set at 5 Gbps, and 96 output destinations may be defined using 32 physical links, for example.

Next, description will be given of a method of deriving a solution satisfying an RNB condition from a solution satisfying a WSNB condition, which is a basic configuration for the configuration described with reference to FIG. 4.

First, as described above, in relation to the configuration of a network and the routing process at the input stage under the WSNB condition, each input stream is transmitted to R groups of k middle switch elements. Each input switch element in the above case is assumed to hold unique identification numbers M(i,x,y) for identifying and selecting middle switches. Also, in the case where a given i-th input switch element selects the y-th switch element in a group x for input streams, the i-th input switch element selects the same y (k>=y>=1)-th switch element in all the groups. This correction does not conflict with the WSNB condition. Also, since each input switch element individually holds the identification numbers of the middle switch elements, freedom in grouping the middle switch elements and selecting a switch element in each group is not lost.

In the following, for the RNB condition, the routing process at the input stage, i.e. the path setting at each input switch element is performed by using the equations below, which are equivalent to equations (1) to (11). In this path setting, a set of delivery destinations D(i,y) is selected for input streams I1(i,$a_1$) into the i-th input switch element at the input stage; paths to the middle stage that are uniquely determined by {y,$a_{2,x}$} (k>=y>=1, $d_{2,i}$>=$a_{2,x}$>=1) are allocated to the middle switch elements that are the elements of the set D(i,y); and the streams are transmitted according to that allocation. This can be expressed as a map as below for every (i,$a_1$).

$$I_1(i,a_1) \rightarrow \{I_2(i,M(i,1,y),a_{2,1}), I_2(i,M(i,2,y),a_{2,2}), \ldots, I_2(i,M(i,R,y),a_{2,R})\}$$

Here, D(i,y)={M(i,1,y), M(i,2,y), . . . , M(i,R,y)}.

Now, the following delivery method is added for changing to an RNB condition.

First, a given number w (k>=w>=1) of middle switch elements are removed so that the number of middle switch elements can be m=R*k-w. For all the input switch elements, the number of deliveries to the middle stage is reduced in proportion to the number of middle switch elements removed. In this occasion, the following condition A or condition B is selected.

[Condition A]

The delivery destinations of each input stream are set to at least R middle switch elements. Here, since the total number of middle switch elements has been reduced, the number of middle switch elements that can be used in each group is reduced. Specifically, in each group, ⌈w/R⌉ middle switch elements among the k middle switch elements will not be used.

The number of input streams that can be accommodated is reduced to a number corresponding to k−⌈w/R⌉ middle switch elements.

The input switch element into which these input streams are inputted uses the middle switch elements at the first position to the k−⌈w/R⌉ position in each group of middle switch elements.

The number of elements |D(i,y)| of the set D(i,y) of the y-th middle switch elements in all the groups is at least R, and D(i,y)⊇{M(i,1,y), M(i,2,y), . . . , M(i,R,y)}, where y is now (k−⌈w/R⌉≥y≥1).

Then, for the i-th input switch element at the input stage, equation (1) is replaced with the equations below.

$$n_{1,i} \times s_{1,i} \leq (k - \lceil w/R \rceil) \times n_{2,i} \times s_{2,i} \quad \text{equation (23)}$$

$$d_{1,i} \leq (k - \lceil w/R \rceil) \times d_{2,i} \quad \text{equation (24)}$$

Also, for the i-th input switch element at the input stage, equation (5) is replaced with $$n_{2,i} * (R*k-w) <= p_{2,i} \quad \text{equation (25)}.$$

[Condition B]

The number of middle switch elements removed is applied only to the R-th group among the R groups. Specifically, in a case of delivering input streams to the first to w-th switch elements M(i,x,y) (w>=y>=1) among the k switches in each group, no input stream is delivered to the R-th group. That is, the delivery destinations of each of these input streams are R−1 middle switch elements, and only the R-th group includes k−w middle switch elements instead of k middle switch elements. For the w+1-th and the subsequent middle switch elements among the k middle switch elements in each group, input streams are delivered to all the R groups, as in the WSNB condition. Further, based on the above description, for the i-th input switch element, the set D(i,y) of the y-th middle switch elements (w>=y>=1) in all the groups is D(i,y)={M(i,1,y), M(i,2,y), . . . , M(i,R−1,y)} and the number of elements|D(i,y)| is R−1 due to the removal of the delivery destination(s). Here, it is assumed that "for every (i,y), there are at most R−1 sets D(i,y) using the same set of middle switch elements. Also, for the i-th input switch element, if the y'-th (k>=y'>w) middle switch element is present in all the groups, the set D(i,y') of the y'-th middle switch elements is D(i,y')⊇{M(i,1,y'), M(i,2,y'), . . . , M(i,R,y')} and the number of elements|D(i,y')| is at least R, as in the case before the removal. equation (1) is not changed for the groups other than the R-th group since they include k middle switch elements. However, equation (5) is replaced with equation (25).

Similarly to the procedure described in relation to the WSNB condition, the routing process at the input stage always succeeds under this condition also. Meanwhile, each output switch element satisfies the following condition C or condition D.

[Condition C]

The bandwidth of the links of the output switch element connected to an individual middle switch element ($n_{3,j}*s_{3,j}$) is compared with the maximum bandwidth max($n_{2,i}*s_{2,i}$) among the bandwidths of the connection links of all the input switch elements using the condition B to an individual middle switch element. When ($n_{3,j}*s_{3,j}$)<max($n_{2,i}*s_{2,i}$), the alternate path between the middle switch element and the output switch element is narrower than the delivery paths between the input switch elements and the middle switch elements and is therefore insufficient. Thus, the number of outputs is kept at a number taking into account R−1, or the number of delivery-destination groups under the condition B. For that output switch element, equation (2) is replaced with equation (26).

$$n_{4,j}*s_{4,j} <= (R-1)*n_{3,j}*s_{3,j}, \text{ and } d_{4,j} <= (R-1)*d_{3,j} \quad \text{equation (26)}$$

For the j-th output switch element at the output stage, since the number of middle switch elements at the middle stage has been reduced, equation (8) is replaced with $$n_{3,j}*(R*k-w) <= p_{5,j} \quad \text{equation (27)}$$

All input streams have at least R−1 alternate paths, and the bandwidth of the output from the output switch element is kept at a bandwidth that can cover all inputs from the R−1 alternate paths. Thus, an output switch element satisfying this condition C satisfies the WSNB condition (capable of non-blocking delivery without rearrangement).

[Condition D]

When $(n_{3,j}*s_{3,j}) >= \max(n_{2,i}*s_{2,i})$, equation (2) is satisfied. Also, since the number of middle switch elements at the middle stage has been reduced, the j-th output switch element at the output stage satisfies equation (27), as in the condition C.

To sum up the above conditions, a network configuration according to the present invention satisfying the RNB condition has solutions satisfying the following equations on condition that the middle stage includes $m=(R*k-w)$ $(k >= w >= 1)$ middle switch elements.

In the case of performing the routing process at the input stage according to the condition A, the i-th input switch element at the input stage satisfies $$n_{1,i} \times s_{1,i} \leq (k - \lceil w/R \rceil) \times n_{2,i} \times s_{2,i} \quad \text{equation (28)}.$$

The i-th input switch element at the input stage also satisfies $$d_{1,i} \leq (k - \lceil w/R \rceil) \times d_{2,i} \quad \text{equation (29)}$$

In the case of performing the routing process at the input stage according to the condition B, the i-th input switch element at the input stage satisfies equation (1).

When $(n_{3,j}*s_{3,j}) < \max(n_{2,i}*s_{2,i})$, the j-th output switch element at the output stage satisfies $$n_{4,j}*s_{4,j} <= (R-1)*n_{3,j}*s_{3,j}, \text{ and } d_{4,j} <= (R-1)*d_{3,j} \quad \text{equation (30)}$$

When $(n_{3,j}*s_{3,j}) >= \max(n_{2,i}*s_{2,i})$, the j-th output switch element at the output stage satisfies equation (2).

The output stage as a whole satisfies equation (3), and the i-th input switch element at the input stage satisfies equation (4). With the number of middle switch elements reduced, the i-th input switch element at the input stage satisfies equation (25).

All the links of each middle switch element with the bandwidth x satisfies equation (6), and all the links of each middle switch element with the bandwidth y satisfies equation (7). With the number of middle switch elements reduced, the j-th output switch element at the output stage satisfies equation (27).

The j-th output switch element at the output stage satisfies equation (9). In the case where each middle switch element undergoes link bandwidth normalization, the middle switch element satisfies equation (10) and equation (11).

With the condition D, whether or not non-blocking operation is achieved for all the input streams is not clear. The following lastly shows that, when all the input switch elements satisfy the condition A or B, an output switch element satisfying the condition D satisfies the RNB condition for all the input streams.

Consider $D_0$ as the union of sets of delivery destinations in the middle stage for all input streams currently delivered from an output switch. Also, consider $D_1$ as a set of delivery destinations in the middle stage for an input stream to be newly delivered from that output switch element. By definition, $|D_0| >= R-1$ and $|D_1| >= R-1$, and therefore $|D_0 \cup D_1| >= R-1$ holds.

Suppose that $|D_0 \cup D_1| >= R$ and $|D_1| >= R$. In this case, since $|D_1| >= R$, there are at least R alternate paths from the middle stage, and outputs comparable thereto are covered. Hence, this output switch element satisfies the WSNB condition. Specifically, it is possible to newly deliver an input stream by using one of the R alternate paths from the middle stage.

With $|D_0 \cup D_1| = R-1$, all the input streams outputted from the output switch element have been delivered to the same set of middle switch elements. By the definition of the condition B, the number of such sets (i,y) of delivery paths is at most R−1. Also, with the condition D, $(n_{3,j}*s_{3,j}) >= \max(n_{2,i}*s_{2,i})$ holds. Then, a maximum of R−1 sets of input streams are connected using R−1 alternate paths or middle switch elements, and the links from the middle switch elements to the output switch element have bandwidths comparable to the sets of input streams. Thus, the WSNB condition is satisfied, and non-blocking delivery is therefore possible without rearrangement.

With $|D_0 \cup D_1| >= R$ and $|D_1| = R-1$, there is sometimes a case where all the links from the middle switch elements belonging to $D_1$ are occupied by the existing deliveries of the output switch element. In this case, however, $|D_1| >= R$ holds based on the relations $|D_0 \cup D_1| >= R$ and $|D_1| = R-1$. Then, there is always an existing delivery that can use, as an alternate path, a middle switch element belonging to the set difference between $D_0$ and $D_1$ (a middle switch element in a set not belonging to $D_1$ among the middle switch elements in $D_0$). Thus, it is possible to shift (rearrange) such an existing delivery path from a middle switch element in $D_1$ to a middle switch element in $D_0 - D_1$, and allocate the middle switch element in $D_1$ that has just become available to the new delivery. By doing so, the RNB condition is satisfied for the output switch element.

The above has shown that, when all the input switch elements satisfy the condition A or the condition B, all the output switch elements are non-blocking for multicast of all input streams with the conditions C and D.

Now, some examples for the input stage with some middle switch elements removed will be described. Table 5 shows an example of allocation of sets D(i,y) of delivery destinations with k=3, R=3, and w=3. In this example, since w=3, the number of middle switch elements has been reduced to 3*3−3=6. If the condition A is selected, $k - \lceil w/R \rceil = 2$ is derived.

Each input switch element in this case can use two middle switch elements in each group. If the condition B is selected, the R=3rd group includes k−w=0 middle switch element, that is, there is no third group.

TABLE 5

Allocation of Sets D(i,y) of Delivery Destinations to Middle Switch Elements MS-z with k = 3, R = 3, and w = 3
(Each Column is IS-i and Each Entry is y)

|      | IS-1 | IS-2 | IS-3 | IS-4 | IS-5 | IS-6 | IS-7 | IS-8 | IS-9 | IS-10 | IS-11 |
|------|------|------|------|------|------|------|------|------|------|-------|-------|
| MS-1 | 1    | 3    | 1    | 3    | 2    | 1    | 3    | 1    | 3    | 2     | 1     |
| MS-2 | 1    | 1    | 2    | 1    | 3    | 1    | 1    | 2    | 1    | 3     | 1     |
| MS-3 | 2    | 1    | 1    | 2    | 1    | 2    | 1    | 1    | 2    | 1     | 1     |

TABLE 5-continued

Allocation of Sets D(i,y) of Delivery Destinations to
Middle Switch Elements MS-z with k = 3, R = 3, and w = 3
(Each Column is IS-i and Each Entry is y)

|      | IS-1 | IS-2 | IS-3 | IS-4 | IS-5 | IS-6 | IS-7 | IS-8 | IS-9 | IS-10 | IS-11 |
|------|------|------|------|------|------|------|------|------|------|-------|-------|
| MS-4 | 2    | 2    | 3    | 1    | 2    | 2    | 2    | 3    | 1    | 2     | 2     |
| MS-5 | 3    | 2    | 2    | 3    | 1    | 3    | 2    | 2    | 3    | 1     | 2     |
| MS-6 | 3    | 3    | 3    | 2    | 3    | 3    | 3    | 3    | 2    | 3     | 2     |

In table 5, IS-1 to IS-10 have selected the condition B. Focusing on D(1,1) (the first entries for IS-1), D(1,1)={1,2} is found (MS-1 and MS-2 are delivery destinations). D(1,1) and D(6,1) are the only sets D(i,y) that have this set of middle switch elements {1,2} as their values. Likewise, D(i,y)=D(i+5,y) and 3>=y>=1 all hold. Thus, the condition that, for every (i,y), there are at most R−1=2 sets D(i,y) which include R−1=2 elements and use the same set of middle switch elements, is met. The shaded entries in table 5 represent input streams for which the input switch element has selected the condition B and which have R− 1 delivery destinations. IS-11 has selected the condition A. In each group, two switches are used and there is no third switch. Thus, 1 is delivered to three groups, and 2 is delivered to three groups.

There are 15 combinations to choose 2 middle switches out of 6 middle switches, as described below.

$$\binom{6}{2} = 15$$

Table 5 is a solution in which, according to the definition of the condition B, each combination is used R− 1=2 times, and w=3 combinations are used for each input switch element. Thus, 15*2/3=10 input switch elements can perform delivery according to the condition B. Then, in the case of adding input switch elements to table 5 above after IS-11, all these input switch elements select the condition A. When these input switch elements, including IS-11, select the condition A, they may optionally determine which three of the six switches are to be 1 and which three of the six switches are to be 2. Note that there is a constraint on the number of input ports to be used by the input switch element IS-11 and subsequent input switch elements in order to satisfy the non-blocking condition. With this constraint, however, the non-blocking condition (RNB condition) for multicast is satisfied. Hence, at the output stage, given multicast can be performed with all outputs irrespective of the number $r_2$ of switches at the output stage.

Next, table 6 shows an example of allocation of sets D(i,y) of delivery destinations with k=3, R=3, and w=2. In this example, since w=2, the number of middle switch elements has been reduced to 3*3−2=7.

TABLE 6

Allocation of Sets D(i,y) of Delivery
Destinations to Middle Switch Elements MS-z with k = 3, R = 3,
and w = 2 (Each Column is IS-i and Each Entry is y)

|      | IS-1 | IS-2 | IS-3 | IS-4 | IS-5 | IS-6 | IS-7 |
|------|------|------|------|------|------|------|------|
| MS-1 | 1    | 3    | 3    | 2    | 3    | 2    | 1    |
| MS-2 | 1    | 1    | 3    | 3    | 2    | 3    | 2    |

TABLE 6-continued

Allocation of Sets D(i,y) of Delivery
Destinations to Middle Switch Elements MS-z with k = 3, R = 3,
and w = 2 (Each Column is IS-i and Each Entry is y)

|      | IS-1 | IS-2 | IS-3 | IS-4 | IS-5 | IS-6 | IS-7 |
|------|------|------|------|------|------|------|------|
| MS-3 | 2    | 1    | 1    | 3    | 3    | 2    | 3    |
| MS-4 | 3    | 2    | 1    | 1    | 3    | 3    | 2    |
| MS-5 | 2    | 3    | 2    | 1    | 1    | 3    | 3    |
| MS-6 | 3    | 2    | 3    | 2    | 1    | 1    | 3    |
| MS-7 | 3    | 3    | 2    | 3    | 2    | 1    | 1    |

|      | IS-8 | IS-9 | IS-10 | IS-11 | IS-12 | IS-13 | IS-14 |
|------|------|------|-------|-------|-------|-------|-------|
| MS-1 | 1    | 3    | 3     | 2     | 3     | 2     | 1     |
| MS-2 | 1    | 1    | 3     | 3     | 2     | 3     | 2     |
| MS-3 | 2    | 1    | 1     | 3     | 3     | 2     | 3     |
| MS-4 | 3    | 2    | 1     | 1     | 3     | 3     | 2     |
| MS-5 | 2    | 3    | 2     | 1     | 1     | 3     | 3     |
| MS-6 | 3    | 2    | 3     | 2     | 1     | 1     | 3     |
| MS-7 | 3    | 3    | 2     | 3     | 2     | 1     | 1     |

|      | IS-15 | IS-16 | IS-17 | IS-18 | IS-19 | IS-20 | IS-21 | IS-22 |
|------|-------|-------|-------|-------|-------|-------|-------|-------|
| MS-1 | 1     | 3     | 1     | 2     | 3     | 2     | 3     | 1     |
| MS-2 | 2     | 3     | 2     | 3     | 1     | 3     | 1     | 1     |
| MS-3 | 3     | 1     | 3     | 1     | 2     | 3     | 2     | 1     |
| MS-4 | 1     | 2     | 3     | 2     | 3     | 1     | 3     | 2     |
| MS-5 | 2     | 3     | 1     | 3     | 1     | 2     | 3     | 2     |
| MS-6 | 3     | 1     | 2     | 3     | 2     | 3     | 1     | 2     |
| MS-7 | 3     | 2     | 3     | 1     | 3     | 1     | 2     | —     |

In table 6, IS-1 to IS-21 have selected the condition B, and the number of delivery-destination groups has been reduced for D(i,1) and D(i,2). For D(i,3), the number of delivery-destination groups has not been reduced, so that |D(i,3)|=3. Focusing on D(1,1) (the first entries for IS-1), D(1,1)={1,2} is found (MS-1 and MS-2 are delivery destinations). D(1,1) and D(8,1) are the only sets D(i,y) that have this set of middle switch elements {1,2} as their values. Likewise, the condition that, for every (i,1) and (i,2), there are at most R−1=2 sets D(i,1) and at most R−1=2 sets D(i,2) which include R−1=2 elements and use the same set of middle switch elements, is met.

IS-22 has selected the condition A. In each group, two switches are used and there is no third switch. Thus, 1 is delivered to three groups, and 2 is delivered to three groups. There are 21 combinations to choose 2 middle switches out of 7 middle switches, as described below.

$$\binom{7}{2} = 21$$

Table 6 is a solution in which, according to the definition of the condition B, each combination is used R− 1=2 times at the entire input stage and one of the combinations is used for w=2 input streams for each input switch element. Thus, 21*2/2=21 input switch elements can perform delivery according to the condition B. Then, in the case of adding input switch elements to table 6 above after IS-22, all these input switch elements select the condition A. When these input switch elements, including IS-22, select the condition A, they may optionally determine which three of the seven switches are to be 1 and which three of the seven switches are to be 2.

In the case where the condition A is selected, as long as the conditional equations can be satisfied, the number of input-stream delivery destinations may be increased to R+1 and the load may be distributed among the middle switch elements. In the example of table 6, the first and second input streams are both delivered to at least R=3 groups. However, since the number of middle switch elements is seven, MS-7 is not used. This middle switch element may be allocated to one or both of the first and second input streams with the multiplicity taken into account. The middle switch element may remain unused or be allocated fixedly to the first or second input stream so as to make easy the determination in the routing at the output stage.

Next, examples with R=2 will be described. According to the definition of the condition B, sets selecting R− 1=1 switch can be used only R− 1=1 time at most. In the following, examples that work out will be described for all values of k (k>1).

Case 1
The number of middle switch elements removed is w=k, that is, the number of middle switch elements is m=2k−k=k. Only one input switch element has the condition B, and the remaining input switch elements have the condition A.

Case 2
The number of middle switch elements removed is w=2, that is, the number of middle switch elements is m=2k−2=2 (k−1). k−1 input switch elements have the condition B, and the remaining input switch elements have the condition A.

Case 3
The number of middle switch elements removed is w=1, that is, the number of middle switch elements is m=2k−1=2 (k−1). 2k−1 input switch elements have the condition B, and the remaining input switch elements have the condition A.

Now, actual examples with k=2, k=3, and k=4 will be described (case 1, case 2, and case 3 with k other than these values can be easily presented in tables and therefore will not be described).

Table 7 shows an example of allocation of sets D(i,y) of delivery destinations with k=2, R=2, and w=2 and corresponds to case 1 and case 2, and only IS-1 can use all inputs. Table 8 shows an example of allocation of sets D(i,y) of delivery destinations with k=2, R=2, and w=1 and corresponds to case 3. IS-1, IS-2, and IS-3 have selected the condition B, and IS-4, IS-5, and IS-6 have selected the condition A. The number of input switch elements that can select the condition A is not limited. IS-4, IS-5, and IS-6 may only need to deliver input streams to at least two groups. In this example, they deliver input streams to three groups by using three middle switch elements so as to increase choices for the output stage and thus distribute the load.

TABLE 7

Allocation of Sets D(i,y) of Delivery Destinations to Middle Switch Elements (MS-z) with k = 2, R = 2, and w = 2 (Each Column is IS-i and Each Entry is y)

|      | IS-1 | IS-2 | IS-3 | IS-4 | IS-5 |
|------|------|------|------|------|------|
| MS-1 | 1    | 1    | 1    | 1    | 1    |
| MS-2 | 2    | 1    | 1    | 1    | 1    |

TABLE 8

Allocation of Sets D(i,y) of Delivery Destinations to Middle Switch Elements (MS-z) with k = 2, R = 2, and w = 1 (Each Column is IS-i and Each Entry is y)

|      | IS-1 | IS-2 | IS-3 | IS-4 | IS-5 | IS-6 |
|------|------|------|------|------|------|------|
| MS-1 | 1    | 2    | 2    | 1    | 1    | 1    |
| MS-2 | 2    | 1    | 2    | 1    | 1    | 1    |
| MS-3 | 2    | 2    | 1    | 1    | 1    | 1    |

Table 9 shows an example of allocation of sets D(i,y) of delivery destinations with k=3, R=2, and w=3 and corresponds to case 1. Only the input switch element IS-1 can use all the input ports of all the middle switch elements. The remaining input switch elements have selected the condition A. The number of input switch elements that can select the condition A is not limited. In this example, they deliver input streams to three groups by using three middle switch elements so as to increase choices for the output stage and thus distribute the load.

TABLE 9

Allocation of Sets D(i,y) of Delivery Destinations to Middle Switch Elements (MS-z) with k = 3, R = 2, and w = 3 (Each Column is IS-i and Each Entry is y)

|      | IS-1 | IS-2 | IS-3 | IS-4 |
|------|------|------|------|------|
| MS-1 | 1    | 1    | 1    | 1    |
| MS-2 | 2    | 1    | 1    | 1    |
| MS-3 | 3    | 1    | 1    | 1    |

Table 10 shows an example of allocation of sets D(i,y) of delivery destinations with k=3, R=2, and w=2 and corresponds to case 2. The input switch elements IS-1 and IS-2 can use the input ports of all the middle switch elements. The remaining input switch elements have selected the condition A. The number of input switch elements that can select the condition A is not limited.

TABLE 10

Allocation of Sets D(i,y) of Delivery Destinations to Middle Switch Elements (MS-z) with k = 3, R = 2, and w = 2 (Each Column is IS-i and Each Entry is y)

|      | IS-1 | IS-2 | IS-3 | IS-4 | IS-5 | IS-6 |
|------|------|------|------|------|------|------|
| MS-1 | 1    | 3    | 1    | 1    | 1    | 1    |
| MS-2 | 2    | 3    | 1    | 1    | 1    | 1    |
| MS-3 | 3    | 1    | 2    | 2    | 2    | 2    |
| MS-4 | 3    | 2    | 2    | 2    | 2    | 2    |

Table 11 shows an example of allocation of sets D(i,y) of delivery destinations with k=3, R=2, and w=1 and corresponds to case 3. The input switch elements IS-1, IS-2, and IS-3 have selected the condition B. The input switch elements IS-4, IS-5, and IS-6 have selected the condition A. The number of input switch elements that can select the condition A is not limited.

TABLE 11

Allocation of Sets D(i,y) of Delivery Destinations to Middle Switch Elements (MS-z) with k = 3, R = 2, and w = 1 (Each Column is IS-i and Each Entry is y)

|      | IS-1 | IS-2 | IS-3 | IS-4 | IS-5 | IS-6 |
|------|------|------|------|------|------|------|
| MS-1 | 1    | 2    | 2    | 2    | 2    | 1    |
| MS-2 | 2    | 1    | 2    | 2    | 2    | 1    |

TABLE 11-continued

Allocation of Sets D(i,y) of Delivery Destinations
to Middle Switch Elements (MS-z) with k = 3, R = 2,
and w = 1 (Each Column is IS-i and Each Entry is y)

|      | IS-1 | IS-2 | IS-3 | IS-4 | IS-5 | IS-6 |
|------|------|------|------|------|------|------|
| MS-3 | 2    | 2    | 1    | 3    | 3    | 2    |
| MS-4 | 3    | 3    | 3    | 1    | 3    | 2    |
| MS-5 | 3    | 3    | 3    | 3    | 1    | 2    |

Table 12 shows an example of allocation of sets D(i,y) of delivery destinations with k=4, R=2, and w=4 and corresponds to case 1. Only the input switch element IS-1 can use the input ports of all the middle switch elements. The remaining input switch elements have selected the condition A. The number of input switch elements that can select the condition A is not limited.

TABLE 12

Allocation of Sets D(i,y) of Delivery Destinations
to Middle Switch Elements (MS-z) with k = 4, R = 2,
and w = 4 (Each Column is IS-i and Each Entry is y)

|      | IS-1 | IS-2 | IS-3 | IS-4 | IS-5 | IS-6 |
|------|------|------|------|------|------|------|
| MS-1 | 1    | 1    | 1    | 1    | 1    | 1    |
| MS-2 | 2    | 1    | 1    | 1    | 1    | 1    |
| MS-3 | 3    | 2    | 2    | 2    | 2    | 2    |
| MS-4 | 4    | 2    | 2    | 2    | 2    | 2    |

Table 13 shows an example of allocation of sets D(i,y) of delivery destinations with k=4, R=2, and w=2 and corresponds to case 2. The input switch elements IS-1, IS-2, and IS-3 can use the input ports of all the middle switch elements. The remaining input switch elements have selected the condition A. The number of input switch elements that can select the condition A is not limited.

TABLE 13

Allocation of Sets D(i,y) of Delivery Destinations
to Middle Switch Elements (MS-z) with k = 4, R = 2,
and w = 2 (Each Column is IS-i and Each Entry is y)

|      | IS-1 | IS-2 | IS-3 | IS-4 | IS-5 | IS-6 |
|------|------|------|------|------|------|------|
| MS-1 | 1    | 3    | 3    | 1    | 1    | 1    |
| MS-2 | 2    | 3    | 3    | 1    | 1    | 1    |
| MS-3 | 3    | 1    | 4    | 2    | 2    | 2    |
| MS-4 | 3    | 2    | 4    | 2    | 2    | 2    |

TABLE 13-continued

Allocation of Sets D(i,y) of Delivery Destinations
to Middle Switch Elements (MS-z) with k = 4, R = 2,
and w = 2 (Each Column is IS-i and Each Entry is y)

|      | IS-1 | IS-2 | IS-3 | IS-4 | IS-5 | IS-6 |
|------|------|------|------|------|------|------|
| MS-5 | 4    | 4    | 1    | 3    | 3    | 3    |
| MS-6 | 4    | 4    | 2    | 3    | 3    | 3    |

Table 14 shows an example of allocation of sets D(i,y) of delivery destinations with k=4, R=2, and w=1 and corresponds to case 3. The input switch element IS-1, IS-2, . . . , and IS-7 have selected the condition B. The input switch element IS-8 has selected the condition A. The number of input switch elements that can select the condition A is not limited.

TABLE 14

Allocation of Sets D(i,y) of Delivery Destinations
to Middle Switch Elements (MS-z) with
k = 4, R = 2, and w = 1
(Each Column is IS-i and Each Entry is y)

|      | IS-1 | IS-2 | IS-3 | IS-4 | IS-5 | IS-6 | IS-7 | IS-8 |
|------|------|------|------|------|------|------|------|------|
| MS-1 | 1    | 2    | 2    | 2    | 2    | 2    | 2    | 1    |
| MS-2 | 2    | 1    | 2    | 2    | 2    | 2    | 2    | 1    |
| MS-3 | 2    | 2    | 1    | 3    | 3    | 3    | 3    | 2    |
| MS-4 | 3    | 3    | 3    | 1    | 3    | 3    | 3    | 2    |
| MS-5 | 3    | 3    | 3    | 3    | 1    | 4    | 4    | 3    |
| MS-6 | 4    | 4    | 4    | 4    | 4    | 1    | 4    | 3    |
| MS-7 | 4    | 4    | 4    | 4    | 4    | 4    | 1    | 3    |

Next, an example with R=4 will be described. Table 15 shows an example of part of allocation of sets D(i,y) of delivery destinations with k=4, R=4, and w=4. The input switch elements IS-1 to IS-43 all have selected the condition B. The number of groups is R−1=3, and each group includes k=4 switch elements. There are 220 combinations to choose 3 middle switch elements out of 12 middle switch elements. Table 15 uses four different combinations among these for each input switch, and all the sets D(i,y) of input-stream delivery destinations of the input switch elements IS-1 to IS-43 (43>=i>=1, 4>=y>=1) are different. According to the definition of the condition B, such sets may be used R−1=3 times. Hence, even in the case of using only the combinations shown in table 15, 43*3=129 input switch elements can select the condition B. Specifically, the condition B can be selected for 129 input switch elements by expanding table 15 such that D(i,y)=D(i+43,y)=D(i+86, y).

TABLE 15

Allocation of Sets D(i, y) of Delivery Destinations to Middle Switch Elements
(MS-z) with k = 4, R = 4, and w = 4 (Each Column is IS-i and Each Entry is y)

|       | IS-1 | IS-2 | IS-3 | IS-4 | IS-5 | IS-6 | IS-7 | IS-8 | IS-9 | IS-10 | IS-11 | IS-12 | IS-13 | IS-14 |
|-------|------|------|------|------|------|------|------|------|------|-------|-------|-------|-------|-------|
| MS-1  | 1    | 4    | 4    | 1    | 4    | 4    | 3    | 4    | 3    | 1     | 3     | 3     | 1     | 4     |
| MS-2  | 1    | 1    | 4    | 1    | 1    | 4    | 4    | 3    | 4    | 2     | 4     | 4     | 2     | 1     |
| MS-3  | 1    | 1    | 1    | 2    | 1    | 1    | 4    | 4    | 3    | 1     | 1     | 3     | 2     | 2     |
| MS-4  | 2    | 1    | 1    | 1    | 2    | 1    | 1    | 4    | 4    | 2     | 2     | 4     | 1     | 2     |
| MS-5  | 2    | 2    | 1    | 2    | 1    | 2    | 1    | 1    | 4    | 1     | 1     | 1     | 1     | 1     |
| MS-6  | 2    | 2    | 2    | 2    | 2    | 1    | 2    | 1    | 1    | 2     | 2     | 2     | 2     | 1     |
| MS-7  | 3    | 2    | 2    | 3    | 2    | 2    | 1    | 2    | 1    | 3     | 1     | 1     | 3     | 2     |
| MS-8  | 3    | 3    | 2    | 3    | 3    | 2    | 2    | 1    | 2    | 4     | 2     | 2     | 4     | 3     |
| MS-9  | 3    | 3    | 3    | 4    | 3    | 3    | 2    | 2    | 1    | 3     | 3     | 1     | 4     | 4     |
| MS-10 | 4    | 3    | 3    | 3    | 4    | 3    | 3    | 2    | 2    | 4     | 4     | 2     | 3     | 4     |
| MS-11 | 4    | 4    | 3    | 4    | 3    | 4    | 3    | 3    | 2    | 3     | 3     | 3     | 3     | 3     |
| MS-12 | 4    | 4    | 4    | 4    | 4    | 3    | 4    | 3    | 3    | 4     | 4     | 4     | 4     | 3     |

TABLE 15-continued

Allocation of Sets D(i, y) of Delivery Destinations to Middle Switch Elements
(MS-z) with k = 4, R = 4, and w = 4 (Each Column is IS-i and Each Entry is y)

|  | IS-15 | IS-16 | IS-17 | IS-18 | IS-19 | IS-20 | IS-21 | IS-22 | IS-23 | IS-24 | IS-25 | IS-26 | IS-27 | IS-28 |
|---|---|---|---|---|---|---|---|---|---|---|---|---|---|---|
| MS-1  | 3 | 3 | 4 | 4 | 1 | 3 | 3 | 4 | 4 | 2 | 1 | 3 | 4 | 3 |
| MS-2  | 4 | 3 | 3 | 4 | 4 | 1 | 3 | 3 | 4 | 4 | 4 | 1 | 3 | 4 |
| MS-3  | 1 | 4 | 3 | 3 | 2 | 4 | 1 | 3 | 3 | 4 | 2 | 4 | 1 | 3 |
| MS-4  | 2 | 1 | 4 | 3 | 2 | 2 | 4 | 1 | 3 | 3 | 1 | 2 | 4 | 1 |
| MS-5  | 2 | 2 | 1 | 4 | 1 | 2 | 2 | 4 | 1 | 3 | 2 | 1 | 2 | 4 |
| MS-6  | 1 | 2 | 2 | 1 | 1 | 1 | 2 | 2 | 4 | 1 | 1 | 2 | 1 | 2 |
| MS-7  | 1 | 1 | 2 | 2 | 3 | 1 | 1 | 2 | 2 | 4 | 3 | 1 | 2 | 1 |
| MS-8  | 2 | 1 | 1 | 2 | 2 | 3 | 1 | 1 | 2 | 2 | 3 | 1 | 1 | 2 |
| MS-9  | 3 | 2 | 1 | 1 | 4 | 2 | 3 | 1 | 1 | 2 | 3 | 2 | 3 | 1 |
| MS-10 | 4 | 3 | 2 | 1 | 4 | 4 | 2 | 3 | 1 | 1 | 3 | 3 | 2 | 3 |
| MS-11 | 4 | 4 | 3 | 2 | 3 | 4 | 4 | 2 | 3 | 1 | 4 | 3 | 3 | 2 |
| MS-12 | 3 | 4 | 4 | 3 | 3 | 3 | 4 | 4 | 2 | 3 | 3 | 4 | 3 | 3 |

|  | IS-29 | IS-30 | IS-31 | IS-32 | IS-33 | IS-34 | IS-35 | IS-36 | IS-37 | IS-38 | IS-39 | IS-40 | IS-41 | IS-42 | IS-43 |
|---|---|---|---|---|---|---|---|---|---|---|---|---|---|---|---|
| MS-1  | 3 | 2 | 1 | 4 | 3 | 2 | 4 | 2 | 1 | 4 | 3 | 3 | 2 | 1 | 1 |
| MS-2  | 3 | 3 | 1 | 1 | 4 | 3 | 2 | 4 | 2 | 1 | 4 | 3 | 3 | 2 | 2 |
| MS-3  | 4 | 3 | 2 | 1 | 1 | 4 | 3 | 2 | 4 | 2 | 1 | 4 | 3 | 3 | 3 |
| MS-4  | 3 | 4 | 3 | 2 | 1 | 1 | 4 | 3 | 2 | 4 | 2 | 1 | 4 | 3 | 4 |
| MS-5  | 1 | 3 | 3 | 3 | 2 | 1 | 1 | 4 | 3 | 2 | 4 | 2 | 1 | 4 | 1 |
| MS-6  | 4 | 1 | 4 | 3 | 3 | 2 | 1 | 1 | 4 | 3 | 2 | 4 | 2 | 1 | 2 |
| MS-7  | 2 | 4 | 1 | 4 | 3 | 3 | 2 | 1 | 1 | 4 | 3 | 2 | 4 | 2 | 3 |
| MS-8  | 1 | 2 | 2 | 1 | 4 | 3 | 3 | 2 | 1 | 1 | 4 | 3 | 2 | 4 | 4 |
| MS-9  | 2 | 1 | 4 | 2 | 1 | 4 | 3 | 3 | 2 | 1 | 1 | 4 | 3 | 2 | 1 |
| MS-10 | 1 | 2 | 2 | 4 | 2 | 1 | 4 | 3 | 3 | 2 | 1 | 1 | 4 | 3 | 2 |
| MS-11 | 3 | 1 | 3 | 2 | 4 | 2 | 1 | 4 | 3 | 3 | 2 | 1 | 1 | 4 | 3 |
| MS-12 | 2 | 3 | 4 | 3 | 2 | 4 | 2 | 1 | 4 | 3 | 3 | 2 | 1 | 1 | 4 |

As described above, when the values of k and R increase, the number of combinations of sets of delivery destinations satisfying the condition B increases drastically. Embodiments of the present invention are not limited to the examples indicated by the above tables.

Next, examples of the path selection in the present invention will be described. The routing process at the input stage always succeeds, as mentioned above. Thus, the routing process at the output stage will be described using specific examples where rearrangement is needed.

First, a case where the multiplicity at the output stage is $d_{4,j}=4$ with k=2, R=2, and w=1 will be described. Since $d_{4,j}=4$, each output switch element can output up to four streams. Since R=2, a maximum of two (=4/2) streams can be received from each middle switch element. Table 16, based on table 8, shows streams delivered from middle switch elements to an output switch element OS-j. The two columns under each of a state 1 and a state 2 of OS-j represent streams received from the middle switch elements presented in rows (two streams per middle switch element). Streams A1 and A2 are streams delivered from D(3,2) of the input switch element IS-3. Since D(3,2)={MS-1, MS-2}, the stream A1 is delivered from the middle switch element MS-1 and the stream A2 is delivered from the middle switch element MS-2 in the state 1 in table 16. A stream A3 is delivered from D(1,1) of the input switch element IS-1. Since D(1,1)=({MS-1}, the stream A3 can be delivered only from the middle switch element MS-1. At this point, the two streams A1 and A3 are delivered from the middle switch element MS-1, and thus no more streams can be delivered from the middle switch element MS-1.

Now, assume that the output switch element OS-j is to output a fourth stream A4 belonging to D(1, 1) of the input switch element IS-1. The number of elements of the union (Do) of the sets of delivery destinations for the currently delivered streams is $|D_0|=|D(3,2) \cup D(1,1)|=2$ (=R). The number of elements of the set $(D_1)$ of delivery destinations for the stream to be newly delivered is $|D_1|=|D(1,1)|=1$ (=R−1). Then, as mentioned above, in such a case of conflict, the set difference between $D_0$ and $D_1$, or $D_0-D_1=(D(3,2) \cup D(1,1))-D(1,1)=\{MS-2\}$ has an alternate path, and there is always a stream that is being delivered from $D_1=\{MS-1\}$. That stream is A1 in the case of table 16. Then, the delivery path of A1 is shifted to the middle switch element MS-2, and the emptied path is used to newly deliver A4 from the middle switch element MS-1. The result of this operation is the state 2. The output switch element OS-j now uses all outputs allowed with a multiplicity of 4, and will not therefore be able to deliver a new stream unless an existing delivery is removed.

TABLE 16

Relation between Allocation of Sets D(i, y) of Delivery
Destinations to Middle Switch Elements (MS-z) and States of j-th
Output Switch Element with k = 2, R = 2, w = 1, and $d_{4,j}$ = 4

|  | IS-1 | IS-2 | IS-3 | IS-4 | OS-j (State 1) | | OS-j (State 2) | |
|---|---|---|---|---|---|---|---|---|
| MS-1 | 1 | 2 | 2 | 1 | A1 ← D(3,2) | A3 ← D(1.1) | A4 ← D(1.1) | A3 ← D(1.1) |
| MS-2 | 2 | 1 | 2 | 1 | A2 ← D(3,2) | — | A2 ← D(3,2) | A1 ← D(3,2) |
| MS-3 | 2 | 2 | 1 | 1 | — | — | — | — |

Next, a case where the multiplicity on the output side is $d_{4,j}=3$ with k=3, R=3, and w=3 will be described. Since $d_{4,j}=3$, each output switch element can output up to three streams. Since R=3, a maximum of one (=3/3) stream can be received from a middle switch element. Table 17, based on table 5, shows streams delivered from middle switch elements to an output switch element OS-j. A stream A1 is a stream delivered from D(1,1) of the input switch element IS-1. Since D(1,1)={MS-1, MS-2}, the stream A1 is delivered from the middle switch element MS-1 in a state 1 in table 17. A stream A2 is delivered from D(2,1) of the input switch element IS-2. Since D(2,1)={MS-2, MS-3}, the stream A2 is delivered from the middle switch element MS-3.

Now, assume that the output switch element OS-j is to output a third stream A3 belonging to D(3,1) of the input switch element IS-3. D(3,1)={MS-1, MS-3}, and the middle switch elements MS-1 and MS-3 are being used by the streams A1 and A2, respectively. In this state, the output switch element OS-j cannot deliver the stream A3.

The number of elements of the union ($D_0$) of the sets of delivery destinations for the currently delivered streams is $|D_0|=|D(1,1) \cup D(2,1)|=3$ (=R). The number of elements of the set ($D_1$) of delivery destinations for the stream to be newly delivered is $|D_1|=|D(3,1)|=2$ (=R− 1). Then, as mentioned above, in such a case of conflict, the set difference between $D_0$ and $D_1$, or $D_0-D_1=(D(1,1) \cup D(2,1))-D(3,1)=\{MS-2\}$ has an alternate path, and there are always streams that are being delivered from $D_1=\{MS-1, MS-3\}$. These streams are A1 and A2 in the case of table 17. Then, A1 is selected as a stream to be rearranged and its delivery path is shifted to the middle switch element MS-2, and the emptied route is used to newly deliver A4 from the middle switch element MS-1. The result of this is a state 2. The output switch element OS-j now uses all outputs allowed with a multiplicity of 3, and will not therefore be able to deliver a new stream unless an existing delivery is removed.

TABLE 17

Relation between Allocation of Sets D(i, y) of Delivery Destinations to Middle Switch Elements (MS-z) and States of j-th Output Switch Element with k = 3, R = 3, w = 3, and $d_{4,j}$ = 3

|      | IS-1 | IS-2 | IS-3 | OS-j (State 1) | OS-j (State 2) |
|------|------|------|------|----------------|----------------|
| MS-1 | 1    | 3    | 1    | A1 ← D(1.1)    | A3 ← D(3.1)    |
| MS-2 | 1    | 1    | 2    | —              | A1 ← D(1.1)    |
| MS-3 | 2    | 1    | 1    | A2 ← D(2.1)    | A2 ← D(2.1)    |
| MS-4 | 2    | 2    | 3    | —              | —              |
| MS-5 | 3    | 2    | 2    | —              | —              |
| MS-6 | 3    | 3    | 3    | —              | —              |

In the following, the path setting in a network satisfying the RNB condition will be formulated and described.

The allocation of M(i,x,y) in the routing process at the input stage is performed in such a way as to satisfy the RNB condition.

Figure 10B:
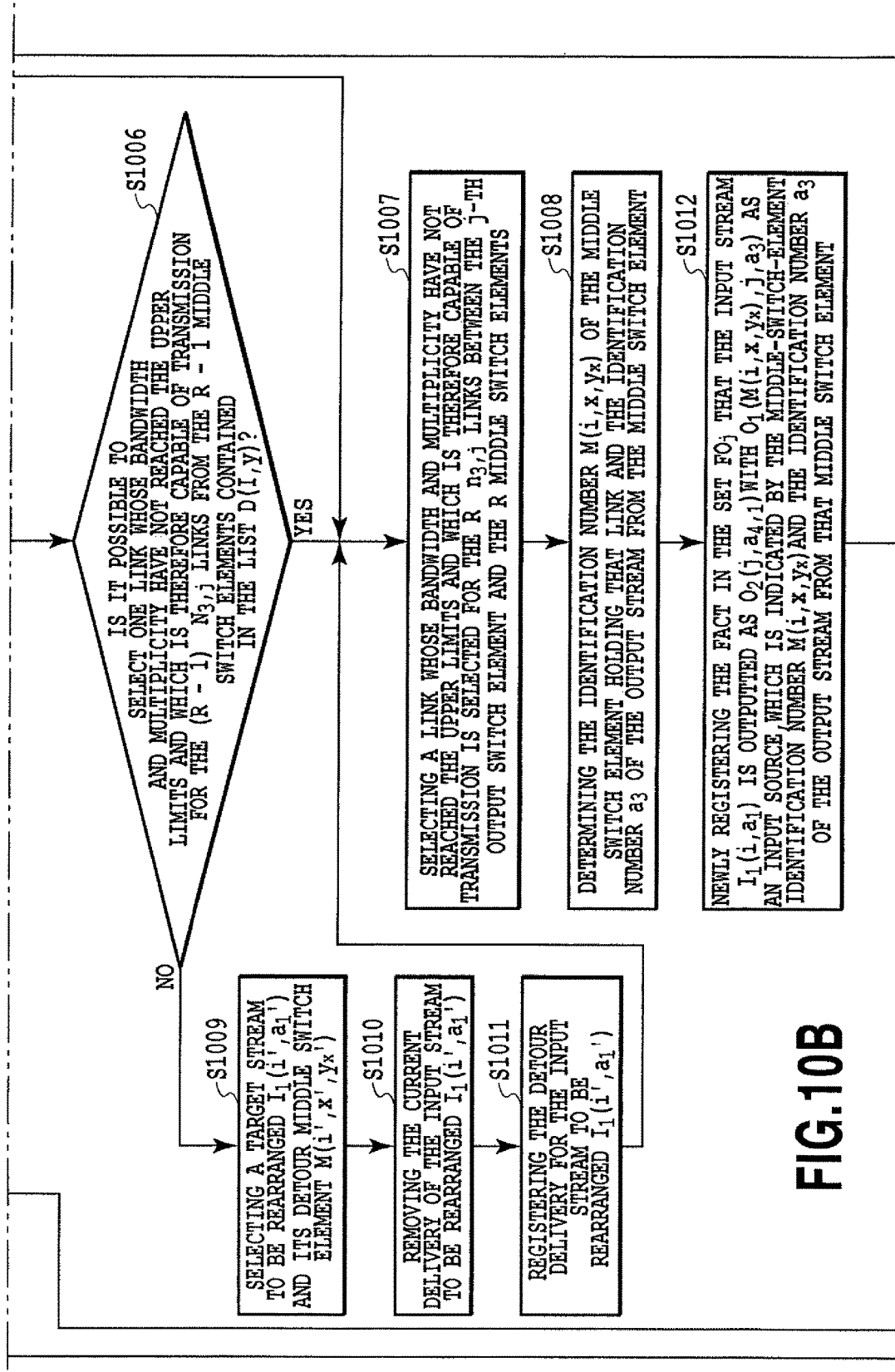
Figure 10C:
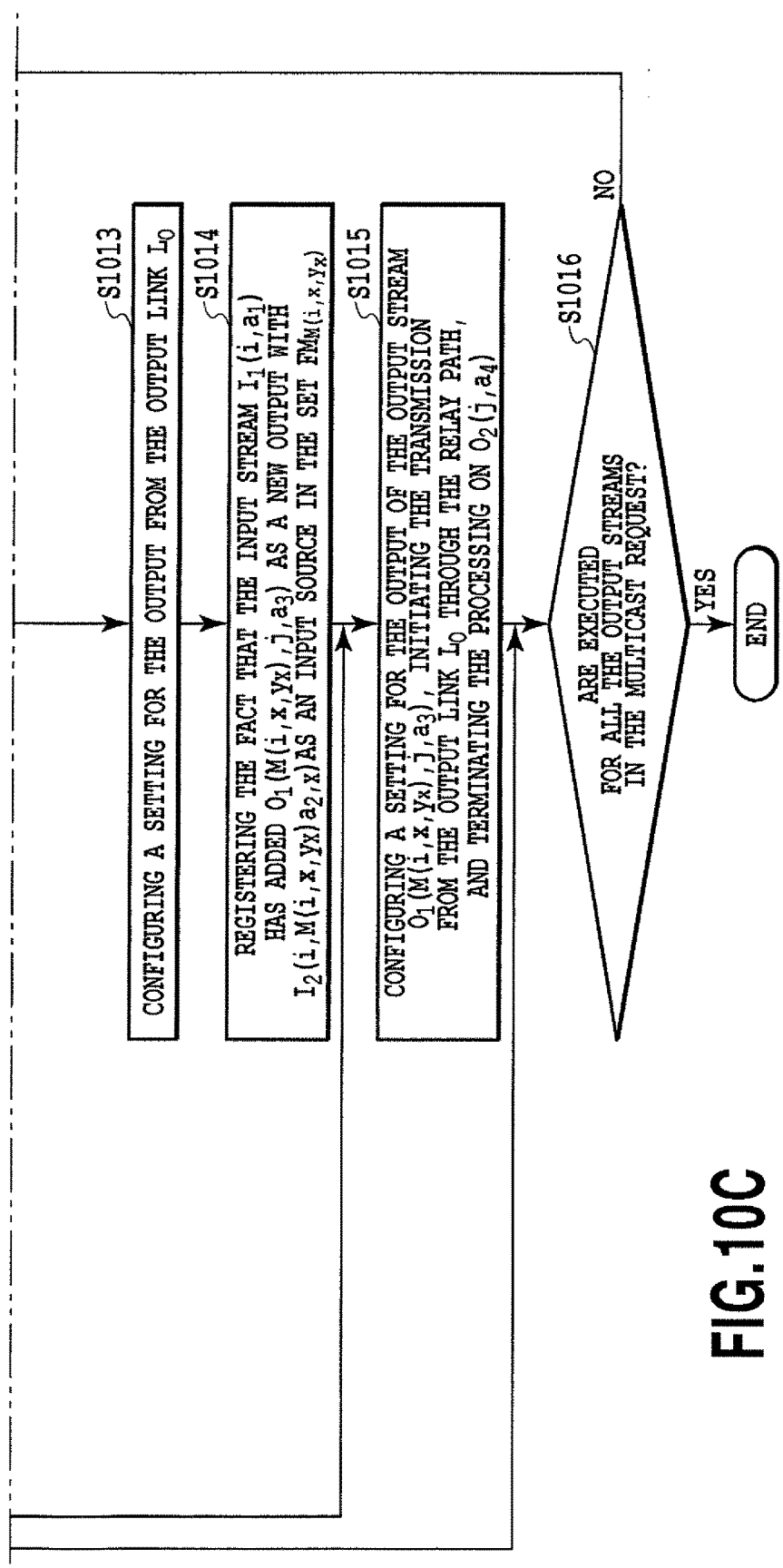

Next, the routing process at the output stage in the network satisfying the RNB condition will be described with reference to a flowchart in FIGS. 10A to 10C.

The j-th output switch element at the output stage calculates an output link $L_O$ to be used for one output stream $O_2(j,a_4)$ to a new output destination in a multicast request for an input stream $I_1(i,a_1)$ from the identification number $a_4$ (step S1001).

If the output streams in the set $FO_j$ that are used in the same output link have already reached the upper-limit bandwidth below which the output link $L_O$ can be accommodated (Yes in step S1002), the j-th output switch element does not accept this multicast request, and the process proceeds to step S1016. If not (No in step S1002), the process proceeds to subsequent step S1003.

If the set $FO_j$ includes the above-mentioned input stream $I_1(i,a_1)$ (Yes in step S1003), the j-th output switch element adds the identification number $a_4$ to the register of the stream $I_1(i,a_1)$ (step S1017), and the process proceeds to step S1015. If not (No in step S1003), the process proceeds to subsequent step S1004.

The result of the routing process at the input stage corresponding to the input stream $I_1(i,a_1)$ is derived, and the list of middle switch elements contained in the result is extracted. For example, if the result of the routing process at the input stage is $\{I_2(i,M(i,1,y_1),a_{2,1}),\ I_2(i,M(i,2,y_2),a_{2,2}),\ \ldots,\ I_2(i,M(i,R,y_R),a_{2,R})\}$, the list of middle switch elements are $\{M(i,1,y_1),\ M(i,2,y_2),\ \ldots,\ M(i,R,y_R)\}$ (step S1004).

If the number of elements $|D(i,y)|$ of the list D(i,y) of middle switch elements corresponding to the input stream $I_1(i,a_1)$ extracted in step S1004 is R− 1 (Yes in step S1005), the process proceeds to step S1006. If not (No in step S1005), the process proceeds to subsequent step S1007.

In step S1007, one link whose bandwidth and multiplicity have not reached the upper limits and which is therefore capable of transmission is selected for the $R*n_{3,j}$ links between the j-th output switch element at the output stage and the R middle switch elements contained in the list. Then, the identification number $M(i,x,y_x)$ of the middle switch element holding that link and the identification number $a_3$ of the output stream from the middle switch element are determined (step S1008).

In step S1006, it is determined whether it is possible to "select one link whose bandwidth and multiplicity have not reached the upper limits and which is therefore capable of transmission for the $(R-1)*n_{3,j}$ links from the R− 1 middle switch elements contained in the list". If "Yes", the process proceeds to step S1007. If "No", the process proceeds to step S1009.

In step S1009, a stream to be rearranged and its alternate middle switch element are selected.

Specifically, $D_0$ is defined as the union of the lists of delivery-destination middle switch elements for all inputs included in $FO_j$, or the relations between the inputs and the outputs of the j-th output switch element, and $D_1$ is defined as the list of middle switch elements extracted in step S1004. The set difference between $D_0$ and $D_1$, or $D_0-D_1$, has alternate paths, and the sets of currently delivered streams are extracted from $D_1$. From the sets is selected at least one stream $I_1(i',a_1')$ that can be replaced with the input stream $I_1(i,a_1)$ to be newly delivered, and its alternate middle switch element $M(i',x',y_x')$. Here, the output of the stream $I_1(i',a_1')$ is using an output link $L_0'$.

Then, the current delivery of the input stream to be rearranged is removed (step S1010). Specifically, step S705 to step S711, described with reference to FIG. 7, are performed on the input stream to be rearranged $I_1(i',a_1')$ to temporarily remove the input stream to be rearranged $I_1(i',a_1')$. Here, step S708 to step S711 may be omitted so that the path setting at the input stage and the path setting at the output stage can be separate from each other.

Figure 6C:
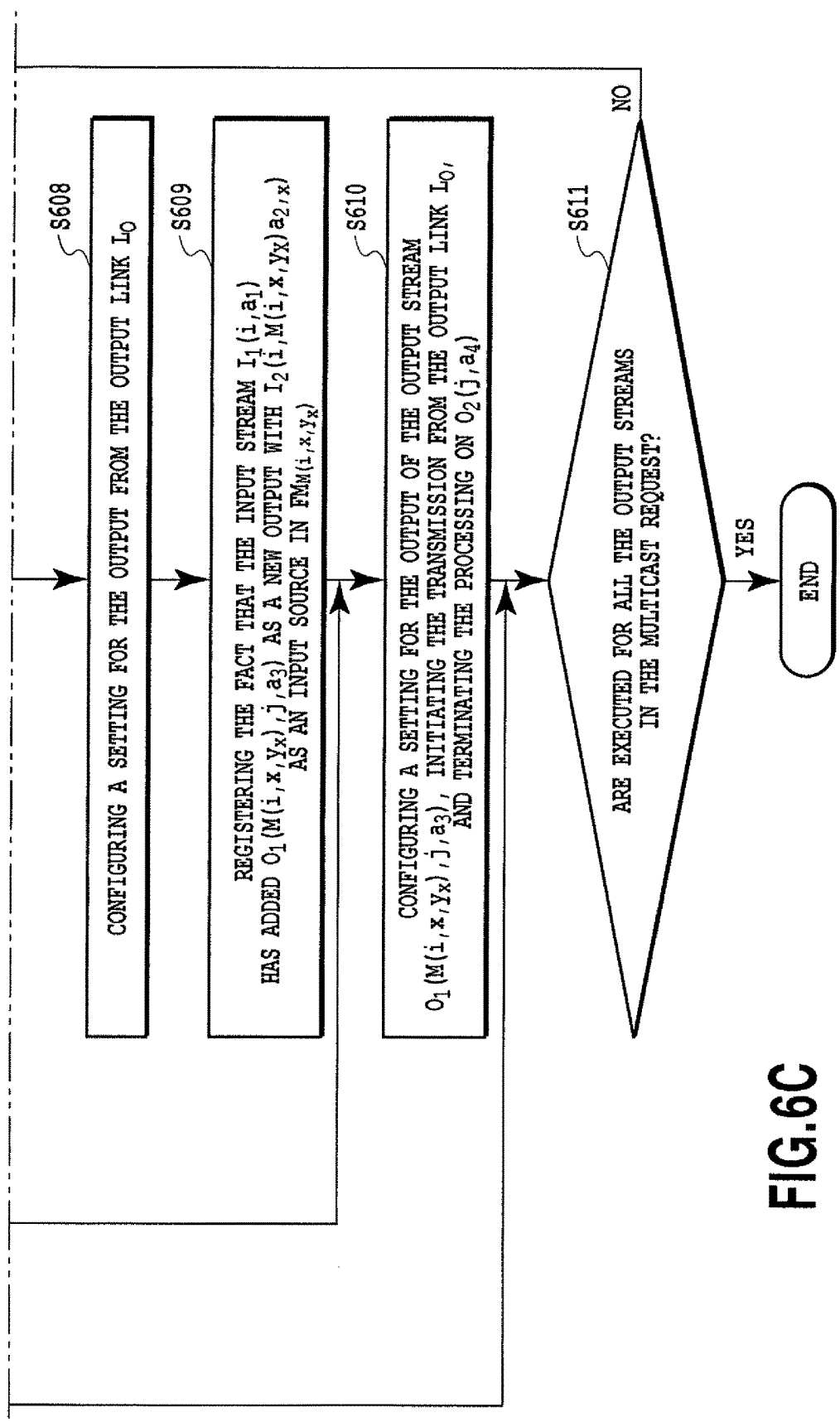

Then, the input stream to be rearranged is re-registered based on the new arrangement (step S1011). Specifically, an identification number $a_3'$ of an output stream from the alternate middle switch element with the identification number $M(i',x',y_{x'})$ is determined. Moreover, the processes in step S606 to step S610 in FIGS. 6B and 6C are performed to register the fact that the input stream to be rearranged $I_1(i',a_1')$ is now delivered to the output link $L_O'$ by using the output stream $a_3'$ from the alternate middle switch element $M(i',x',y_x')$, in the set $FO_j$ and the set $FM_{M(i',x',y_x')}$.

Then, the delivery from the output link $L_O'$ is continued. Now that an alternate path allowing the delivery of the input stream $I_1(i,a_1)$ is provided, the branched process performed with "No" in step S1006 is terminated, and the process returns to step S1007 to continue the processing on the input stream $I_1(i,a_1)$.

In step S1012, the j-th output switch element at the output stage newly registers, in the set $FO_j$, the fact that the input stream $I_1(i,a_1)$ is outputted as $O_2(j,a_{4,1})$ with $O_1(M(i,x,y_x), j,a_3)$ as an input source, which is indicated by the middle-switch-element identification number $M(i,x,y_x)$ and the identification number $a_3$ of the output stream from that middle switch element. Then, a setting is configured for the output from the output link $L_O$(step S1013).

The middle switch element $M(i,x,y_x)$ selected in step S1006 and step S1009 registers, in the set $FM_{M(i,x,y_x)}$, the results of step S1003 and step S1004, i.e., the fact that the input stream $I_1(i,a_1)$ has added $O_1(M(i,x,y_x),j,a_3)$ as a new output with $I_2(i,M(i,x,y_x)a_{2,x})$ as an input source (step S1014).

Then, a setting is configured for the output of the output stream $O_1$ $(M(i,x,y_x),j,a_3)$, the transmission from the output link $L_O$ through the alternate path is initiated, and the processing on $O_2(j,a_4)$ is terminated (step S1015).

Thereafter, step S1001 to step S1015 are executed for input streams requested to be newly delivered (step S1016).

In another embodiment, if "No" in step S1006, step S1009 and step S1011 (the adding of the delivery of the input stream to be rearranged to the alternate middle switch element) may be executed, and then step S1010 (the removal of the current delivery to be rearranged) may be executed. In this case, then, delivery of the input stream requested to be newly delivered using a middle switch element currently delivering a stream(s) is newly added, and path changing is performed at the output switch element.

In one embodiment, when the delivery-source middle switch elements are selected in the routing process at the output stage, the delivery-source middle switch elements can be selected in such a way as to level the numbers of deliveries from the groups. Such an operation can avoid concentration of deliveries at a particular middle switch element and suppress interference with other inputs having a $|D(i,y)|$ of $R-1$. In this way, the likelihood of rearrangement can be reduced when the multiplicity is large. In a specific example, this corresponds to the state 1 in table 16, involving delivering the stream A1 from the middle switch element MS-1 and delivering the stream A2 from the middle switch element MS-2, which belongs to the same set $D(3,2)$. In the state 1, the stream A3 can be delivered without rearrangement. If, however, the streams A1 and A2 are both set to be delivered from the middle switch element MS-1, then, rearrangement will be necessary at the point when the stream A3 is set to be delivered from the set $D(1,1)$.

The description has been given so far on the configuration method satisfying the RNB condition in a three-stage Clos-type network using unidirectional links. However, as mentioned above, a switch element capable of bidirectional transmission can be used to integrate the function of an input stage and the function of an output stage in a single switch element. In the case of using the RNB condition m=R*k−w instead of the WSNB condition m=R*k, the configuration is as below.

In the case where the routing process according to the condition A is selected as the routing process at the input stage, the i-th input-output switch element at the input-output stage satisfies $$n_{1,i} \times s_{1,i} \leq (k - \lceil w/R \rceil \times n'_i \times s'_i) \quad \text{equation (31)}.$$

The i-th input-output switch element at the input-output stage also satisfies $$d_{1,i} \leq (k - \lceil w/R \rceil \times d') \quad \text{equation (32)}.$$

In the case where the condition B is selected, the i-th input-output switch element at the input-output stage satisfies equation (12).

In the case where $(n'_j * s'_j) < \max(n'_i * s'_i)$ $(i \neq j)$, the j-th input-output switch element at the input-output stage satisfies $$n_{4,j} * s_{4,j} <= (R-1) * n'_i * s'_i, \text{ and } d_{4,j} <= (R-1) * d'_j \quad \text{equation (33)}.$$

In the case where $(n'_i * s'_j) = \max(n'_i * s'_j)$ $(i \neq j)$, the j-th input-output switch element at the input-output stage satisfies $$n_{4,j} * s_{4,j} <= R * n'_i * s'_j, \text{ and } d_{4,j} <= R * d'_j \quad \text{equation (34)}$$

The input-output stage as a whole satisfies equation (14). The i-th input-output switch element at the input-output stage satisfies equation (15). All the links of each middle switch element with the bandwidth x satisfy equation (16).

In the case where normalization with the bandwidth s' is performed, each middle switch element satisfies equation (17).

The description has been given so far of the method of configuring a network satisfying the RNB condition, which has m=R*k−w middle switch elements, by removing w middle switch elements from a network satisfying the WSNB condition, which has m=R*k middle switch elements. Next, description will be given of a configuration method involving applying this method to subsets of middle switch elements configured by dividing a network.

When R>=4, R is replaced such that R=$R_1$+$R_2$, $R_1$>=2, and $R_2$>=2. In this case, the number of middle switch elements is m=R*k=($R_1$+$R_2$)*k=$R_1$*k+$R_2$*k. This indicates that the network as a whole includes R alternate paths but can also be divided into a network using a subset of middle switch elements equivalent to $R_1$ alternate paths and a network using a subset of middle switch elements equivalent to $R_2$ alternate paths.

As a specific example, consider a case where R=5, k=2, and m=R*k=10. Table 18 shows an example of allocation of the set $D(i,y)$ of the y-th delivery destinations, or middle switch elements, to the i-th input switch element in the routing process at the input stage in which k=2 and thus first and second middle switch elements are set in each of the five groups (for each input switch element, the set $D(i,y)$ is such that $|D(i,1)|$=5 and $|D(i,2)|$=5, and hence "1" is allocated five times and "2" is allocated five times. Here, assuming that R=5=2+3 and thus R*k=(2+3)*2=4+6, this is equivalent to handling the middle switch elements as a subset ($G_1$) including two independent groups with four middle switch elements {MS-1, MS-2, MS-3, MS-4} and a subset ($G_2$) including three independent groups with switches {MS-5, MS-6, MS-7, MS-8, MS-9, MS-10}.

TABLE 18

Relation between Allocation of Sets D(i, y) of Delivery Destinations to Middle Switch Elements (MS-z) and State of y-th Input Switch Elements with k = 2, R = 5, and m = 10

|       | IS-1 | IS-2 | IS-3 | IS-4 | IS-5 | Partial Network |
|-------|------|------|------|------|------|-----------------|
| MS-1  | 1    | 1    | 1    | 1    | 1    | $G_1$           |
| MS-2  | 1    | 1    | 1    | 1    | 1    |                 |
| MS-3  | 2    | 2    | 2    | 2    | 2    |                 |
| MS-4  | 2    | 2    | 2    | 2    | 2    |                 |
| MS-5  | 1    | 1    | 1    | 1    | 1    | $G_2$           |
| MS-6  | 1    | 1    | 1    | 1    | 1    |                 |
| MS-7  | 1    | 1    | 1    | 1    | 1    |                 |
| MS-8  | 2    | 2    | 2    | 2    | 2    |                 |
| MS-9  | 2    | 2    | 2    | 2    | 2    |                 |
| MS-10 | 2    | 2    | 2    | 2    | 2    |                 |

The same input streams are delivered to both of the subsets $G_1$ and $G_2$. Then, for each output switch element, the subnetwork to be used for its individual output link may be fixed to either the subset $G_1$ or $G_2$ and allocated thereto. Assume that $a_1 = \lfloor n_{4,j} \times R_1/R \rfloor$, $a_2 = \lfloor n_{4,j} \times R_2/R \rfloor$, $b_1 = \lfloor d_{4,j} \times R_1/R \rfloor$, $b_2 = \lfloor d_{4,j} \times R_2/R \rfloor$ is given, then, from equation (2), $$a_1 * s_{4,j} <= R_1 * n_{3,j} * s_{3,j}, \text{ and } b_1 <= R_1 * d_{3,j} \quad \text{equation (35)},$$

$$a_2 * s_{4,j} <= R_2 * n_{3,j} * s_{3,j}, \text{ and } b_2 <= R_2 * d_{3,j} \quad \text{equation (36), and}$$

$$(a_1+a_2) * s_{4,j} <= R * n_{3,j} * s_{3,j}, \text{ and} (b_1+b_2) <= R * d_{3,j} \quad \text{equation (37)}$$

are satisfied. That is, among the output links of each output switch element, $a_1$ output links and $a_2$ output links are allocated to the subsets $G_1$ and $G_2$, respectively. In this way, the independent subnetworks between $G_1$ and $G_2$ and each output switch element independently satisfy the WSNB condition (based on equation (13), it can be seen that a network using links capable of bidirectional transmission likewise satisfies the WSNB condition).

Then, one or more middle switch elements are removed from the subsets in table 18 so that the subsets can independently satisfy the RNB condition. Specifically, the total number w of switch elements removed from the middle stage is divided as $w=w_1+w_2$ ($w_1>=0$, $w_2>=0$), to distribute the number of middle switch elements removed among the subsets in such a way as to satisfy $$m=R*k-w=(R_1*k-w_1)+(R_2*k-w_2) \quad \text{equation (38)}.$$

Up to k middle switch elements can be removed from each of the divided subsets. Hence, the number of middle switch elements removed as a whole is $2k>=w>0$, and therefore the number of middle switch elements removed can be increased as compared to before the division.

In the subset $G_1$, $|D(i,y) \cap G_1|$, or the number of middle switch elements belonging to $G_1$ among the set $D(i,y)$ of the y-th ($w_1>=y>=1$) middle switch elements in all the groups for the i-th input switch element, is $R_1-1$. If the y'-th ($k>=y'>w_1$) middle switch element is present in all the groups, $|D(i,y') \cap G_1|$, or the number of y'-th middle switch elements belonging to $G_1$ among the set $D(i,y')$ of the y'-th middle switch elements, is at least $R_1$. For every (i,y), there are at most $R_1-1$ sets $D(i,y)$ f $G_1$ each including $R_1-1$ elements and using the same set of middle switch elements in $G_1$.

Likewise, In the subset $G_2$, $|D(i,y) \cap G_2|$, or the number of middle switch elements belonging to $G_2$ among the set $D(i,y)$ of the y-th ($w_1>=y>=1$) middle switch elements in all the groups for the i-th input switch element, is $R_2-1$. If the y'-th ($k>=y'>w_2$) middle switch element is present in all the groups, $|D(i,y') \cap G_2|$, or the number of y'-th middle switch elements belonging to $G_2$ among the set $D(i,y')$ of the y'-th middle switch elements, is at least $R_2$. For every (i,y), there are at most $R_2-1$ sets $D(i,y) \cap G_2$ each including $R_2-1$ elements and using the same set of middle switch elements in $G_2$. In this way, an output allocated to use $G_1$ can find a rearrangement destination and an alternate path within $G_1$. An output allocated to use $G_2$ can find a rearrangement destination and an alternate path within $G_2$.

For example, with $w_1=1$ and $w_2=2$, one switch element is removed from $G_1$, which thus includes {MS-1, MS-2, MS-3}, and two switches are removed from $G_2$, which thus includes {MS-5, MS-6, MS-7, MS-8}. Since $R_1=2$ and $k=2$, $G_1$ is the same as the case of table 8 and can use at least 1 set of $R_1-1=1$ middle switch element. Since $R_2=3$ and $k=2$, $G_2$ can use at least 2 sets of $R_2-1=2$ middle switch elements. For both of $G_1$ and $G_2$, the above-mentioned condition B, which can reduce the number of deliveries, is applicable to up to three input switch elements. Table 19 shows an example of the allocation of the sets D(i,y) of delivery destinations in the routing process at the input stage in this case.

TABLE 19

Relation between Allocation of Sets D(i, y) of Delivery Destinations to Middle Switch Elements (MS-z) and State of y-th Input Switch Elements with k = 2, R = 5 = 2 + 3, and m = (2 * 2 − 1) + (2 * 3 − 2) = 7

|      | IS-1 | IS-2 | IS-3 | IS-4 | IS-5 | Partial Network |
|------|------|------|------|------|------|-----------------|
| MS-1 | 1    | 2    | 2    | 1    | 1    | $G_1$           |
| MS-2 | 2    | 1    | 2    | 1    | 1    |                 |
| MS-3 | 2    | 2    | 1    | 1    | 1    |                 |
| MS-5 | 1    | 2    | 1    | 1    | 1    | $G_2$           |
| MS-6 | 1    | 1    | 2    | 1    | 1    |                 |
| MS-7 | 2    | 1    | 1    | 1    | 1    |                 |
| MS-8 | 2    | 2    | 2    | 1    | 1    |                 |

In the case of removing middle switch elements simply from the configuration with R=5 and k=2 in order to satisfy the RNB condition, only two middle switch elements can be removed at most since k=2. Generally, when the division method is not, the lower limit of the number of middle switch elements after removal is $(R*k-k)/(R*k)=(R-1)/R$ of the original number of middle switch elements.

In contrast, when the division method is used, up to k middle switch elements can be removed from each divided subset. Thus, for the number of middle switch elements after removal, the advantageous effect can be enhanced by up to the lower limit of $(R-1)/R$ of the original number of middle switch elements, that is, 1/2 (R=2). In the example of table 19, three middle switch elements are removed from the original ten middle switch elements.

Meanwhile, focusing on the number of inputs delivered from the input stage, in a case where the division number of R is $D_R$, each subset can sometimes reduce the number of deliveries from the input stage by one. Thus, in a whole view, for the set D(i,y) of delivery-destination middle switch elements for a given input stream, $|D(i,y)|=R- D_R$ is the minimum value. In table 18, R=5, and therefore $|D(i,y)|=R=5$ holds always. However, in table 19, $D_R=2$, and therefore $|D(i,y)|>=5-2=3$ holds.

The above condition C for each output switch element represents an example where the division number of R is 1. Thus, in the case where the minimum value of the number of deliveries on the input side is R−1, and $(n_{3,j}*s_{3,j}) \leq \max(n_{2,i}*s_{2,i})$ for the j-th output switch element, $$n_{4,j}*s_{4,j} \leq (R-1)*n_{3,j}*s_{3,j}, \text{ and } d_{4,j} \leq (R-1)*d_{3,j} \quad \text{equation (39)}$$

is satisfied. Then, if a case where the division number $D_R$ of R is greater than 1 is to be included, it is necessary to satisfy $$n_{4,j}*s_{4,j} \leq (R-D_R)*n_{3,j}*s_{3,j}, \text{ and } d_{4,j} \leq (R-D_R)*d_{3,j} \quad \text{equation (40)}$$

Similarly, k can be divided to generate subsets. When $k \geq 4$, k is replaced such that $k=k_1+k_2$, $k_1 \geq 2$, and $k_2 \geq 2$. In this case, the number of middle switch elements is $m=R*k=R*(k_1+k_2)=R*k_1+R*k_2$. Thus, the whole set can be divided into two subsets each having R independent alternate paths. In this case also, the total number w of switch elements removed from the middle stage is divided as $w=w_1+w_2$ ($w_1 \geq 0$, $w_2 \geq 0$), to distribute the number of middle switch elements removed among the subsets in such a way as to satisfy $$m=R*k-w=(R*k-w_1)+(R*k_2-w_2) \quad \text{equation (41)}$$

In this case, unlike the division of R, $k_1 \geq w_1$ and $k_2 \geq w_2$, and thus $k=k_1+k_2 \geq w_1+w_2=w$. Hence, the maximum value of the number of middle switch elements to be removed is still k.

As a specific example, consider a case where R=2, k=5, and m=R*k=10. Table 20 shows an example of allocation in the routing process at the input stage in which k=5 and thus first to fifth middle switch elements are set in each of two groups (middle-switch numbers 1 to 5 are allocated twice for each input switch element). Here, assuming that $k_1=2$, $k_2=3$, and k=5=2+3, and thus R*k=2*(2+3)=4+6, this is equivalent to handling the middle switch elements as two independent groups ($G_3$) with four middle switch elements {MS-1, MS-2, MS-3, MS-4} and two independent groups ($G_4$) with switches {MS-5, MS-6, MS-7, MS-8, MS-9, MS-10}.

TABLE 20

Relation between Allocation of Sets D(i, y) of Delivery Destinations to Middle Switch Elements (MS-z) and State of y-th Input Switch Elements with k = 5, R = 2, m = 10

|  | IS-1 | IS-2 | IS-3 | IS-4 | IS-5 | Partial Network |
|---|---|---|---|---|---|---|
| MS-1 | 1 | 1 | 1 | 1 | 1 | $G_3$ |
| MS-2 | 1 | 1 | 1 | 1 | 1 |  |
| MS-3 | 2 | 2 | 2 | 2 | 2 |  |
| MS-4 | 2 | 2 | 2 | 2 | 2 |  |
| MS-5 | 3 | 3 | 3 | 3 | 3 | $G_4$ |
| MS-6 | 3 | 3 | 3 | 3 | 3 |  |
| MS-7 | 4 | 4 | 4 | 4 | 4 |  |
| MS-8 | 4 | 4 | 4 | 4 | 4 |  |
| MS-9 | 5 | 5 | 5 | 5 | 5 |  |
| MS-10 | 5 | 5 | 5 | 5 | 5 |  |

Different input streams are delivered to the subset $G_3$ and the subset $G_4$. Then, an output switch element optionally outputs its outputs through paths from the subset $G_3$ and the subset $G_4$. However, from equation (2), $n_{4,j}*s_{4,j} \leq R*n_{3,j}*s_{3,j}$ and $d_{4,j} \leq R*d_{3,j}$ are satisfied, and thus the WSNB condition is satisfied (based on equation (13), it is possible to understand that a network using links capable of bidirectional transmission likewise satisfies the WSNB condition).

Then, one or more middle switch elements are removed from the subset ($G_3$) and the subset ($G_4$) in table 20 so that the subsets can independently satisfy the RNB condition. In the subset $G_3$, the number of elements|D(i,y)| of the set D(i,y) of the y-th ($w_1 \geq y \geq 1$) middle switch elements in all the groups for the i-th input switch element is R−1. If the y'-th ($k_1 \geq y' > w_1$) middle switch element is present in all the groups, the number of elements|D(i,y')| of the set D(i,y') of the y'-th ($k_1 \geq y' > w_1$) middle switch elements is at least R. For every (i,y), there are at most R−1 sets D(i,y) each including R−1 elements and using the same set of middle switch elements in $G_3$.

Likewise, in the subset $G_4$, the number of elements|D(i, y)| of the set D(i,y) of the y-th ($w_2 \geq y \geq k1+1$) middle switch elements in all the groups belonging to $G_4$ is R−1. If the y'-th ($k \geq y' > w_2$) middle switch element is present in all the groups, the number of elements|D(i,y')| of the set D(i,y') of the y'-th ($k_1 \geq y' > w_1$) middle switch elements is at least R. For every (i,y), there are at most R−1 sets D(i,y) each including R−1 elements and using the same set of middle switch elements in $G_4$. Here, an input stream allocated to use the subset $G_3$ has a rearrangement destination and an alternate path within $G_3$. An input stream allocated to use the subset $G_4$ has a rearrangement destination and an alternate path within $G_4$. Hence, all outputs have rearrangement destinations and alternate paths for given input streams in $G_3$ and $G_4$.

For example, with $w_1=1$ and $w_2=1$, one middle switch element is removed from the subset $G_3$, which thus includes (MS-1, MS-2, MS-3), and one middle switch element is removed from the subset $G_4$, which thus includes {MS-5, MS-6, MS-7, MS-8, MS-9}. Since R=2 in both subsets $G_3$ and $G_4$, each can use at least 1 set of R−1=1 middle switch element. Table 21 shows an example of the allocation of the sets D(i,y) of delivery destinations in the routing process at the input stage in this case.

TABLE 21

Relation between Allocation of Sets D(i, y) of Delivery Destinations to Middle Switch Elements (MS-z) and State of y-th Input Switch Elements with k = 5 = 2 + 3, R = 2, m = (2 * 2 − 1) + (2 * 3 − 1) = 8

|  | IS-1 | IS-2 | IS-3 | IS-4 | IS-5 | Partial Network |
|---|---|---|---|---|---|---|
| MS-1 | 1 | 2 | 2 | 1 | 1 | $G_3$ |
| MS-2 | 2 | 1 | 2 | 1 | 1 |  |
| MS-3 | 2 | 2 | 1 | 1 | 1 |  |
| MS-5 | 3 | 4 | 4 | 4 | 4 | $G_4$ |
| MS-6 | 4 | 3 | 4 | 4 | 4 |  |
| MS-7 | 4 | 4 | 3 | 5 | 5 |  |
| MS-8 | 5 | 5 | 5 | 3 | 5 |  |
| MS-9 | 5 | 5 | 5 | 5 | 3 |  |

The division of R and the division of k described above are independent of each other and can thus be repeatedly applied to each subset. That is, with $D_R$ as the division number of R and $D_k$ as the division number of k ($D_R=1$ and $D_k=1$ when R and D are not divided), R, k, and w may be defined as below.

$$R = \sum_{1 \leq i \leq D_R} R_i, (R_i > 1, D_R \geq 1) \quad \text{equation (42)}$$

$$k = \sum_{1 \leq j \leq D_k} k_j, (k_j > 1, D_k \geq 1) \quad \text{equation (43)}$$

$$w = \sum_{1 \leq i \leq D_R} \sum_{1 \leq j \leq D_k} w_{i,j}, (D_R \times k \geq w > 0, k_j \geq w_{i,j} \geq 0) \quad \text{equation (44)}$$

Then, the equation (45) is derived.

$$m_{i,j} = R_i \times k_j - w_{i,j}, m = R \times k - w = \sum_{1 \leq i \leq D_R} \sum_{1 \leq j \leq D_k} m_{i,j} \quad \text{equation (45)}$$

Based on the above, the whole set may be divided into $(D_R*D_k) \geq 1$ or more subsets $G_{i,j}$, and some middle switch elements may be removed from all the subsets with $w_{i,j} > 0$ to replace the network with one which satisfies the RNB condition. Here, in the j-th division of k, numbering in each group corresponds to $k_j$ starting from $K_j$ as indicated below.

$$K_1 = 1, K_j = 1 + \sum_{1 \leq x \leq j-1} k_x, (D_k \geq j > 1) \quad \text{equation (46)}$$

Specifically, for the I-th input switch element, the number of elements $|D(I,y) \cap G_{i,j}|$ of the set $D(I,y) \cap G_{i,j}$ of the y-th ($w_{i,j}+K_j \geq y \geq K_j$) middle switch elements in all the groups belonging to the subset $G_{i,j}$ is $R_i - 1$. In the case where the y'-th ($k_j+K_j > y' > w_{i,j}+K_j$) middle switch element is present in all the groups, the number of elements $|D(I,y') \cap G_{i,j}|$ of the set $D(I,y') \cap G_{i,j}$ of the y'-th middle switch elements is at least $R_i$. For every (i,y), there are at most $R_i - 1$ sets $D(i,y)$ each including $R_i - 1$ elements and using the same set of middle switch elements in the subset $G_{i,j}$.

The routing process at the output stage may also be performed using at least $R_i - 1$ delivery-destination middle switch elements in the subset $G(i,j)$ of middle switch elements to which input streams of interest are delivered. Rearrangement may also be performed using at least $R_i$ alternate paths in the subset $G(i,j)$.

It is obvious from the matters described so far that this method is equally applicable to a network including an input stage, a middle stage, and an output stage and a network including an input-output stage and a middle stage using bidirectional transmission links.

Specifically, the condition C for each input-output switch element represents an example where the division number of R is 1. Thus, in the case where the minimum value of the number of deliveries on the input side is R−1, and $(n'_j {}^* s'_j) < \max(n'_i {}^* s'_i)$ for the j-th input-output switch element at the input-output stage (i≠j), $$n_{4,j}{}^* s_{4,j} <= (R-1)^* n'_i{}^* s'_i, \text{ and } d_{4,j} <= (R-1)^* d'_j \quad \text{equation (47)}$$

is satisfied. If a case where the division number $D_R$ of R is greater than 1 is to be included, it is necessary to satisfy $$n_{4,j}{}^* s_{4,j} <= (R-D_R)^* n'_i{}^* s'_i, \text{ and } d_{4,j} <= (R-D_R)^* d'_j \quad \text{equation (48)}$$

instead of satisfying equation (47).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A multicast switching system with an input stage, a middle stage, and an output stage, comprising:
    a plurality of input switch elements which are provided at the input stage, each configured to receive streams from input sources, and transmit the received streams to the middle stage, a number of the plurality of input switch elements being $r_1$;
    a plurality of middle switch elements which are provided at the middle stage, each configured to receive the streams transmitted from the plurality of input switch elements, and transmit the received streams to the output stage, each of the plurality of middle switch elements being grouped into each of a plurality of groups, a number of the plurality of middle switch elements being m, and a number of the plurality of groups being R; and
    a plurality of output switch elements which are provided at the output stage, each configured to receive the streams transmitted from one or more of the plurality of middle switch elements, and output the received streams to output destinations, a number of the plurality of output switch elements being $r_2$,
    wherein each of the plurality of input switch elements is configured to transmit the received streams to all of the plurality of groups,
    an i-th input switch element among the $r_1$ input switch elements includes $n_{1,i}$ ($n_{1,i} \geq 1$) first input links of a bandwidth $s_{1,i}$ and $n_{2,i}$ ($n_{2,i} \geq 1$) first output links of a bandwidth $s_{2,i}$ connected to each of the m middle switch elements and therefore in total $m \times n_{2,i}$ first output links,
    the i-th input switch element receives the streams with a multiplicity $d_{1,i}$ ($d_{1,i} > 1$) which is a total of the $n_{1,i}$ first input links, and transmits the received streams with a multiplicity $d_{2,i}$ ($d_{1,i} > 1$) which is a total of the $n_{2,i}$ first output links,
    the m middle switch elements include in total $$\Sigma_{1 \leq i \leq r_1} n_{2,i}$$

second input links connected to the i-th input switch element, and in total $$\Sigma_{1 \leq j \leq r_2} n_{3,j}$$

second output links connected to a j-th output switch element among the $r_2$ output switch elements,
    each of the $$\Sigma_{1 \leq i \leq r_1} n_{2,i}$$

second input links includes $n_{2,i}$ links of the bandwidth $s_{2,i}$,
    each of the $$\Sigma_{1 \leq j \leq r_2} n_{3,j}$$

second output links includes $n_{3,j}$ links of a bandwidth $s_{3,j}$,
    the j-th output switch element includes $n_{3,j}$ third input links of the bandwidth $s_{3,j}$ connected to each of the m middle switch elements and therefore in total $m \times n_{3,j}$ third input links, and $n_{4,j}$ ($n_{4,j} \geq 1$) third output links of a bandwidth $s_{4,j}$,
    the j-th output switch element receives the transmitted streams with a multiplicity $d_{3,j}$ ($d_{3,j} > 1$) which is a total of the $n_{3,j}$ third input links, and outputs the received streams with a multiplicity $d_{4,j}$ ($d_{4,j} > 1$) which is a total of the $n_{4,j}$ third output links,
    the number m of the m middle switch elements satisfies $$m = k \times R > 1 (k \geq 1, R \geq 1) \quad \text{equation (1),}$$

the i-th input switch element satisfies $$n_{1,i} \times s_{1,i} \leq k \times n_{2,i} \times s_{2,i}, \text{ and } d_{1,i} \leq k \times d_{2,i} \quad \text{equation (2),}$$

the j-th output switch element satisfies $$n_{4,j} \times s_{4,j} \leq R \times n_{3,j} \times s_{3,j}, \text{ and } d_{4,j} \leq R \times d_{3,j} \quad \text{equation (3), and}$$

the output stage as a whole satisfies $$\Sigma_{1 \leq j \leq r_2}(n_{4,j} \times s_{4,j}) > \Sigma_{1 \leq j \leq r_2}(n_{3,j} \times s_{3,j})$$

and $$\Sigma_{1 \leq j \leq r_2} d_{4,j} > \Sigma_{1 \leq j \leq r_2} d_{3,j} \quad \text{equation (4).}$$

2. The multicast switching system according to claim 1, wherein
    each of the plurality of input switch elements is configured to perform a first routing process to the middle stage on the streams received from the input sources, regardless of whether or not an output request is present, each of the plurality of output switch elements is configured to perform a second routing process on streams to be transmitted from R groups selected among the plurality of middle switch elements as a result of the first routing process, and paths set by the first routing process are not removed.

3. The multicast switching system according to claim 1, wherein the number m of the m middle switch elements satisfies $$m = k \times R - w > 1 (k > 1, R > 1, w \geq 1) \quad \text{equation (5),}$$

based on $$R = \sum_{1 \leq i \leq D_R} R_i, (R_i > 1, D_R \geq 1), \quad \text{equation (6)}$$

$$k = \sum_{1 \leq j \leq D_k} k_j, (k_j > 1, D_k \geq 1), \quad \text{equation (7)}$$

$$w = \sum_{1 \leq i \leq D_R} \sum_{1 \leq j \leq D_k} w_{i,j}, (w > 0, k_j \geq w_{i,j} \geq 0), \quad \text{equation (8)}$$

$$m_{i,j} = R_i \times k_j - w_{i,j}, m = R \times k - w = \sum_{1 \leq i \leq D_R} \sum_{1 \leq j \leq D_k} m_{i,j}, \text{ and} \quad \text{equation (9)}$$

$$K_1 = 1, K_j = 1 + \sum_{1 \leq x \leq j-1} k_x, (D_k \geq j > 1), \quad \text{equation (10)}$$

a set including the m middle switch elements is divided into one or more subsets $G_{i,j}$ each including $m_{i,j}$ middle switch elements, a number of the plurality of groups is at least $R-D_R$, a number w of middle switch elements removed is at most $D_R \times k$, in a routing process at the input stage by the I-th input switch element, a number of elements $|D(I,y) \cap G_{i,j}|$ of a set $D(I,y) \cap G_{i,j}$ of y-th ($w_{i,j} + K_j \geq y \geq K_j$) middle switch elements in all groups belonging to at least one subset $G_{i,j}$ with $w_{i,j} > 0$ is $R_i - 1$, in a case where a y'-th ($k_j + K_j > y' > w_{i,j} + K_j$) middle switch element is present in all the groups, a number of elements $|D(I,y') \cap G_{i,j}|$ of a set $D(I,y') \cap G_{i,j}$ of the y'-th middle switch elements is at least $R_i$, and the subset $G_{i,j}$ includes at most $R_i-1$ sets $D(I,y) \cap G_{i,j}$ which include $R_i-1$ elements and use a same set of middle switch elements within the subset $G_{i,j}$, the i-th input switch element satisfies $$n_{1,i} \times s_{1,i} \leq k \times n_{2,i} \times s_{2,i}, \text{ and } d_{1,i} \leq k \times d_{2,i} \quad \text{equation (11),}$$

in a case where $(n_{3,j} \times s_{3,j}) < \max(n_{2,i} \times s_{2,i})$, the j-th output switch element satisfies $$n_{4,j} \times s_{4,j} \leq (R-D_R) \times n_{3,j} \times s_{3,j}, \text{ and } d_{4,j} \leq (R-D_R) \times d_{3,j} \quad \text{equation (12),}$$

in a case where $(n_{3,j} \times s_{3,j}) \geq \max(n_{2,i} \times s_{2,i})$, the j-th output switch element satisfies $$n_{4,j} \times s_{4,j} \leq R \times n_{3,j} \times s_{3,j}, \text{ and } d_{4,j} \leq R \times d_{3,j} \quad \text{equation (13), and}$$

the output stage as a whole satisfies $$\Sigma_{1 \leq j \leq r_2}(n_{4,j} \times s_{4,j}) > \Sigma_{1 \leq j \leq r_2}(n_{3,j} \times s_{3,j})$$

and $$\Sigma_{1 \leq j \leq r_2} d_{4,j} > \Sigma_{1 \leq j \leq r_2} d_{3,j} \quad \text{equation (14).}$$

4. The multicast switching system according to claim 3, wherein each of the plurality of input switch elements is configured to perform a first routing process to the middle stage on the streams received from the input sources, regardless of whether or not an output request is present, each of the plurality of output switch elements is further configured to perform a second routing process by outputting to the output destinations, the streams to be transmitted from at least $R_i-1$ groups selected in a subset $G(i,j)$ among the plurality of middle switch elements as a result of the first routing process, and rearrange an existing multicast delivery such that the existing multicast delivery is performed through an alternate path among relay paths formed of the middle switch elements in at least $R_i$ groups in the subset $G(i,j)$, and paths set by the first routing process are not removed.

5. The multicast switching system according to claim 1, wherein one or more of the $r_1$ input switch elements are configured to replace $n'_1$ links among the first input links connected to the i-th input switch element with $\lceil (n'_1 \times s_{1,i})/s'_1 \rceil$ links by using a bandwidth $s'_1$, one or more of the m middle switch elements are configured to replace $n'_2$ links among the second input links connected to the first output links of the i-th input switch element with $\lceil (n'_2 \times s_{2,i})/s'_2 \rceil$ links by using a bandwidth $s'_2$, one or more of the m middle switch elements are configured to replace $n'_3$ links among the second output links connected to the third input links of the j-th output switch element with $\lceil (n'_3 \times s_{3,j})/s'_3 \rceil$ links by using a bandwidth $s'_3$, or one or more of the $r_2$ output switch elements are configured to replace $n'_4$ links among the third output links connected to the j-th output switch element with $\lceil (n'_4 \times s_{4,j})/s'_4 \rceil$ links by using a bandwidth $s'_4$.

6. A bidirectional-transmission multicast switching system with an input-output stage and a middle stage, comprising:

a plurality of input-output switch elements which are provided at the input-output stage, each configured to receive streams from input sources, and transmit the received streams to the middle stage, a number of the plurality of input-output switch elements being r; and a plurality of middle switch elements which are provided at the middle stage, each configured to receive the streams transmitted from the plurality of input-output switch elements, and transmit the received streams to the input-output stage, each of the plurality of middle switch elements being grouped into each of a plurality of groups, a number of the plurality of middle switch elements being m, wherein each of the plurality of input-output switch elements is configured to transmit the received streams to all of the plurality of groups, an i-th input-output switch element among the r input-output switch elements includes $n_i$ ($n_i > 1$) input-output links of a bandwidth $s_i$ connected to the input sources and the output destinations, and $n'_i$ ($n'_i \geq 1$) connection links of a bandwidth $s'_i$ connected to each of the m middle switch elements and therefore in total $m \times n'_i$ connection links, the i-th input-output switch element is configured to receives the streams from the input sources with a multiplicity $d_{1,i}$ ($d_{1,i} > 1$) which is a total of $n_{1,i}$ ($n_{1,i} > 1$) input-output links among the $n_i$ input-output links, and transmits the streams received from the one or more of the plurality of middle switch elements, with a multiplicity $d_{2,i}$ ($d_{2,i}>1$) which is a total of $n_{2,i}$ ($n_{2,i}\geq 1$) input-output links among the $n_i$ input-output links, the m middle switch elements include in total $\Sigma_{1\leq i\leq r}$ n'$_i$ (n'$_i\geq 1$) connection links connected to the i-th input-output switch element, each of the $\Sigma_{1\leq i\leq r}$ n'$_i$ connection links includes n'$_i$ links of the bandwidth s'$_j$, the number m of the m middle switch elements satisfies $$m=k\times R>1 (k\geq 1, R\geq 1) \qquad \text{equation (1)},$$

the i-th input-output switch element satisfies $$n_{1,i}\times s_i \leq k\times n'_i \times s'_i, \text{ and } d_{1,i}\leq k\times d'_i \qquad \text{equation (2)},$$

the j-th input-output switch element satisfies $$n_{2,i}\times s_i \leq R\times n'_i \times s'_i, \text{ and } d_{2,i}\leq R\times d'_i \qquad \text{equation (3), and}$$

the input-output stage as a whole satisfies $$\Sigma_{1\leq i\leq r}(n_i\times s_i)>\Sigma_{1\leq i\leq r}(n'_i\times s'_i), \text{ and } \Sigma_{1\leq i\leq r}d_i>\Sigma_{1\leq i\leq r}d'_i \qquad \text{equation (4)}.$$

7. The bidirectional-transmission multicast switching system according to claim 6, wherein each of the plurality of input-output switch elements is configured to perform a first routing process to the middle stage on the streams received from the input sources, regardless of whether or not an output request is present, each of the plurality of input-output switch elements is configured to perform a second routing process on streams to be transmitted from R groups selected among the plurality of middle switch elements as a result of the first routing process, and paths set by the first routing process are not removed.

8. The bidirectional-transmission multicast switching system according to claim 6, wherein the number m of the m middle switch elements satisfies $$m=k\times R-w>1(k>1, R>1, w\geq 1) \qquad \text{equation (5)},$$

based on $$R = \sum_{1\leq i\leq D_R} R_i, (R_i > 1, D_R \geq 1), \qquad \text{equation (6)}$$

$$k = \sum_{1\leq j\leq D_k} k_j, (k_j > 1, D_k \geq 1), \qquad \text{equation (7)}$$

$$w = \sum_{1\leq i\leq D_R}\sum_{1\leq j\leq D_k} w_{i,j}, (w > 0, k_j \geq w_{i,j} \geq 0), \qquad \text{equation (8)}$$

$$m_{i,j} = R_i\times k_j - w_{i,j}, m = R\times k - w = \sum_{1\leq i\leq D_R}\sum_{1\leq j\leq D_k} m_{i,j}, \text{ and} \qquad \text{equation (9)}$$

$$K_1 = 1, K_j = 1 + \sum_{1\leq x\leq j-1} k_x, (D_k \geq j > 1), \qquad \text{equation (10)}$$

a set including the m middle switch elements is divided into one or more subsets $G_{i,j}$ each including $m_{i,j}$ middle switch elements, a number of the plurality of groups is at least $R-D_R$, a number w of middle switch elements removed is at most $D_R\times k$, in a routing process at the input stage by the I-th input switch element, a number of elements $|D(I,y)\cap G_{i,j}|$ of a set $D(I,y)\cap G_{i,j}$ of y-th ($w_{i,j}+K_j\geq y\geq K_j$) middle switch elements in all groups belonging to at least one subset $G_{i,j}$ with $w_{i,j}>0$ is $R_i-1$, in a case where a y'-th ($k_j+K_j>y'>w_{i,j}+K_j$) middle switch element is present in all the groups, a number of elements $|D(I,y')\cap G_{i,j}|$ of a set $D(I,y')\cap G_{i,j}$ of the y'-th middle switch elements is at least $R_i$, and the subset $G_{i,j}$ includes at most $R_i-1$ sets $D(I,y)\cap G_{i,j}$ which include $R_i-1$ elements and use a same set of middle switch elements within the subset $G_{i,j}$, the j-th input-output switch element satisfies $$n_{1,i}\times s_{1,i}\leq k\times n'_j\times s'_i, \text{ and } d_{1,i}\leq k\times d'_i \qquad \text{equation (11)},$$

in a case where $(n'_j\times s'_j)<\max(n'_i\times s'_i)$ ($i\neq j$), an output side of the j-th input-output switch element satisfies $$n_{2,j}\times s_{2,j}\leq (R-D_R)\times n'_j\times s'_j, \text{ and } d_{2,i}\leq (R-D_R)\times d'_j \qquad \text{equation (12)},$$

in a case where $(n'_j\times s'_j)=\max(n'_i\times s'_i)$ ($i\neq j$), the j-th input-output switch element satisfies $$n_{2,j}\times s_{2,j}\leq R\times n'_j\times s'_j, \text{ and } d_{2,i}\leq R\times d'_j \qquad \text{equation(13), and}$$

the input-output stage as a whole satisfies $$\Sigma_{1\leq i\leq r}(n_i\times s_i)>\Sigma_{1\leq i\leq r}(n'_i\times s'_i) \text{ and } \Sigma_{1\leq i\leq r}d_i>\Sigma_{1\leq i\leq r}d'_i \qquad \text{equation (14)}.$$

9. The bidirectional-transmission multicast switching system according to claim 8, wherein each of the plurality of input-output switch elements is configured to perform a first routing process to the middle stage on the streams received from the input sources, regardless of whether or not an output request is present, each of the plurality of input-output switch elements is further configured to perform a second routing process by outputting to the output destinations, the streams to be transmitted from at least $R_i-1$ groups selected in a subset G(i,j) among the plurality of middle switch elements as a result of the first routing process, and rearrange an existing multicast delivery such that the existing multicast delivery is performed through an alternate path among relay paths formed of the middle switch elements in at least $R_i$ groups in the subset G(i,j), and paths set by the first routing process are not removed.

10. The bidirectional-transmission multicast switching system according to claim 6, wherein one or more of the r input-output switch elements are configured to replace n'$_1$ links among the input-output links connected to the i-th input-output switch element with $\lceil (n'_1\times s_{1,i})/s'_1 \rceil$ links by using a bandwidth s'$_1$, or one or more of the m middle switch elements are configured to replace n'$_2$ links among the connection links connected to the i-th input-output switch element with $\lceil (n'_2\times s_{2,i})/s'_2 \rceil$ links by using a bandwidth s'$_2$.

11. The bidirectional-transmission multicast switching system according to claim 6, wherein in a routing process, the j-th input-output switch element among the plurality of input-output switch elements is configured to select whether to:

transmit the streams received from the input sources to each of the plurality of groups and also directly output the streams to the output destinations in a case where the output destinations are present at the same input-output switch element; or transmit the streams received from the input sources to each of the plurality of groups and output the streams transmitted from any of the plurality of groups to the output destinations.

* * * * *